United States Patent [19]

Hufford

[11] Patent Number: 4,825,625
[45] Date of Patent: May 2, 1989

[54] SEALING METHOD AND APPARATUS FOR HIGH CAPACITY ASEPTIC FORM, FILL, AND SEAL MACHINES

[75] Inventor: Marvin Hufford, Milwaukee, Wis.

[73] Assignee: International Paper Company, Purchase, N.Y.

[21] Appl. No.: 942,846

[22] Filed: Dec. 17, 1986

[51] Int. Cl.⁴ ............................ B65B 9/08; H05B 5/04
[52] U.S. Cl. ........................................ 53/451; 53/425; 53/551; 53/DIG. 2; 493/197
[58] Field of Search ................. 53/451, 450, 477, 551, 53/550, DIG. 2, 425; 493/197, 196, 195, 194, 193, 302

[56] References Cited

U.S. PATENT DOCUMENTS

| | | | |
|---|---|---|---|
| 2,214,994 | 9/1940 | Vogt | 229/7 |
| 2,307,890 | 1/1943 | Lakso | |
| 2,448,009 | 8/1948 | Baker | 219/13 |
| 2,448,012 | 8/1948 | Baker | 219/13 |
| 2,479,375 | 8/1949 | Langer | 219/19 |
| 2,492,530 | 12/1949 | Kriegsheim | 219/47 |
| 2,498,383 | 2/1950 | Story | 219/47 |
| 2,522,682 | 9/1950 | Lewis | |
| 2,535,413 | 12/1950 | Hart et al. | |
| 2,542,901 | 2/1951 | Chaffee | 154/42 |
| 2,556,223 | 6/1951 | Schnure, Jr. | 219/13 |
| 2,612,595 | 9/1952 | Warren | 219/47 |
| 2,621,704 | 12/1952 | Langer | 154/42 |
| 2,631,642 | 3/1953 | Richardson et al. | 154/1 |
| 2,666,831 | 1/1954 | Seulen et al. | 219/6 |
| 2,708,649 | 5/1955 | Cunningham | 154/116 |
| 2,715,170 | 8/1955 | Sorensen | 219/10.53 |
| 2,738,631 | 3/1956 | Jarund | 53/180 |
| 2,741,079 | 4/1956 | Rausing | 53/180 |
| 2,799,759 | 7/1957 | Blond et al. | 219/10.53 |
| 2,873,344 | 2/1959 | Kocks et al. | 219/10.43 |
| 2,920,173 | 1/1960 | Wastberg | 219/10.53 |
| 2,966,021 | 12/1960 | Lane et al. | 53/182 |
| 2,976,907 | 3/1961 | Harvey et al. | 153/10 |
| 2,998,340 | 8/1961 | Conway et al. | 154/116 |
| 3,006,121 | 10/1961 | Omori | 53/180 |
| 3,027,443 | 3/1962 | Reed et al. | 219/10.69 |
| 3,027,696 | 4/1962 | Leasure | 53/28 |
| 3,052,074 | 9/1962 | Dreeben | 53/182 |
| 3,057,129 | 10/1962 | Meissner | 53/28 |
| 3,063,211 | 11/1962 | Graves | 53/180 |
| 3,063,845 | 11/1962 | Graves | 99/171 |
| 3,140,218 | 7/1964 | Hannon | 156/583 |
| 3,221,469 | 12/1965 | Murray | 53/28 |
| 3,293,099 | 12/1966 | Stark | 156/289 |
| 3,300,944 | 1/1967 | Thesing | 53/28 |
| 3,332,036 | 7/1967 | Kappenhagen et al. | 331/173 |
| 3,332,198 | 7/1967 | Thesing | 53/28 |
| 3,381,441 | 5/1968 | Condo, Jr. et al. | 53/24 |
| 3,391,846 | 7/1968 | White | 229/17 |
| 3,395,261 | 7/1968 | Leatherman et al. | 219/10.61 |
| 3,396,258 | 8/1968 | Leatherman | 219/10.53 |
| 3,424,885 | 1/1969 | Garney et al. | 219/10.53 |
| 3,435,172 | 3/1969 | Emerson | 219/10.75 |
| 3,445,629 | 5/1969 | Stark et al. | 219/388 |
| 3,450,856 | 6/1969 | Buck et al. | 219/10.53 |
| 3,457,132 | 7/1969 | Tuma et al. | 156/515 |
| 3,461,014 | 8/1969 | James | 156/272 |
| 3,462,336 | 8/1969 | Leatherman | 156/272 |

(List continued on next page.)

FOREIGN PATENT DOCUMENTS

231906  6/1963  Austria .

(List continued on next page.)

Primary Examiner—James F. Coan
Attorney, Agent, or Firm—Robert M. Isackson

[57] ABSTRACT

Improved form, fill, and seal machine for making aseptic sealed packages incorporating a plurality of sealing mechanisms mounted on a continuously advancing structure in a form, fill, and seal machine. Induction heating is used to longitudinally seal the edges of the web together to form a tube and to transversely seal the tube. A circuit means is used for controlling the electromagnetic energy source output to form longitudinal seals and transverse seals. The plurality of sealing mechanisms include a sealing jaw and an anvil jaw hinged together and adapted to pinch the tube therebetween at predetermined locations as the sealing mechanisms and web tubing advance. Each sealing jaw contains a transverse induction coil for transversely sealing the tube. Coupling and energization means select for forming a longitudinal seal segment or a transverse seal or both.

39 Claims, 32 Drawing Sheets

U.S. PATENT DOCUMENTS

| | | | |
|---|---|---|---|
| 3,522,511 | 8/1970 | Wyslotsky | 321/5 |
| 3,528,867 | 9/1970 | Leatherman et al. | 156/272 |
| 3,530,642 | 9/1970 | Leimert | 53/180 |
| 3,540,971 | 11/1970 | Johanski, Jr. | 156/566 |
| 3,574,031 | 4/1971 | Heller, Jr. et al. | 156/273 |
| 3,604,880 | 9/1971 | O'Neill | 219/10.53 |
| 3,652,361 | 3/1972 | Leatherman | 156/272 |
| 3,679,509 | 7/1972 | Fielibert | 156/182 |
| 3,723,212 | 3/1973 | Casper | 156/69 |
| 3,730,804 | 5/1973 | Dickey | 156/272 |
| 3,738,892 | 6/1973 | Curcio | 156/380 |
| 3,754,456 | 8/1973 | Andrews et al. | |
| 3,837,961 | 9/1974 | Vovillemin | 156/272 |
| 3,864,186 | 2/1975 | Balla | 156/272 |
| 3,879,247 | 4/1975 | Dickey | 156/272 |
| 3,925,633 | 12/1975 | Partridge | 219/10.49 |
| 3,927,297 | 12/1975 | Reil | 219/243 |
| 3,940,305 | 2/1976 | Steinberg | 156/515 |
| 3,948,720 | 4/1976 | Reil | 156/583 |
| 3,955,061 | 5/1976 | Roehrman | 219/10.77 |
| 3,980,515 | 9/1976 | Reil et al. | 156/497 |
| 4,322,929 | 4/1982 | Neumann | 53/451 |
| 4,330,351 | 5/1982 | LoMaglio | 156/203 |
| 4,353,196 | 10/1982 | Beer et al. | 53/451 |
| 4,364,220 | 12/1982 | Rausing | 53/411 |
| 4,371,768 | 2/1983 | Pozna | 219/10.53 |
| 4,380,446 | 4/1983 | Dickson et al. | 493/11 |
| 4,387,547 | 6/1983 | Reil | 53/131 |
| 4,470,240 | 9/1984 | Torterotot | 53/425 X |
| 4,571,472 | 2/1986 | Pollack et al. | 219/9.5 |
| 4,637,199 | 1/1987 | Steck et al. | 53/451 |
| 4,009,068 | 2/1977 | Boussageon | 156/380 |
| 4,034,537 | 7/1977 | Reil et al. | 53/28 |
| 4,060,443 | 11/1977 | Balla | 156/380 |
| 4,067,761 | 1/1978 | Shirley | 156/218 |
| 4,084,999 | 4/1978 | Rucker | 156/466 |
| 4,128,985 | 12/1978 | Simmons | 53/51 |
| 4,160,144 | 7/1979 | Kashyap et al. | 219/10.55 |
| 4,210,477 | 7/1980 | Gillespie et al. | 156/203 |
| 4,249,364 | 2/1981 | Kawasaki et al. | 53/550 |
| 4,316,709 | 2/1982 | Petersson et al. | 425/174-8E |

FOREIGN PATENT DOCUMENTS

| | | |
|---|---|---|
| 921565 | 2/1973 | Canada . |
| 981339 | 1/1976 | Canada . |
| 594677 | 3/1934 | Fed. Rep. of Germany . |
| 1104422 | 4/1961 | Fed. Rep. of Germany . |
| 1124865 | 3/1962 | Fed. Rep. of Germany . |
| 1146431 | 3/1963 | Fed. Rep. of Germany . |
| 1218332 | 6/1966 | Fed. Rep. of Germany . |
| 1247192 | 8/1967 | Fed. Rep. of Germany . |
| 278660 | 2/1970 | Fed. Rep. of Germany . |
| 2014974 | 10/1970 | Fed. Rep. of Germany . |
| 293280 | 9/1971 | Fed. Rep. of Germany . |
| 2131906 | 1/1972 | Fed. Rep. of Germany . |
| 2337939 | 2/1975 | Fed. Rep. of Germany . |
| 2410101 | 9/1975 | Fed. Rep. of Germany . |
| 2515849 | 10/1975 | Fed. Rep. of Germany . |
| 197077 | 8/1980 | Fed. Rep. of Germany . |
| 1120756 | 7/1956 | France . |
| 1247747 | 2/1960 | France . |
| 1368859 | 6/1964 | France . |
| 2227178 | 7/1974 | France . |
| 269069 | 4/1967 | U.S.S.R. . |

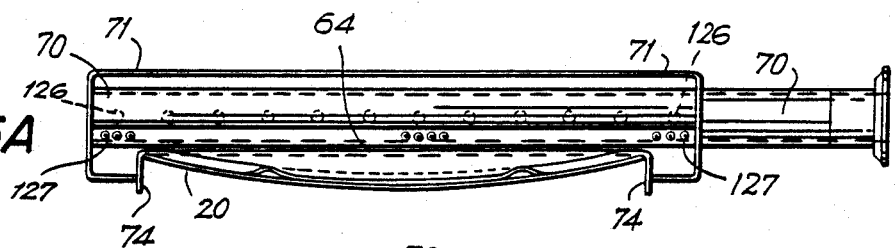
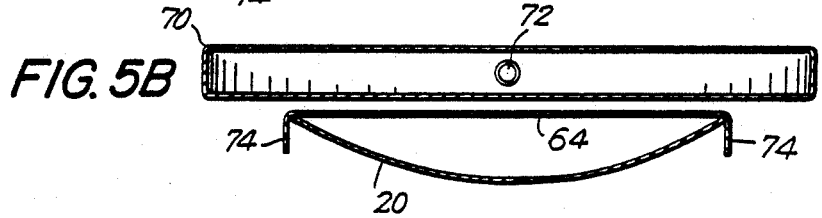
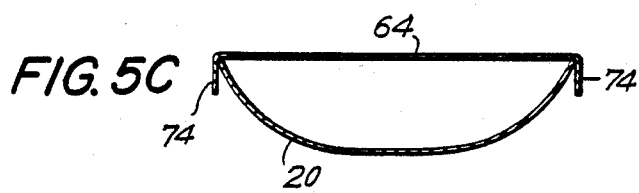
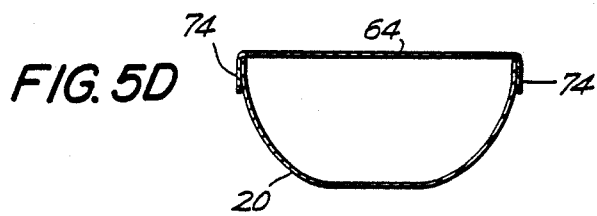
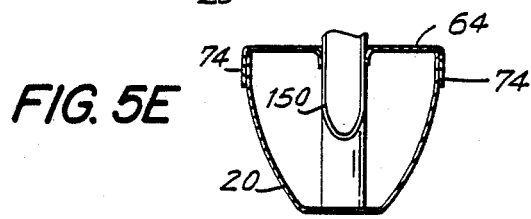
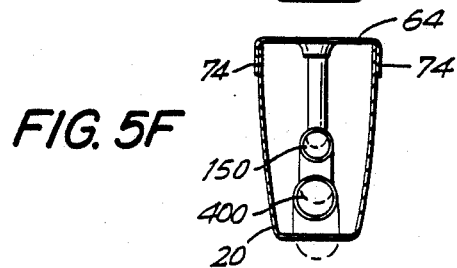
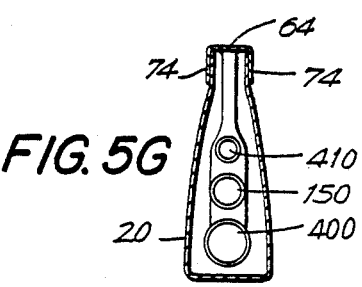

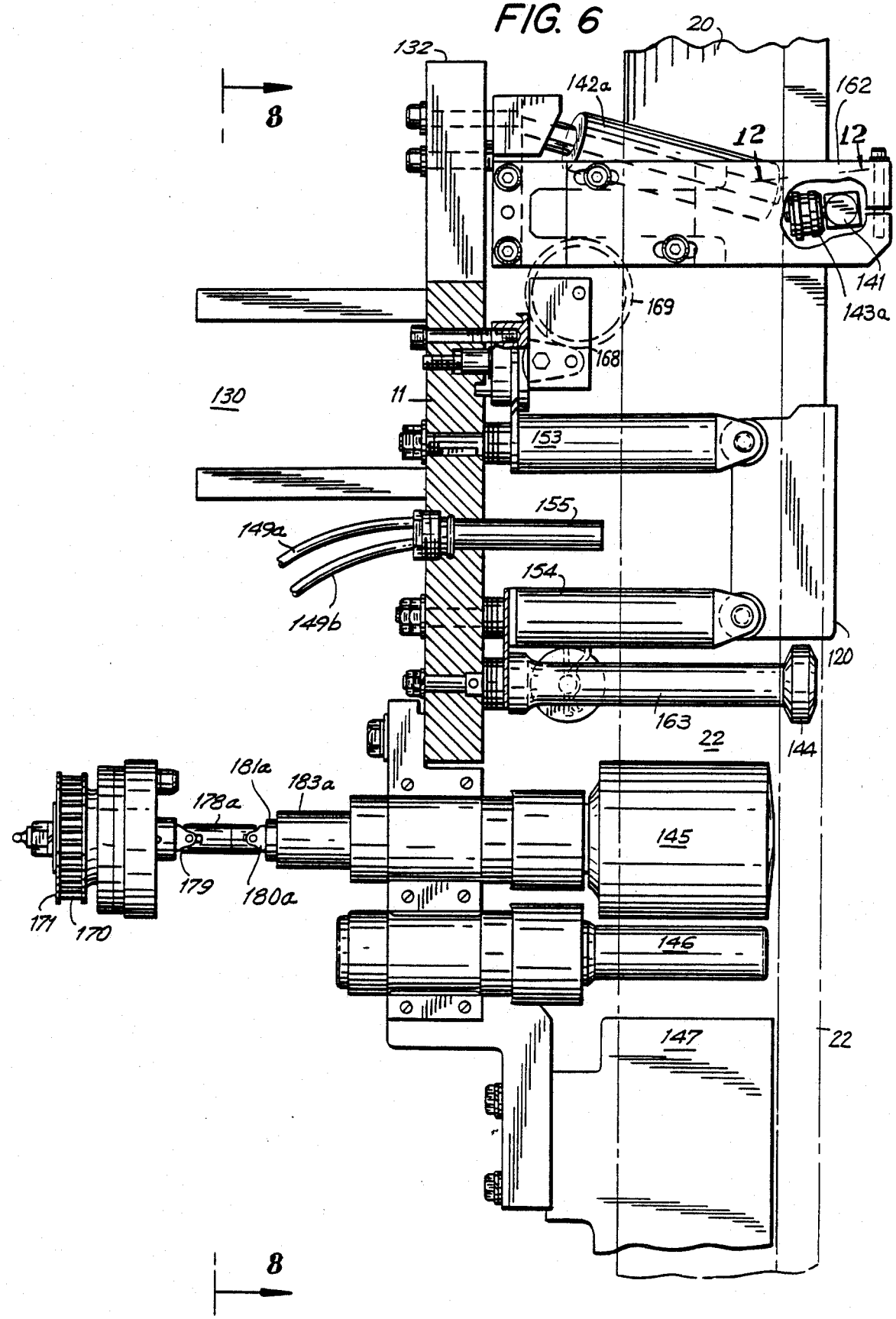

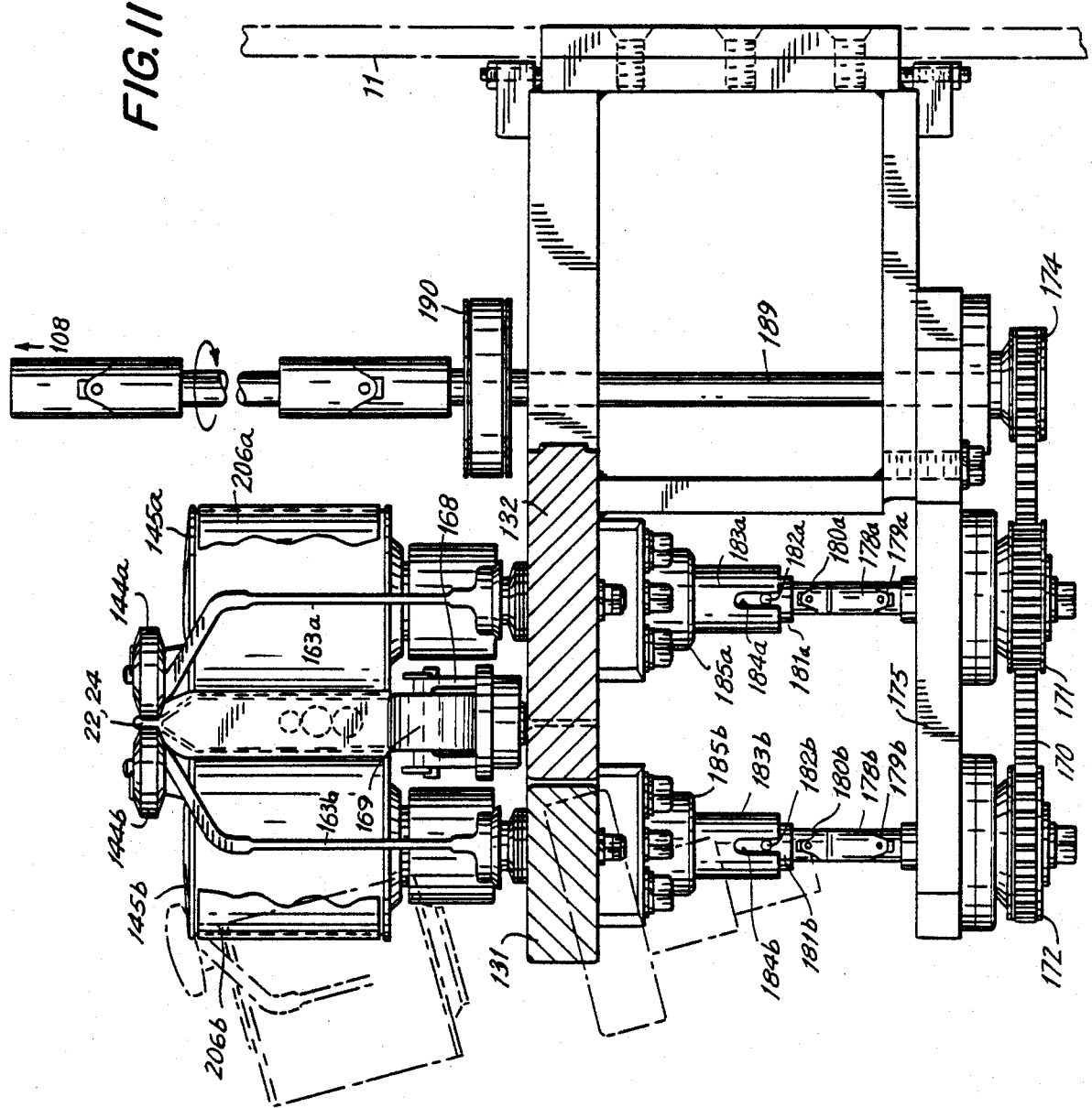

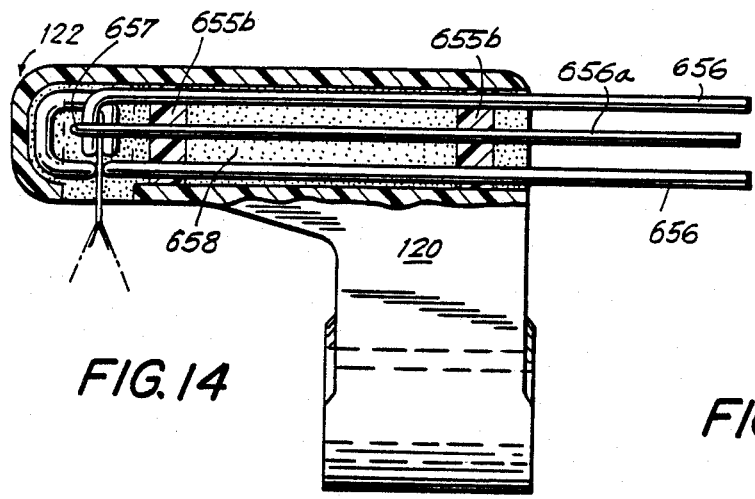
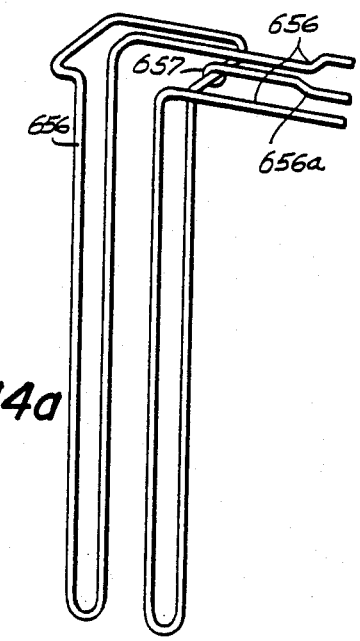
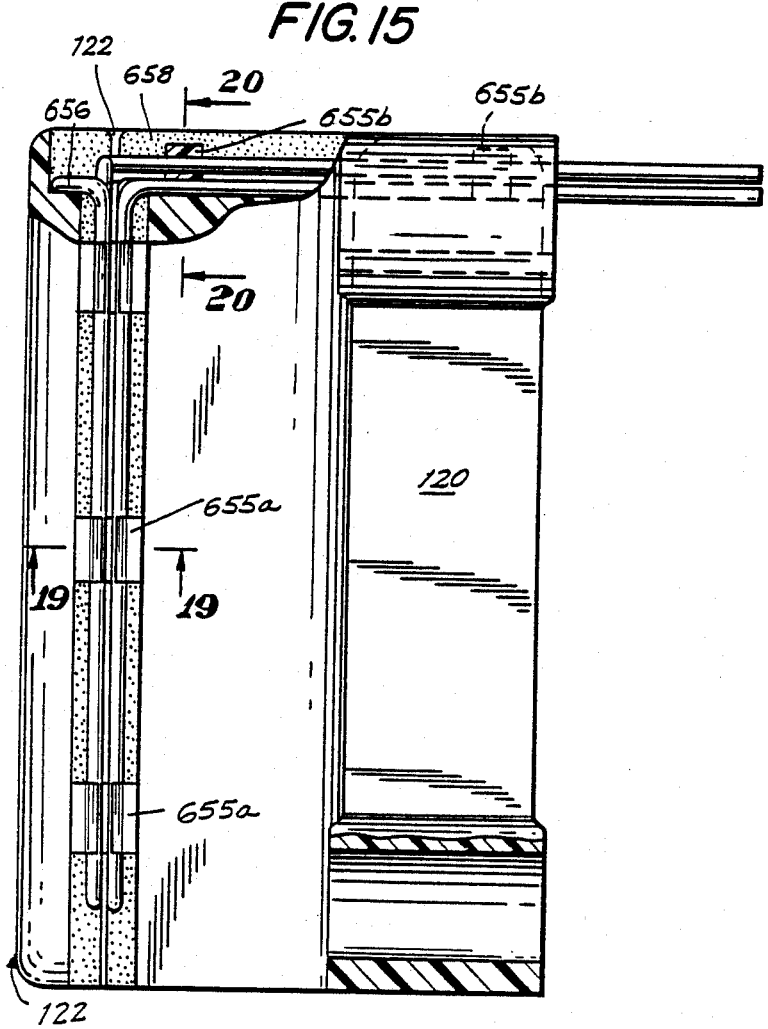
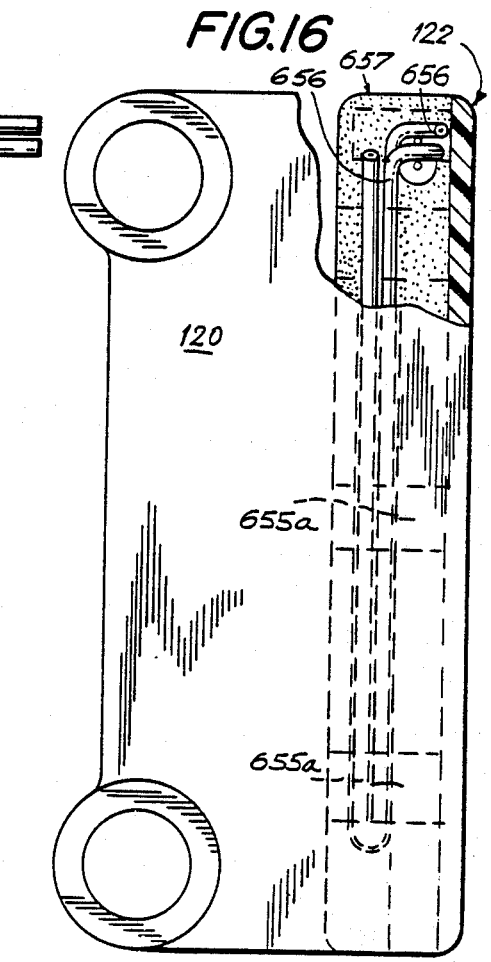

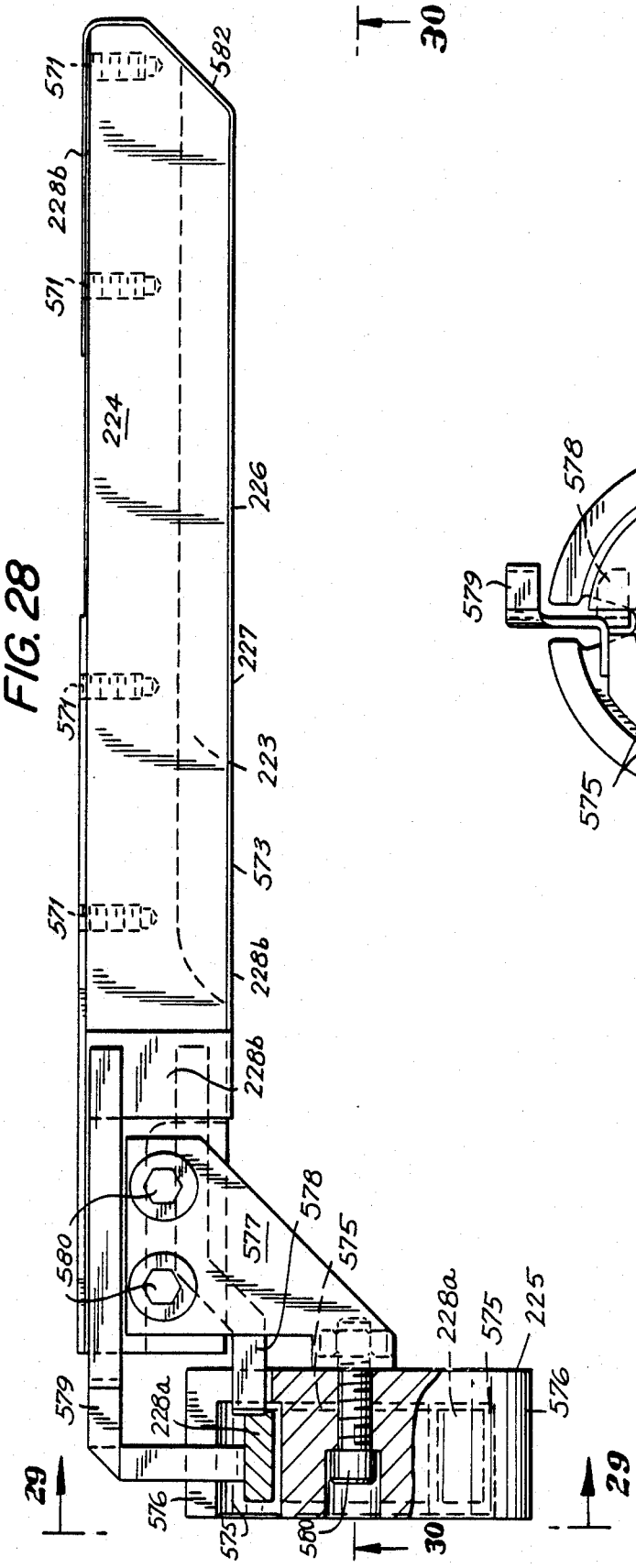

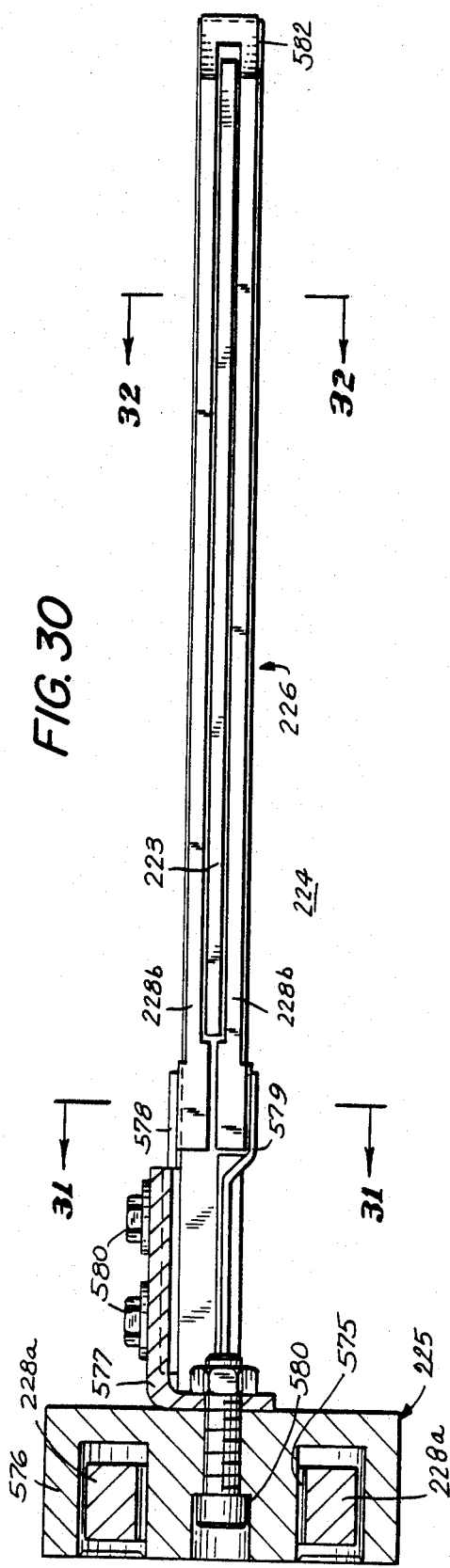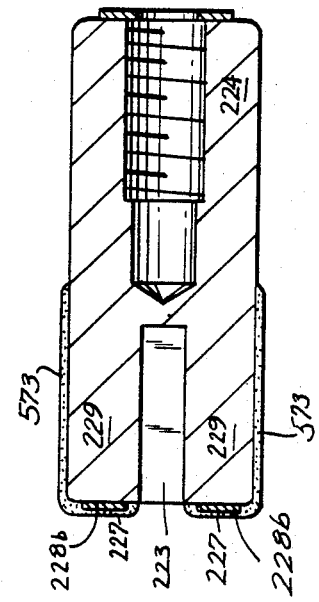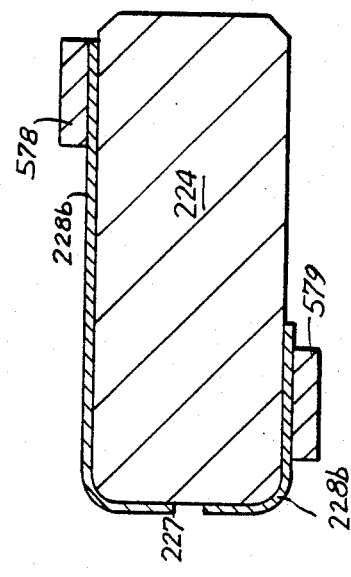

SEALING METHOD AND APPARATUS FOR HIGH CAPACITY ASEPTIC FORM, FILL, AND SEAL MACHINES

This invention relates to a method and machine for sealing a web of material into packages at high rates of package production, particularly to an improved method and apparatus for induction sealing of a continuously advancing polyfoil web material longitudinally and transversely, to form aseptic packages containing a product.

BACKGROUND OF THE INVENTION

Aseptic packages refer to sealed containers containing a substantially uniform predetermined amount of a product made in accordance with commercial aseptic packaging standards. Commercial aseptic packaging involves introducing a sterile product into a sterile container and then hermetically sealing the container in an environment substantially free of microorganisms capable of growing in a shelf stable product at temperatures at which the cooled finished product is likely to be stored during distribution and storage prior to consumption. Hermetically sealed containers minimize the transmission of any gas or fluid through the container package so that there is substantially no biological transmission. Preferably, the package is also substantially free of air which, if present in significant amounts, could promote undesired microbial growth or, even in the absence of microbial growth, adversely affect the taste or color of a product. Typical products are fluent materials, specifically, a fluid drink such as pasturized milk, fruit juices, and the like.

The sterile containers commonly comprise a laminated web packaging material preferably having at least one layer of current carrying material such as aluminum foil, an exterior layer of thermoplastic material to become the package interior in contact with the product, and an exterior layer of material for contact with the environment. The laminated material, also referred to herein as "polyfoil web", is typically strong enough to stand upright in a somewhat rigid finished configuration to contain the product for shipping and storage, and commonly includes a conventional paperboard structural layer. Product labeling and registration marks and the like may be printed on the paperboard layer or the outer thermoplastic layer. In the invention described below, the most preferred polyfoil web to use comprises a laminate of, in order, a layer of low density polyethylene, paper stock, Surlyn ®, aluminum foil, Surlyn ®, and linear low density polyethylene. The low density polyethylene could also be a high density polyethylene, and the linear low density polyethylene layer could be a low density polyethylene.

The thermoplastic material forming the package interior must be capable of being sealed together to form hermetic seals. Typically, opposing thermoplastic layers are heated to a melting temperature so that they will fuse together. The thermoplastic and metallic foil layers act in concert to provide the hermetic barrier for the aseptic package. The metallic foil layer provides a light and oxygen barrier. The outer layer is commonly a thermoplastic material that can be heated so that the package seams and triangular tabs of excess material formed during final forming or bricking of the packages can be flattened or tacked against the package sidewalls to form an aesthetically pleasing package.

Such polyfoil laminates may include spaced access means to enable the user to readily extract the product from the finished package.

Several methods and machines for forming aseptic and non aseptic packages or cartons from paper stock and laminated web materials are known. These methods and machines generally fall into two categories, blank fed and continuous web fed.

In blank fed machines, the supply of web first is separately formed into cut and scored blanks. The blanks are then fed into the forming section of the machine one at a time and erected into containers. Many machines operate on several blanks at different stages of construction at a time. For aseptic packaging, the containers are sterilized, filled with a sterile product, and hermetically sealed closed while in a sterile environment. The seams of these containers are typically formed by gluing or heat pressing overlapping flaps together.

Some blank fed machines form the blanks into cartons intermittently, performing one assembly operation on the blank or carton at each station and advancing the blank or carton from station to station. Other blank fed machines operate semi-continuously by continuously advancing the blank to form the container and then intermittently advancing the container to sterilize, fill, and seal the container. One commercial intermittent type blank fed aseptic machine is Combiblok, Model No. CF 606A.

In continuous web fed machines, the web is taken directly off the roll of web stock, scored (unless pre-scored on the roll), and fed into the machine. The machine then folds the web to form a column, seals the longitudinal edge to form a tube, fills the tube with a product, and clamps, seals, and severs the tube to form the packages. The web advance may be continuous, to gradually manipulate the web into sealed packages, or intermittent, to perform each assembly operation while the web is stationary or while the web is moving between stations. The sealing steps typically involve thermally sealing thermoplastic materials together to form an hermetic seal. Thermal sealing is brought about by using, for example, radiant heat, heated contacting members, or induction heating coils (for webs having a conductive layer integrated therein or applied thereon).

For aseptic packaging, the web is sterilized and fed into a sterile machine section, so that the tube is sterile and the package is formed, filled and sealed in a sterile environment. One commercial automatic continuous feed aseptic machine is Tetra-Pak Model AB 9. Other known aseptic machines include International Paper Co.'s web fed aseptic package machine, Model SA.

In many of the machines, reciprocating means are used to operate on the web either when the web or package is stationary, reciprocating into position and operation and then reciprocating out of position and operation when the web or package is advanced, or when the package advances, reciprocating with and operating on the package as it moves and then returning to the beginning of its stroke range while the web or package is stationary to operate on the following package.

The continuous web fed machines may have one or more reciprocating means which reciprocate while the web continues to advance or opposing endlessly rotating means such as wheels or endless linked belts containing a plurality of identical means for sequentially operating on the web as the web advances at a substantially uniform speed. The present invention relates to an improvement in continuous web fed type machines, and is designed to have a production rate substantially higher than that of presently known machines.

The primary problem with the aforementioned forming, filling, and sealing machines is that they are limited in the machine speed and web control required to continuously or intermittently make aseptic packages at a rate of speed higher than presently obtainable in an economically efficient manner.

The production rates of known blank fed designs and machines are limited by the time required to erect a blank into a carton, fill the carton, and seal it closed.

Intermittent and continuous continuous web fed machines are limited by the rate at which the web can be formed into a longitudinally advancing tube and the sealing mechanisms can transversely clamp, seal, and sever the tube into packages, of by the speed of the endlessly advancing linked chains or belts or rotating wheels on which the sealing mechanisms are mounted, or by the rate of reciprocating action of the sealing means used to form each package.

Increasing the speed of machines having a plurality of sealing mechanisms on a wheel or endless belts can cause the opposing wheels or belts to oscillate or bounce as the sealing mechanisms come in contact with each other to clamp and seal the package. This increases wear and decreases the useful life of the sealing mechanisms and could cause the wheels or belts to vibrate or become misaligned or untracked so that the sealing mechanisms would not seal accurately.

Similarly, merely increasing the frequency of reciprocation of the sealing means or other elements to increase the rate of production would also increase the wear and exaggerate any imbalance which could cause such an apparatus to shake itself apart. Adding a second reciprocating device, e.g., a sealing head, to increase the rate has been applied with some success, see, for example, Model AB-9 manufactured by Tetra-Pak. However, this technique also suffers from having a limited maximum reciprocation and production rates and adds undue mechanical complexity to permit the plural means to reciprocate past each other without interference.

Adding a second or multiple production lines does not solve the problem of increasing the production rate of a single machine. Multiple production lines mounted on a single frame may achieve some efficiencies in sharing common elements, but it is effectively the same as two or multiple machines. The rate of production is not increased, only the volume. Such machines, e.g., the aforementioned Combiblok machine which has two parallel production lines, and other known models which have four production lines, are unduly bulky, mechanically complicated, and occupy a substantial amount of floor space. Further, the more common elements shared by the multiple lines, the more complicated and expensive the machine becomes, especially if the entire machine must be stopped to fix a problem present in only one of the lines.

It is therefore an object of this invention to provide an improved longitudinal and transverse sealing method and apparatus for use in forming, filling, and severing polyfoil packages from a supply of polyfoil web at high rates of speed. It is also an object to provide such a method and apparatus for package forming under aseptic conditions.

It is another object to provide a circuit means to control the sealing operation of the machine to maintain continuous production of aseptic packages at a preselected fixed rate, which may be a variably controllable rate.

It is another object to provide a single relatively slowly rotating structure having a plurality of sealing mechanisms to maintain the web transversely clamped for a period of time sufficient to form hermetic seals without over stressing the mechanical limitations of the apparatus at high rates of production.

It is another object to provide an improved method and apparatus for controlling the application of radio-frequency energy for use in inductively sealing the polyfoil web to form aseptic packages.

It is a further object to use a secondary vertical induction heating coil, a transverse secondary coil mounted in each sealing mechanism, and a single induction generator to alternately form the longitudinal seal and spaced apart transverse seals in the tube to form filled sealed packages, and to adjust the power of the generator and energization of the vertical and transverse coils to control formation of the seals.

SUMMARY OF THE INVENTION

In order to overcome the problems and limitations of the traditional form, fill, and seal machines, the present invention provides an improved method and apparatus for longitudinally sealing a polyfoil web material into a tube and then transversely sealing the tube into discrete product filled packages using a stationary vertical seal induction coil (also referred to as "vertical seal coil", "longitudinal seal coil", "vertical induction coil", or "longitudinal induction coil"), a plurality of transverse seal induction coils (also referred to as "transverse seal coils" or "transverse induction coils"), and a control system for distributing electromagnetic energy between the vertical and transverse induction seal coils to inductively heat the polyfoil and thereby form the longitudinal and the transverse seals.

To inductively seal polyfoil materials in accordance with the present invention, the polyfoil must be manipulated so that the areas to be sealed together overlap in close proximity or in touching contact, preferably arranged thermoplastic layer to thermoplastic layer with a thermoplastic layer being adjacent the current carrying layer of the polyfoil. The area to be sealed is then subjected to an electromagnetic field which must have sufficient energy to induce a current in the current carrying layer of the polyfoil. The induced currents, which may or may not be uniform, must have an aggregate density and dwell time in the current carrying layer sufficient to heat that layer resistively, and thereby melt conductively the adjacent, proximate or contacting opposing thermoplastic layers. The melted thermoplastic materials are then fused together preferably by the application of a physical force—mechanical, magnetic, or some combination thereof—and allowed to cool to form a hermetic seal. In an alternate embodiment, a thermoplastic adhesive may be applied between the layers to be sealed together and the heat generated in the current carrying layer used to activate the adhesive to seal the layers together.

In the preferred embodiment, the longitudinal seal is formed by manipulating the web so that the edges to be sealed together are in alignment in opposition with the product contacting thermoplastic layer forming the tube interior. The web edges are then held close together and guided through an electromagnetic field radiated by the vertical seal coil. The electromagnetic field must be of sufficient energy to induce the currents needed to inductively heat and seal the web edges together.

The vertical seal coil is preferably an elongated coil folded about the web edges which pass between the current carrying faces of the coil. This configuration provides a concentrated electromagnetic field interior to the elongated current carrying conductors extending the length or height of the vertical seal coil, and induces currents in the polyfoil which generate opposing magnetic forces on the opposing current carrying layers of the polyfoil which attract to urge the layers together.

In the preferred embodiment, the longitudinal seal is formed one segment at a time while the web is continuously advanced. A control system energizes the vertical seal coil for a period of time to melt a length of web for forming a tube section. After a transverse seal is made, the control system again energizes the vertical seal coil before the trailing edge of the melted tube segment made previously passes beyond the effective range of the energized electromagnetic field to melt another length of web into tube so that adjacent lengths overlap. Thus, the length of the vertical seal coil, the energized time period and the period between energizations, the rate of web advance and the effective electromagnetic field intensity interrelate and must be adjusted so that the aggregate exposure time the advancing web is subjected to the effective electromagnetic field will sufficiently melt the thermoplastic for sealing all along the web length. Consequently, some of the longitudinal seal may be formed entirely during one energized vertical seal cycle, and some during exposure more than one cycle.

The present invention also can be adapted for machines that intermittently advance the web by energizing the vertical seal coil while the web is being advanced as described above, or while the web is stationary. In this embodiment, the length of advancement must be less than a vertical seal segment length to ensure that adjacent segments overlap.

A horizontal or transverse seal is formed by a transverse coil mounted in a sealing jaw of a sealing mechanism. The sealing mechanism is configured with a sealing jaw and an anvil jaw pivotally interconnected and a mechanism for opening and closing the jaws about the tube. The jaws are closed about the tube transversely under pressure so as to squeeze any product in the tube out of the clamping area, prevent fluid flow in the clamped area, and press the tube flat. The transverse coil is mounted in the sealing jaw so that it presents a current carrying conductor proximate to and preferably superimposed over the flattened tube in the clamped area. The transverse coil is then energized so that it generates a secondary electromagnetic field that impinges upon the tube in the clamped area.

The secondary electromagnetic field induces current in the current carrying layer of the tube. The density of this induced current and its duration must be sufficient to melt the opposing thermoplastic layers appropriately. The clamping force of the sealing mechanism compresses the melted thermoplastic layers so that they fuse together. When the transverse coil is deenergized, the fused thermoplastic cools, forming a hermetic seal. The sealing mechanism typically remains clamped for a sufficient period of time after deenergization to allow the thermoplastic to cool and form a homogeneous hermetic seal appropriate for aseptic packaging.

In the preferred embodiment, the transverse coil is configured as two conductor segments, the first for receiving the electromagnetic energy from an energized primary work coil that itself generates an electromagnetic field, and the second for generating the secondary electromagnetic field that impinges on and heats the seal area. The term "transverse coil" refers to both the energy receiving and energy radiating conductor segments of a secondary induction sealing coil as a single induction coil as described herein, whereas the terms "—sealing coil" or "—induction coil" refer to only the radiating conductor segment which causes inductive heating of the polyfoil.

The second segment, or transverse sealing coil, is preferably an elongated half loop of current carrying conductor which has a gap between the elongated conductors for receiving a knife blade which may be used to sever the tube in the clamped area to separate a filled and sealed package from the advancing tube. The elongated second segment is electrically connected in series to the first conductor segment, which is preferably a half loop, circular in configuration and mounted in a housing designed to focus the electromagnetic field of the primary work coil onto the first conductor segment to increase the efficiency of the power transfer from the primary work coil to tee transverse sealing coil. As the sealing mechanisms advance, the first or receiver segment is typically passed through the effective electromagnetic field generated by the primary work coil for a period of time sufficient to induce the necessary current in the second conductor segment. Close coupling factors may also be provided to improve the energy transfer efficiency.

The elongated second segment can provide a variety of sealing profiles in the clamped thermoplastic material. In part, the seal profile depends upon the lengths of heating and the desired electrical efficiency of the system, the ability of the sealing mechanism to press the product out from between the tube in the clamped area, the current distribution across the face of the elongated second segment, and the hermetic seal required.

In another embodiment, the transverse induction coil could comprise two elongated conductors extending across the clamped area, electrically connected in parallel with a single return conductor spaced away from the two conductors, e.g., passing around the back of the transverse coil face. A gap may be provided for receiving a knife blade for severing the tube while clamped through the sealed area. Such a coil arrangement would provide a more even secondary electromagnetic field than an elongated half loop conductor because the current induced around the polyfoil would all flow in the same direction. This would result in a single relatively homogeneous seal in the transverse clamped area. In contrast, the elongated half loop tends to provide two induced current paths in the polyfoil which mirror the current flow around the loop and tend to cancel each other midway between the current paths. This minimizes the induced current proximate to and mirroring the knife gap and may require a longer energized time to achieve the desired homogeneous seal.

In yet another embodiment, the transverse induction coil may provide a single broad conductor and a separate return which will relatively uniformly heat the clamped seal area. This configuration also presents a relatively even electromagnetic field and corresponding mirror image induced current in the polyfoil and an even pressing surface across the clamped area to provide a single homogeneous seal. In this embodiment, the packaging severing step would likely occur at another location, or else the knife blade could press into the coil face to sever a filled and sealed package.

In yet another embodiment, the transverse induction coil provides two elongated half loop conductors connected in parallel and arranged about a knife gap so that one loop is disposed on each side of the gap. The loops are electrically connected in parallel so that the current in the conductor segments proximal to the gap flow in the same direction and the currents in the distal conductors flow in the same direction; the current flow in the proximal segments being opposite to the distal segments and in the same plane. For example, the current could flow down the proximal conductors and return along the distal conductors. This particular embodiment is relatively more efficient than the embodiments having a return conductor spaced from the transverse induction coil face and not in a plane parallel to the clamped seal area. The twin loop configuration also provides the opportunity for tuning the two loops independently, so that the current distribution between the loops can be adjusted to provide relatively even heating of the clamped seal area on both sides of the knife gap, resulting in a homogeneous seal.

For each of the foregoing coil embodiments, a different power level and energization time may be required. One reason is that coil configuration of the loaded conductors and the location of the not loaded return conductor affects the electrical efficiency of the generator. Generator efficiency depends in part upon the proximity effect between the conductors and impedance matching at the generator output. The further apart the conductors are, the less efficient the system is and the more power required to drive the coil to achieve a sufficient seal. Further, each coil configuration has a different intrinsic impedance which is preferably matched or tuned to the generator output to minimize mismatch losses.

In the preferred embodiment, a plurality of sealing mechanisms are provided mounted on an endlessly advancing structure, preferably a rotating structure, more preferably, a rotating cylinder. The sealing mechanisms are spaced apart and arranged to sequentially transversely clamp the advancing polyfoil tube.

The primary work coil may be any coil capable of generating an electromagnetic field appropriate for inducing an adequate current in the first and thus the second conductor segments of the transverse coil.

In the preferred embodiment, the primary work coil is a multi-loop elongated oval, columnar coil that is designed to present an electromagnetic field density profile that induces a current in the the transverse coil as it traverses the field, while the primary work coil is energized, to obtain a transverse seal. Other coil configurations could be used such as circular coils or pancake coils. Appropriate adjustments to the first conductor segment of the transverse coil, the coil couplings, or the speed at which the transverse coils pass may be necessary to effect a proper seal.

Because the sealing mechanisms are spaced a distance apart, and the time required to create a transverse seal is relatively short as compared to the rate of advance of the sealing mechanism, it is an advantage of the present invention that the primary work coil need not be continuously energized. Consequently, the present invention also provides for both longitudinal and transverse sealing with a single induction generator, a coupling mechanism for directing the generated electromagnetic energy to either the longitudinal seal or the transverse seal, and a control circuit to control the power level generated by the induction generator, depending upon whether a longitudinal seal segment or a transverse seal is being made.

In the preferred embodiment, radio frequency currents are used from a single R-F generator. Radio frequency current permits using a thin current carrying layer in the polyfoil material and the transverse coils because the well known skin depth phenomenon, at radio frequencies, causes the current flowing in the conductor to be concentrated in a relatively-thin cross sectional area at the conductor surface. Therefore, thin conductors can be used so that the current induced in the polyfoil will pass throughout the foil layer of the polyfoil, and evenly heat that layer resistively, resulting in a shorter sealing time than would be necessary to heat a conductor having excess material, Further, thin transverse coils and vertical seal coils could be used making the equipment less massive and easier to cool.

In the preferred embodiment, the induction sealing cycle involves alternatively coupling the vertical coil to the r-f generator, preferably inductively, and energizing the vertical coil for a period of time at an appropriate power level to form a longitudinal seal segment on the web as the web advances. During this energization, the secondary transverse coils are not coupled to the r-f generator, inductively or otherwise. The power level and duration of the energization is controlled by the r-f generator control circuit in accordance with predetermined conditions selected for the coil dimensions, the coupling distance between the coil and the metallic layer of the polyfoil, and the polyfoil material composition. After the vertical seal segment is made, the vertical coil is decoupled, preferably mechanically by moving it out of the effective range of a first stationary primary work coil, which coil is preferably directly connected in series with the r-f generator output. Decoupling occurs so that subsequent energization of a transverse coil by the r-f generator does not also energize the vertical coil, even though the first primary work coil may be energized by the r-f generator when a transverse coil is energized.

Energization of a transverse coil follows vertical coil decoupling. Transverse coil energization involves moving a transverse coil into proximity to a second primary work coil, also preferably directly connected in series with the r-f generator output, as the transverse coil rotates with the rotating cylindrical wheel. The second primary work coil is then energized while the transverse coil is in or about to enter the effective range of the energized second primary work coil to inductively couple and energize the transverse coil for a period of time and at a power level sufficient to seal the web transversely. The power level and duration of the transverse coil energization also is controlled by the r-f generator control circuit.

As the advancing structure containing the plurality of sealing mechanisms continues to advance, the transverse coil will rotate out of the effective range of the electromagnetic field generated by the second primary work coil, effectively decoupling the transverse coils from the r-f generator. In the preferred embodiment, the spacing between transverse coils is such that the vertical seal energization occurs while no transverse coil is in proximity to the second primary work coil to be inductively coupled. Alternately, the r-f generator control circuit may deenergize the second primary work coil before the transverse coil is decoupled.

Next, the vertical coil is recoupled to the r-f generator and energized again to form a second longitudinal seal segment that overlaps the previously sealed segment to maintain a continuous seal. The vertical coil is then deenergized and decoupled. The next transverse coil rotates into proximity to the second primary work coil which is again energized to form the transverse seal for the following package.

The r-f generator, the coupling mechanism, and circuit control means continue to deliver the appropriate power alternately to the vertical coil and the succession of advancing transverse coils to make the longitudinal seal segmentally, and the plurality of spaced transverse seals. The energization times may range from continuous r-f generator energization at one or more power levels to very short bursts or pulses of energy at the same or different power levels, depending upon the web, the coil design, the rate of speed of the web, the distance between transverse coils on the advancing structure, and power capacity of the r-f generator used.

A typical form, fill, and seal machine utilizing the present invention may include a roll of continuous web stock; a sterilizing medium and a means for applying the sterilizing medium to the web to sterilize it, if aseptic packaging is desired; a tube forming section for folding the web into a tube with the longitudinal edges arranged in alignment and opposition, a vertical induction coil for sealing the longitudinal edges, and a source of sterile air for maintaining the sterility of the tube forming section; filler tubes for introducing a product into the tube as it advances at a controlled rate; a plurality of sealing mechanisms each comprising a sealing jaw and an anvil jaw, one of the jaws being mounted on a means adapted for endless advancement including a means for opening and closing the sealing jaw and anvil jaw sequentially about the tube to clamp the tube tranversely to envelope the desired amount of product, each sealing jaw having a transverse coil and a transverse induction coil loop for sealing the opposing thermoplastic layers clamped together when energized; a severing means mounted in each sealing mechanism for severing the transverse seal to separate the sealed package from the tube; an induction generator, preferably a radio frequency induction generator, and coupling means for providing electromagnetic energy to energize each of the vertical and plurality of transverse coils; a radio frequency generator control circuit for controlling the generation and distribution of electromagnetic energy from the generator to the vertical and transverse coils, drive means for controlling the web advance and the speed of the sealing mechanisms and other forming apparatus and a microprocessor for controlling machine operation in accordance with a predetermined set of operating conditions.

It is to be understood that while the present invention is discussed in the context of producing quarter-liter aseptic packages, one skilled in the art could use the method and apparatus in other areas including, but not limited to, packages of different sizes, non-aseptic packages, or packages that must be kept refrigerated, as well as intermittent web fed type machines. Therefore, the foregoing and following description is to be viewed as illustrative and not in a limiting sense.

BRIEF DESCRIPTION OF THE DRAWINGS

FIG. 5a is a cross-sectional view of FIG. 5 taken along line 5a—5a.

FIG. 5b is a cross-sectional view of FIG. 5 taken along line 5b—5b.

FIG. 5c is a cross-sectional view of FIG. 5 taken along line 5c—5c.

FIG. 5d is a cross-sectional view of FIG. 5 taken along line 5d—5d.

FIG. 5e is a cross-sectional view of FIG. 5 taken along line 5e—5e.

FIG. 5f is a cross-sectional view of FIG. 5 taken along line 5f—5f.

FIG. 5g is a cross-sectional view of FIG. 5 taken along line 5g—5g.

FIG. 6 is a rear sectional view of the web folding and vertical seal section of the machine of FIG. 1.

FIG. 11 is a top sectional view of FIG. 8 taken along line 11—11.

FIGS. 14, 15, and 16 are respectively the top, side, and rear sectional views of the vertical seal induction coil, relative to the views of FIG. 1, in accordance with the present invention.

FIG. 14a is an elevated perspective view of the vertical seal induction coil of FIG. 14.

FIG. 28 is a top view of a transverse sealing induction coil assembly in accordance with the present invention.

FIG. 29 is an end view of FIG. 28 taken along line 29—29.

FIG. 30 is a face sectional view of FIG. 28 taken along line 30—30.

FIG. 31 is an end sectional view of FIG. 30 taken along line 31—31.

FIG. 32 is an end sectional view of FIG. 30 taken along line 32—32.

DETAILED DESCRIPTION OF THE INVENTION

Figure 1:
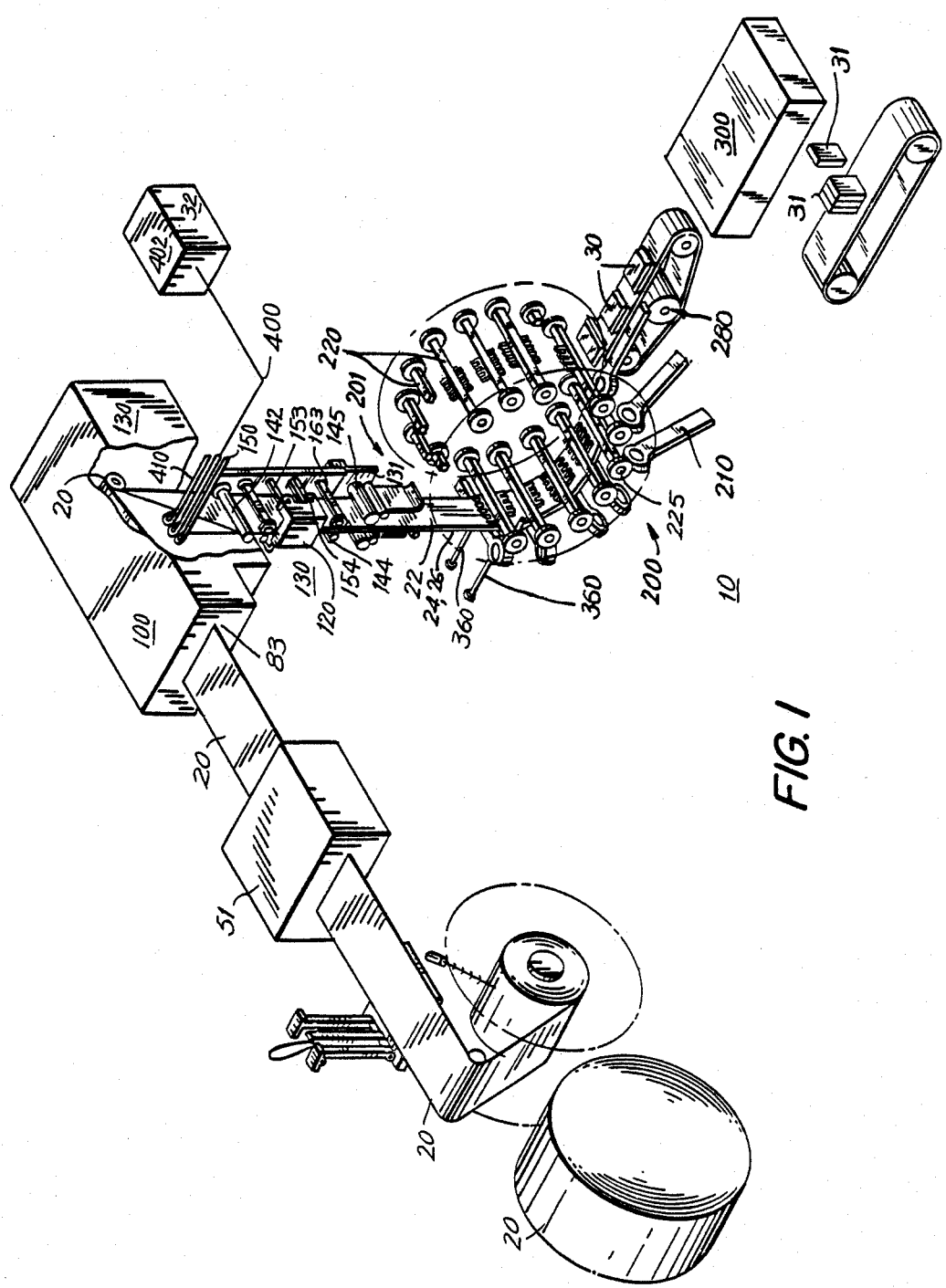
FIG. 1 is an elevated perspective view of an aseptic package forming, filling, and sealing machine adapted for using the present invention.
Figure 13:
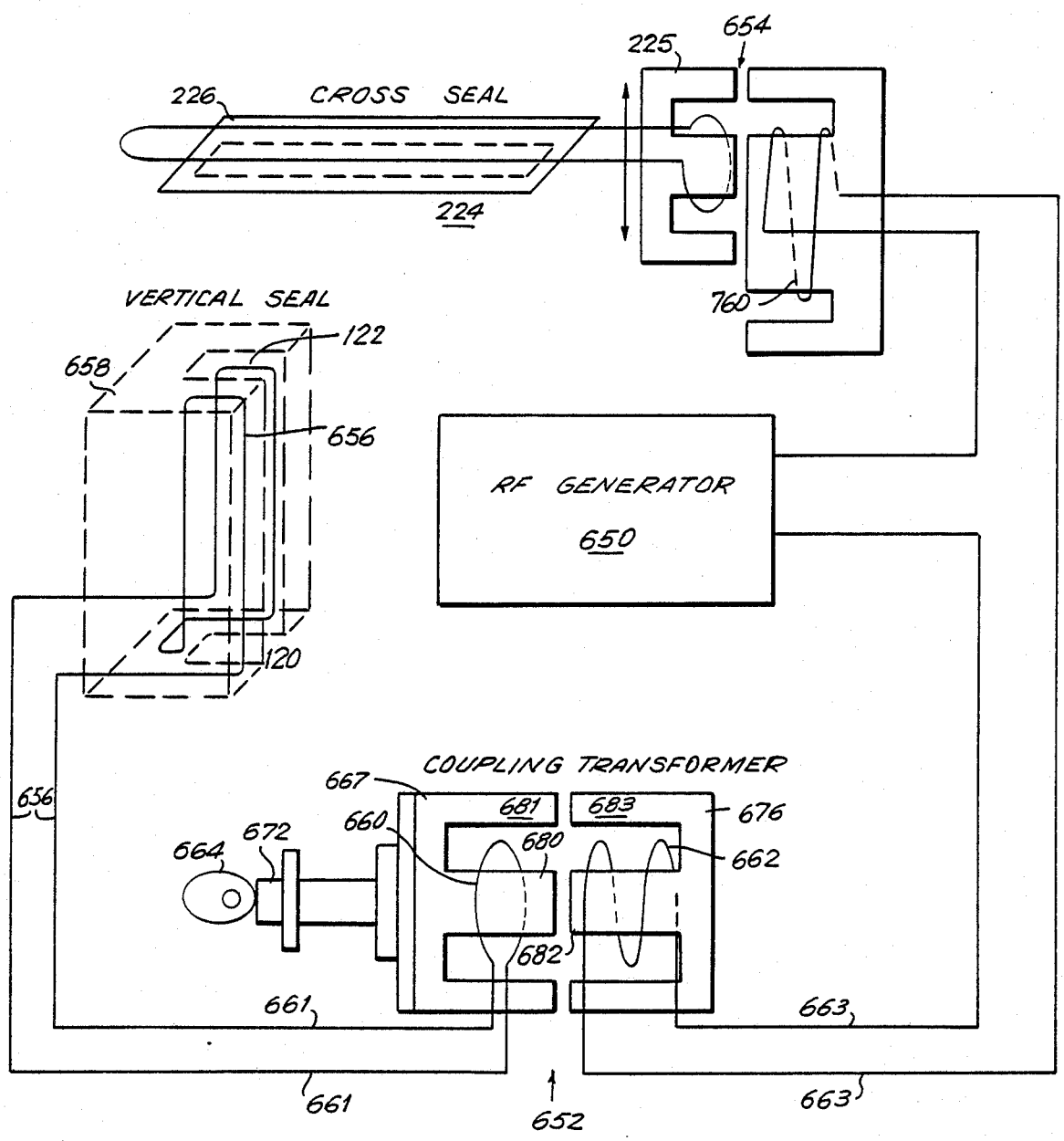
FIG. 13 is a schematic diagram of the radio frequency heat sealing assembly of the present invention.

As shown in FIGS. 1 and 13, an illustrative embodiment of this invention is useful in connection with form, fill, seal, and brick machine 10, which may be a microprocessor controlled apparatus that produces finished polyfoil packages 31 filled with product 32 by passing polyfoil web 20 into machine 10 through scoring area 51, passing scored web 20 into area 100, preferably cleaned and presterilized, to sterilize web 20, forming web 20 into polyfoil tube 22 by sealing web edges 24 and 26 together in vertical seal area 130, filling tube 22 with product 32 through filler tube 400, passing filled tube 22 into endlessly advancing apparatus 200 (also referred to as a "structure" or "cross seal wheel") to transversely clamp, seal, sever, and brick tube 22 into discrete preformed packages 30 which are then formed into finished containers 31 by tacking flat against the side panels of package 30 the seams and tabs created in forming package 30 as it advances. The apparatus may be driven intermittently or, preferably, continuously in a controlled fashion as known to those of skill in the art.

Figures 2, 3:
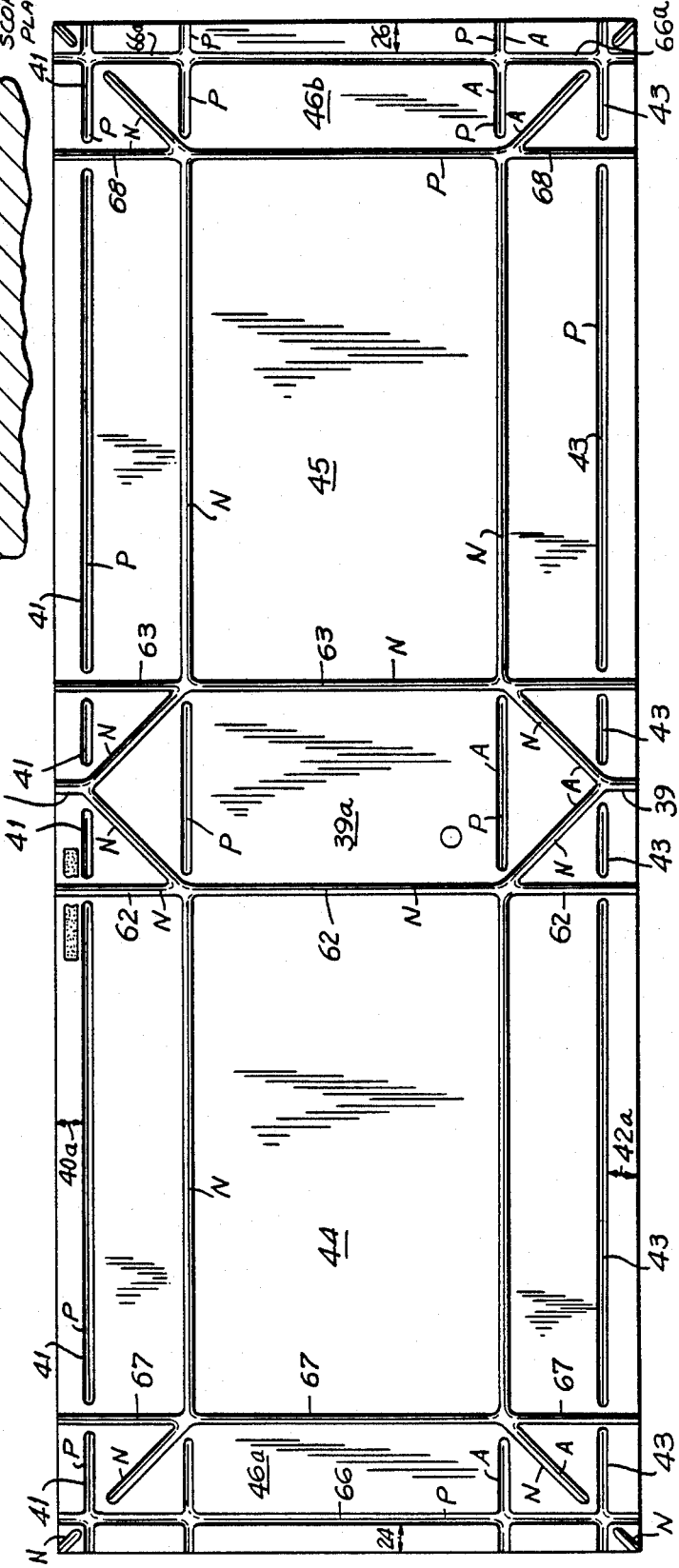
FIG. 2 is a top view of a polyfoil web material corresponding to one package, after scoring, for use in accordance with the present invention.
FIG. 3 is a cross-sectional view of the scoring section of the machine of FIG. 1.
Figure 4:
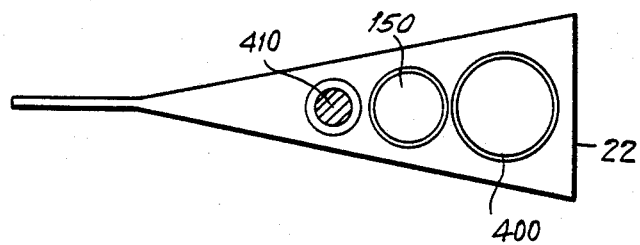
FIG. 4 is a top sectional view of the product fill tubes of the machine of FIG. 1.
Figure 7:
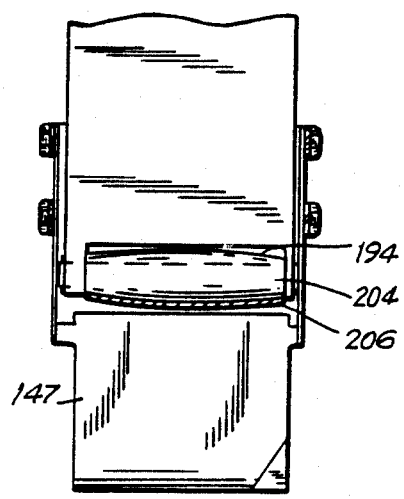
FIG. 7 is a side view of the lower guide portion of the web folding and vertical seal section of FIG. 6.

The web may be scored conventionally, e.g., using coacting scoring rollers as it is taken off the supply or before being rolled into a supply of web. See FIGS. 2 and 3. The scoring provides positive P and negative N score lines so that the web is predisposed to being folded in a particular direction based on the score patterns and can be easily folded into the desired finished brick.

For aseptic packaging, the web is cleaned and sterilized and maintained in a sterile environment at least until after the product containing package is completely transversely sealed in accordance with known procedures not forming a part of the present invention. Sterile air is blown inside of tube 22 to maintain aseptic sterility of the product filled tube before the tube is filled and sealed transversely.

Preferably, the longitudinal seal is made by manipulating, bending or curving web 20 so that the edges are aligned longitudinally and the inside thermoplastic layers of opposing web edges are sealed together. Alternate constructions of tube 22 could include sealing the web edges inside to outside in an overlapping fashion, sealing together multiple pieces of web or using spirally wound web to form the tube or placing a heat activated adhesive between two opposing web pieces. Conventional forming mandrels or similar forms may be used with the appropriate rollers and guide means to manipulate the web.

Referring to FIGS. 4, 5, and 5a-5g, in the preferred embodiment web 20 is pulled across web guide plate 74 so that web edges 24 and 26 are restrained by the flanges of guide 74. The flanges are angled relative to each other and form a v-shape to cause web 20 to gradually increase its concavity and bend over with web edges 24 and 26 becoming parallel, aligned and superimposed (FIG. 4) and the balance of the web having a triangular cross sectional configuration as predetermined by the score lines in the web and the rollers and forms used to manipulate the web into tube 22. The triangular configuration desirably reduces the number of surfaces that must be controlled to advance and control the alignment of the web as it is longitudinally sealed.

Referring to FIGS. 13-16, 14a, and 18-20, vertical seal induction coil 120 comprises a multiple loop coil with half the loops evenly spaced on opposite sides of a longitudinal channel or groove 122 extending along and between the elongated side loop sections of coil 120. The folded loop configuration increases the radiated field intensity and more evenly distributes the secondary electromagnetic field radiated by coil 120 when energized by r-f generator 650 through coupling mechanism 652 than would a flat coil. The evenly distributed magnetic field provides for an evenly distributed induced current in, along, and across the current carrying layers of polyfoil web edges 24 and 26 as they advance through the U-shaped groove 122 and provides moderately even heating of the facing thermoplastic layers and, upon cooling, a substantially consistent longitudinal hermetic seal. Groove 122 is adapted to receive web edges 24 and 26 and to keep them aligned while passing therethrough for heating and sealing together when coil 120 is activated. The web entrance may have a chamfer of, e.g., 60°, to ease threading web 20 into the groove. See FIG. 18. The loop of vertical seal coil 120 comprises conductive tubing 656 and center tap ground 656a, which maybe secured in nonconductive rigid housing 658, e.g., epoxy, a G-10 epoxy fiberglass material, plastic, or the like. Conductive tubing 656 is preferably hollow copper tubing adapted for having a cooling medium such as water flowing therethrough. Center tapped ground 656a is electrically connected to conductor 656 at location 657 to prevent current arc over to the web during operation. Spacer members 655a and 655b shown in FIGS. 24b and 24c may be used to hold the coil and conductor leads spaced apart in alignment in housing 658 and coil 120.

Figure 8:
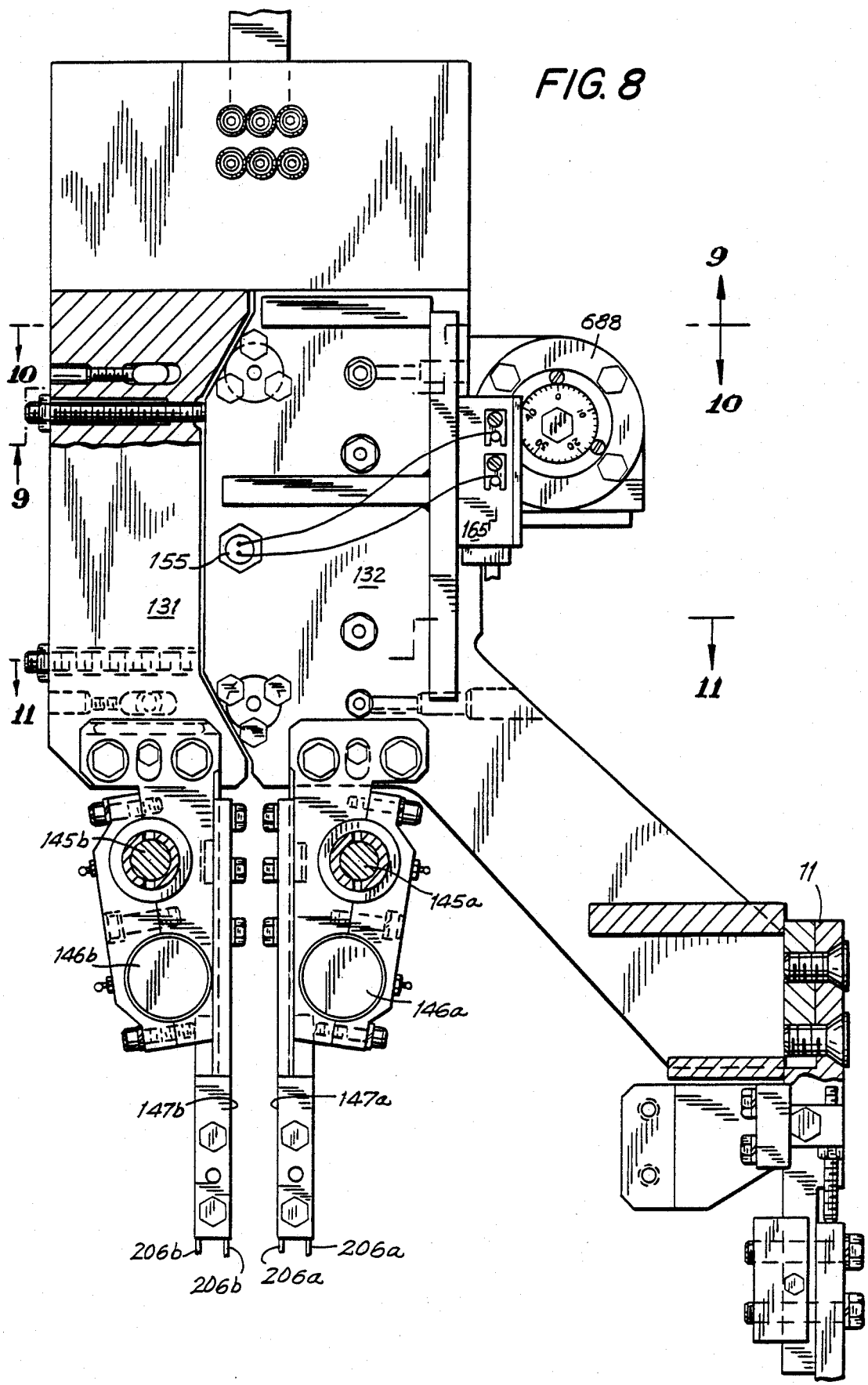
FIG. 8 is a side sectional view of FIG. 6 taken along line 8—8.
Figure 9:
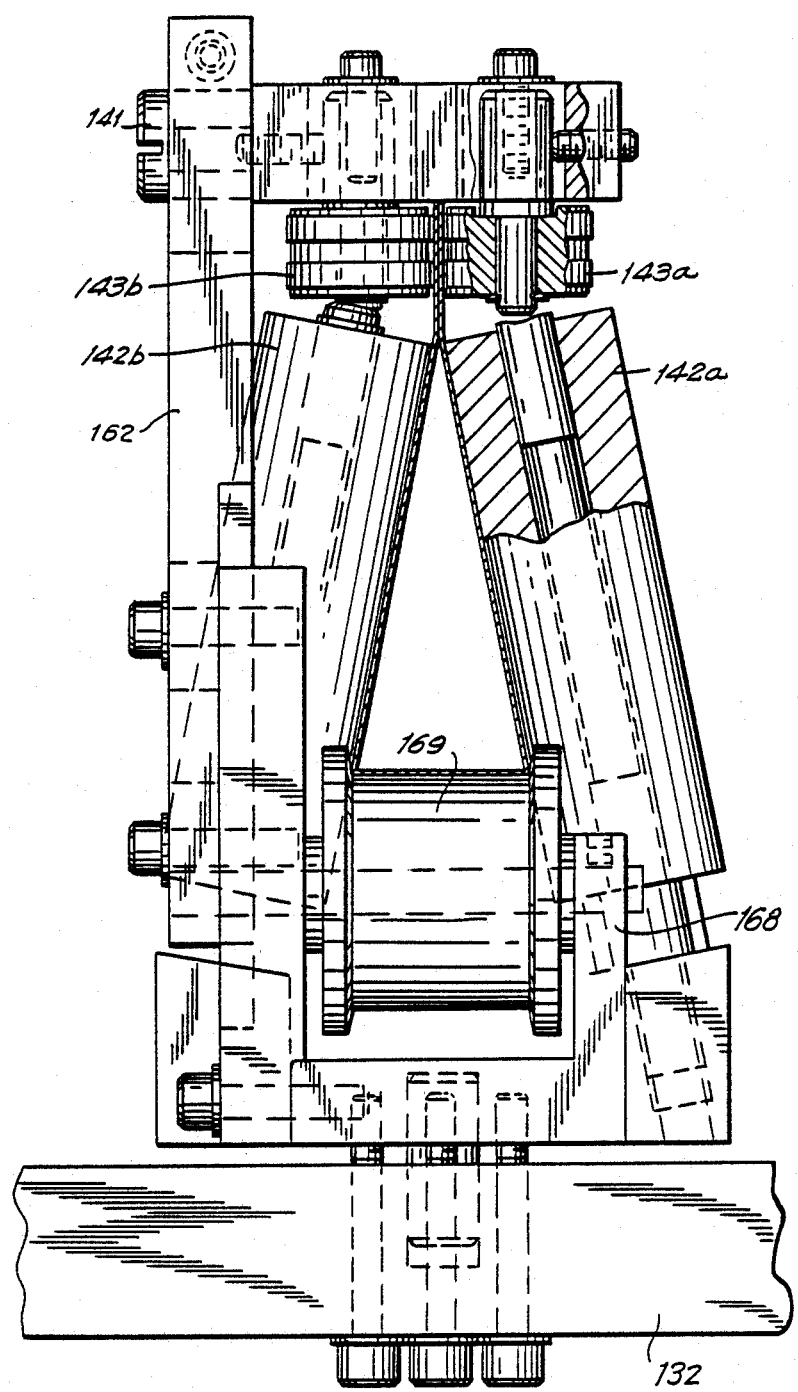
FIG. 9 is a top sectional view of FIG. 8 taken along line 9—9.

Coil 120 is securely mounted on posts 153 and 154 of frame 132 (see FIGS. 6, 8) of machine 10 to minimize any shift under normal operating conditions, and particularly, under the various electromagnetic forces present when coil 120 is energized, deenergized and changing from one state to another.

The induced currents in the opposing polyfoil web edges also produce respective secondary electromagnetic forces of a magnitude related to the induced current density distribution in the edge. The forces, being of opposite polarity, attract. Thus, web edges 24 and 26 in groove 122 exposed to the magnetic field generated by coil 120 will attract and adhere to each other as the thermoplastic softens and melts, fusing together.

In the preferred embodiment, pinch rollers 143a and 143b are located above induction coil 120 and arranged to add physical forces forcing the edges of web 20 together before heating and to align the current carrying foil (in conjunction with groove 122) into superimposed parallel planes to be excited by the electromagnetic field.

In the preferred embodiment, the longitudinal seal is formed by intermittent energization of vertical coil 120 and becomes the bottom seal of the package across the package width. The length of the vertical induction coil 120 is approximately equal to or greater than a flattened package width so that longitudinal length of tube 22, corresponding to at least the bottom seal, will pass through the electromagnetic field generated by the vertical coil 120 while the vertical coil 120 is energized. The rate of web speed and time period that the coil is energized and radiating an electromagnetic field are coordinated as described below in more detail so that the opposing thermoplastic layers will effectively fuse and hermetically seal as a continuous seal, preferably formed in overlapping segments.

Figure 10:
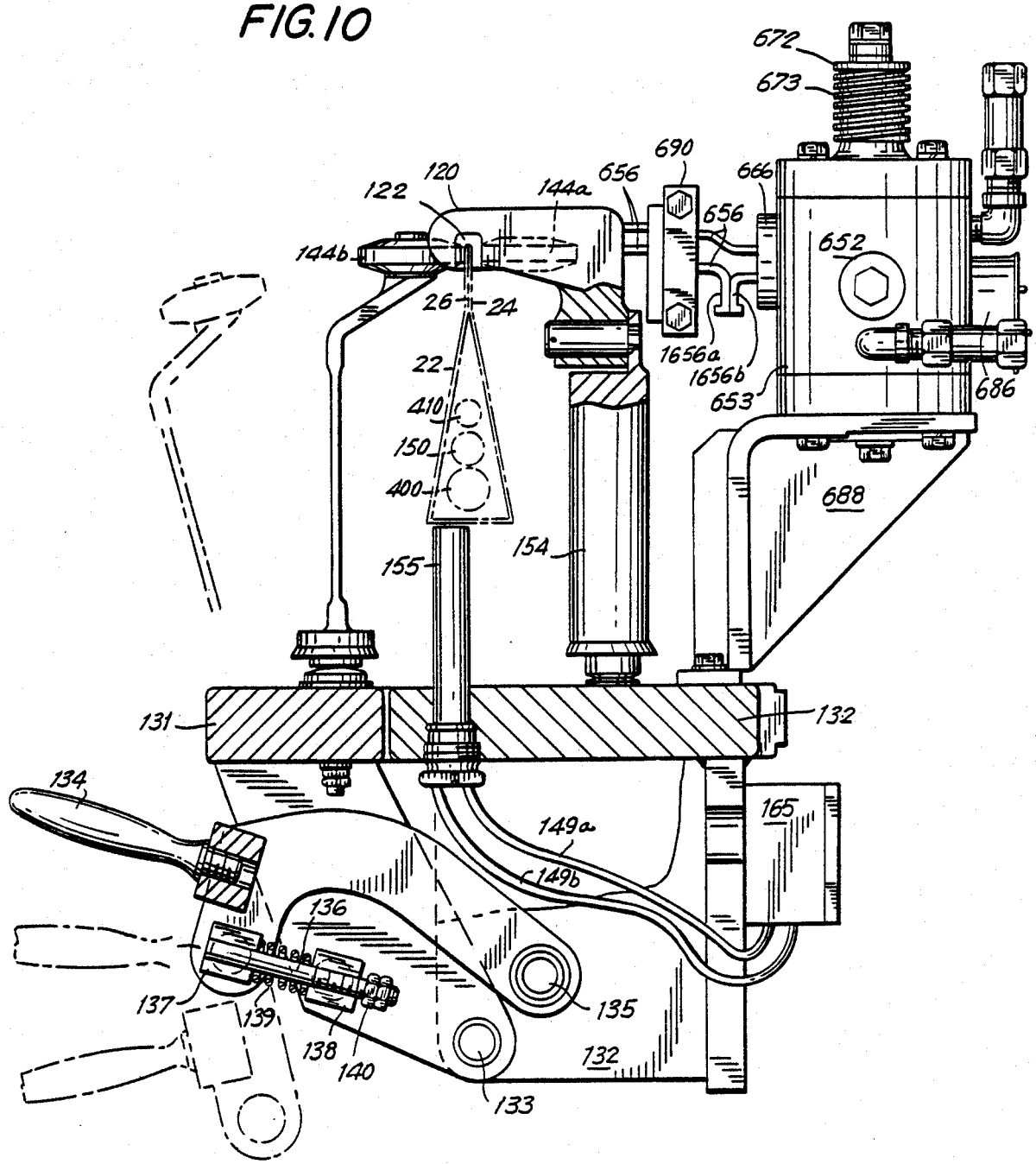
FIG. 10 is a top sectional view of FIG. 8 taken along line 10—10.

Referring to FIGS. 6, 9, 10 and 11, tube forming section 130 comprises sets of cooperating rollers and guide members mounted on subframes 131 and 132 mounted on frame 11 of machine 10. Subframe 131 is pivotally connected to subframe 132 at post 133 so it can be opened (shown in phantom lines) for manually feeding web 20 into the proper folded orientation, maintenance, or other machine or web adjustments, and closed (shown in solid lines) for machine operation. Handle 134, shown in FIG. 10 is used to open and close subframe 131 relative to subframe 132 in a conventional spring loaded manner.

Figure 12:
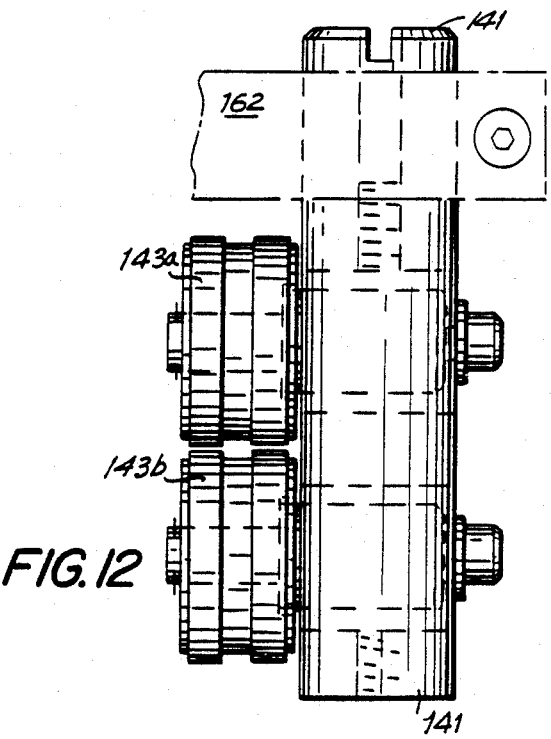
FIG. 12 is a top sectional view of FIG. 6 taken along line 12—12.
Figure 5:
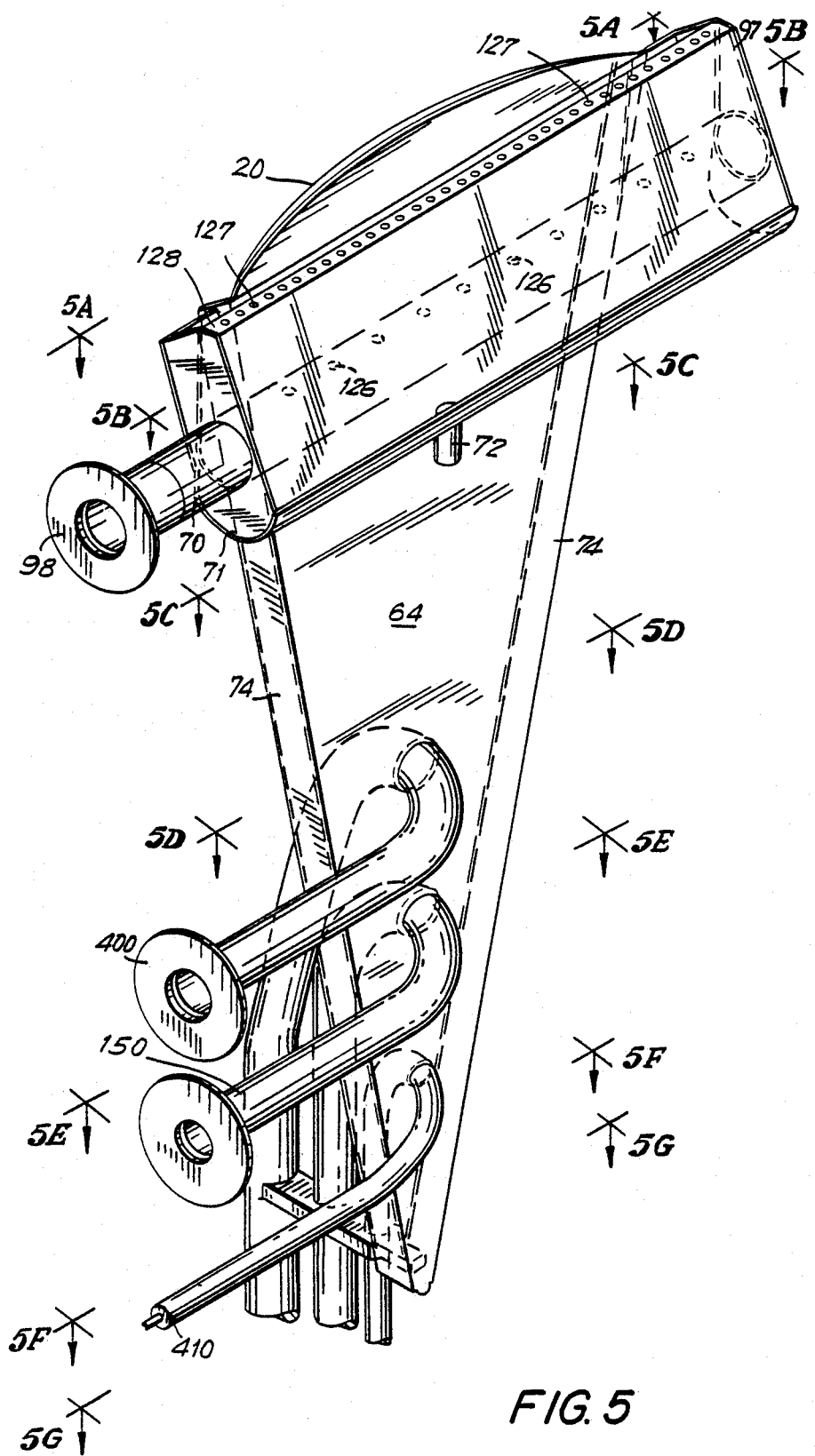
FIG. 5 is an elevated perspective view of the web folding section of the machine of FIG. 1

The corresponding paired elements mounted on each of subframes 131 and 132 that are substantially similar in structure and function and arranged in opposition are indicated with the "a" suffix, corresponding to subframe 132, or the "b" suffix corresponding to subframe 131 unless otherwise specified. For ease of explanation, only one element may be discussed although the discussion also applies to the opposing element. Guide rollers 142a and 142b are angled towards each other and angled downwardly from subframe 131 and 132 to urge the web side panels 44 and 45 (see FIG. 2) toward each other at an angle, folding web 20 about score lines 62 and 63 into substantially triangular tube 22. Opposing longitudinal seam pinch or nip rollers 143 press web edges 24 and 26 together superimposed and in alignment under pressure to assist in controlling web advance into coil 120. Rollers 143 are canted at an angle, e.g., ten-fifteen degrees to the web (See FIGS. 6, 12), to help urge the very edges of the web into alignment in conjunction with groove 122 to assure a straight and even longitudinal seam. After web 20 has passed coil 120 and is formed into tube 22 by the high frequency electromagnetic forces in coil 120, the seal is passed through nip rollers 144a and 144b while the thermoplastic layers of web 20 are still hot so that opposing thermoplastic layers will fuse together better to form a homogeneous hermetic seal. Edge 24 is the web portion outboard to score line 66 and edge 26 is the web portion out board of scoreline 66a (see FIG. 2). As shown in FIGS. 6 and 12, rollers 143 are mounted at the end of yoke 162 on a post 141 spaced apart a distance to pinch and exert a force sufficient to press and urge the edges together in alignment. The rollers are canted, i.e., fixed at an angle about post 141 relative to tube 22 so that as the rollers rotate as the web advances, there is a force component directed perpendicular to the edges of the web to urge the edges in alignment towards and possibly against groove 122 of longitudinal coil 120. Rollers 144 are mounted at the ends of arms 163 and are urged together under tension with a force sufficient to press the heated web edges together.

The inclusion of rollers 144 may permit using less electrical energy at the induction coil which would result in lower magnetic forces due to the secondary electromagnetic field and still have sufficient induced currents to soften the thermoplastic appropriately. The mechanical force provided by roller 144 makes a good seal. Preferably, the longitudinal seal will be made on what will be the bottom panel of the package for both aesthetic reasons and packaging reasons not forming apart of this invention.

Associated with rollers 143 is free running back roller 169 oriented to contact tube 22; but rotated 90° in the horizontal plane. Roller 169 is preferably about the same width as finished brick 31 and is pivotally mounted in bracket 168 to contact the area of web 20 between score lines 62 and 63 in order to aid in triangulating and squaring what will be the top of brick 31 as the vertical or longitudinal seal is made.

Driven rollers (or pulleys) 145a and 145b are provided, spaced a distance apart, and are driven with opposite rotations to advance tube 22 through tube forming section 130.

As it advances, tube 22 is transversely clamped by one sealing mechanism after another to fix substantially the same volume of product and amount of web between sealing mechanisms for each package, and then sealed in the transversely clamped area. Optionally, the sealed tube may be severed in the sealed area to form packages 30 by severing means mounted in the sealing mechanism or located elsewhere on machine 10.

Referring to FIGS. 1, 33, 34, and 35, machine 10 is shown, incorporating the present invention with respect to transverse sealing and the transverse tube clamping, sealing, and severing operation. In the preferred embodiment, tube 22 advances downwardly and approaches the beginning of the tranverse clamp and seal area at location 201. Cross seal wheel 200 and housing 199 contain a plurality of sealing mechanisms secured to flanges extending from wheel 200. Cross seal wheel 200 is rotated about its axis spindle 198, driven by a conventional drive source (not shown) affixed to the end of spindle 198, under the control of a microprocessor.

In the preferred embodiment there are fifteen identical sealing mechanisms for making fifteen transverse seals for fifteen complete packages per revolution; but this number could be changed with corresponding machine design changes to accomodate more or fewer packages per cross seal wheel revolution. Similarly, the cross seal wheel or sealing mechanism dimensions could be modified to correspond to a particular size package.

Each sealing mechanism includes sealing jaw 220 which is aligned with and spaced from the central axis of cross seal wheel 200, and anvil jaw 210 pivotably connected at one end to both cross seal wheel 200 and sealing jaw 220 by hinge apparatus 240. Hinge apparatus 240 controls in a fixed plane movement of anvil arm 210 between its fully open position and fully closed position relative to sealing jaw 220. In the open position, anvil jaw 210 extends from cross seal wheel 200 so that it will clear the machine apparatus as the wheel advances and the arm swings about its path. In the closed position, anvil jaw 210 is held parallel to sealing jaw 220 and retained in place. Hinge apparatus 240 also provides for locking anvil jaw 210 to sealing jaw 220 during the transverse clamping because of the force distribution exerted on the various pivot points. Preferably other means provide an additional high pressure clamping force to keep the jaws closed securely during the clamping operation. For example, a high pressure cam track mounted on frame 11 or housing 199, may be adapted for urging cam follower 222 (see FIG. 33), rotatably mounted at the unhinged end of anvil jaw 210, towards sealing jaw 220. The cam track may extend along an arc-length in the transverse clamping, sealing, and severing area or wherever the added closure force is desired.

In operation, a location on tube 22 is selected and transversely clamped between anvil jaw 210 and sealing jaw 220. The transverse sealing area is defined, with reference to FIG. 2, as comprising panels 40a and 42a, respectively above and below scorelines 41 and 43, and the opposing areas when web 20 is folded about score lines 39 (but not creasing panel 39a) during transverse clamping. The force exerted on tube 22 by the sealing mechanism must be sufficient to flatten tube 22 so that substantially all the product is removed from between the tube area to be sealed flat and the inner thermoplastic layers of tube 22 are in contact for fusion when heated as described below. The force must also be sufficient to fix the volume of product in the unsealed but clamped tube segment. The clamping pressure is controlled by compression springs and close mechanical tolerances which accomodate clamping and other motion as cross seal wheel 200 rotates, to ensure an adequate seal and, preferably, to maintain sufficient pressure to permit passing a cut off knife through the web without dragging paper through.

Figure 33:
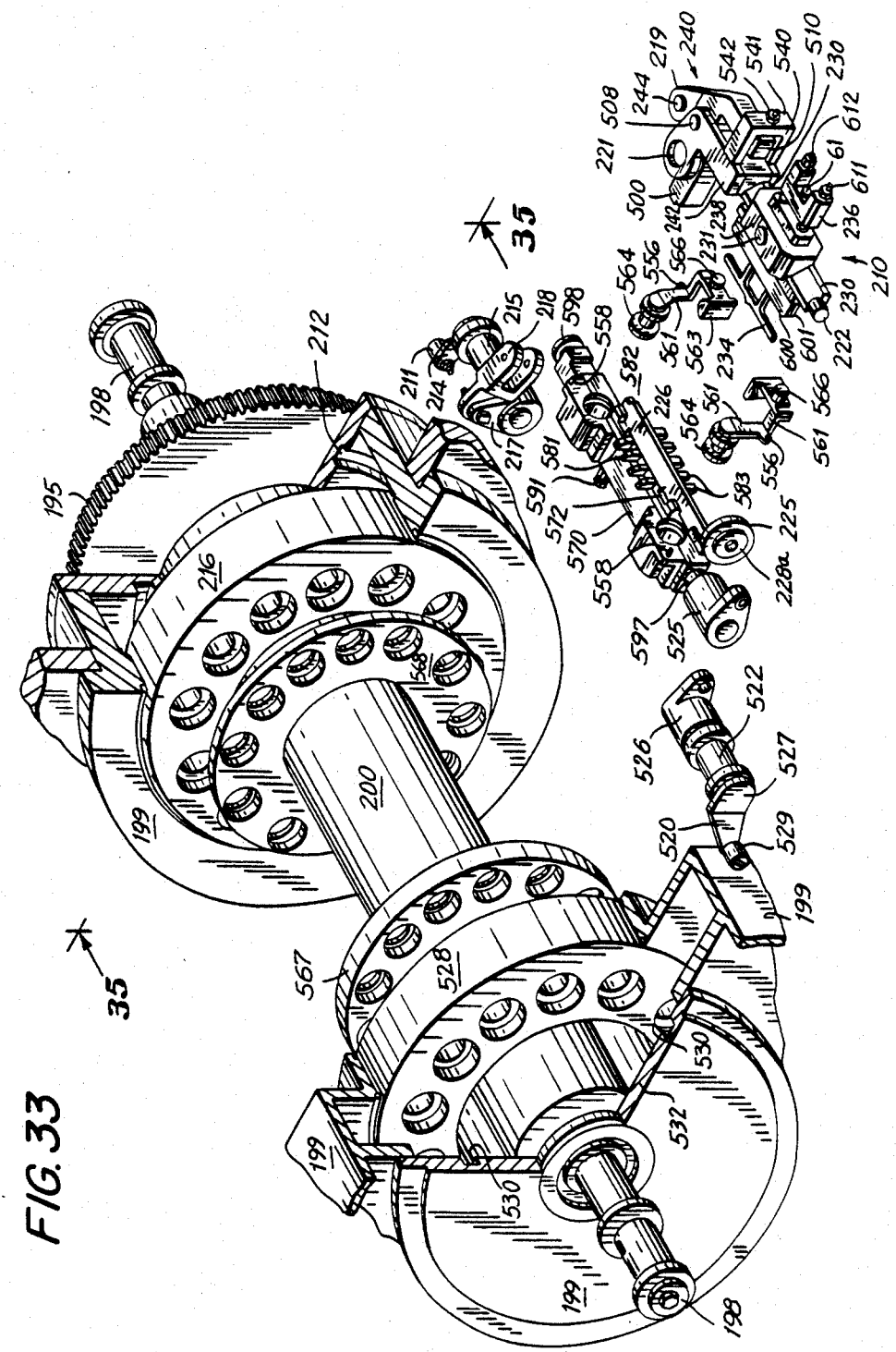
FIG. 33 is a partial exploded elevated perspective view of the sealing mechanism and mounting of the machine of FIG. 1.
Figure 34:
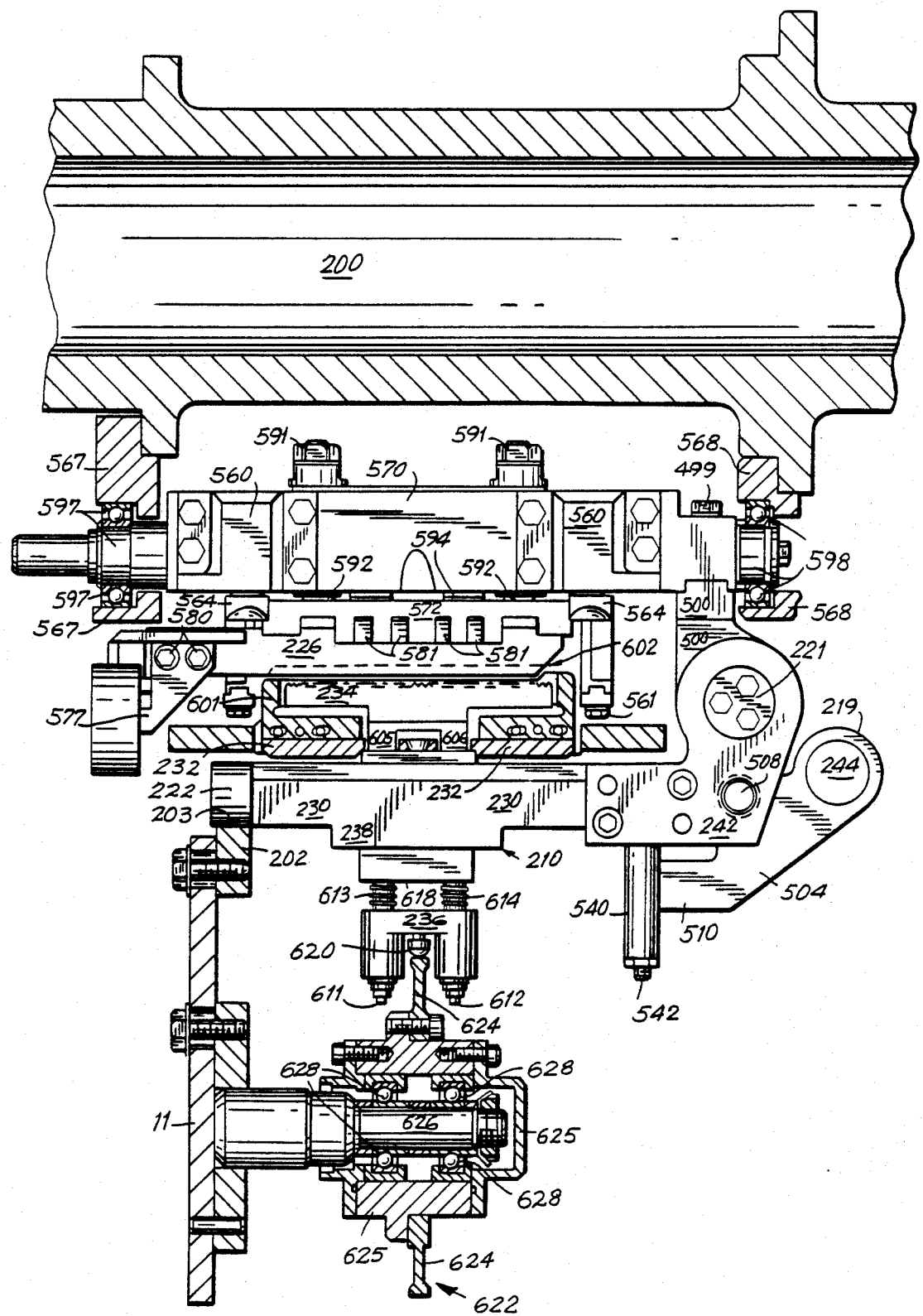
FIG. 34 is a top cross sectional view of a sealing mechanism of the machine of FIG. 1.

Referring to FIGS. 33 and 34, apparatus 240 comprises hinge 242 and pivot 244. Hinge 242 is pivotally mounted to cross seal wheel 200 at pivot 221 on member 500 and to anvil jaw 210. Lever 504 is pivotally mounted to hinge 242 at pivot 508 which is arranged at a location that can be shifted along a radius extending from the center of pivot 221. Lever 504 contains boss 219 and arm 510. Arm 510 is mounted so that it extends into yoke 540, an overload means to unload pivot arm 510 and cam follower 211 so the clamping can primarily rely on high pressure cam 202. Yoke 540 may have a compression spring or piston to absorb energy to prevent pressure exerted by arm 510 from affecting the mechanical integrity and orientation of anvil arm 210.

The other end of lever 504 contains boss 219 which contains pivot 244 and may be pivotally connected to a pushrod which is connected at its other end to a cammed twin lever arm fulcrum system. The cammed twin lever fulcrum system uses two lever arms to transfer the rotational movement of cross seal wheel 200 through cam 532 into translational movement of pushrod 218 to open and close anvil jaw 210 about its pivot point 221. Cam follower 211, connected to lever arm 214, moves along cam 532 and any change in position of cam follower 211 relative to the axis of cross seal wheel 200 will cause a proportionate rotational change in position of lever arm 214 at about the point of connection to pushrod 218. Therefore, a noncircular path in the groove of cam 532 causes lever arm 214 to rotate and thereby causes pushrod 218 to translate in or out which causes anvil jaw 210 to open and close as the cam follower shifts. The cammed twin lever fulcrum system for each sealing mechanism is preferably adjusted so that all fifteen sealing mechanisms are at same angle and close to pick up the same amount of web.

Figure 35:
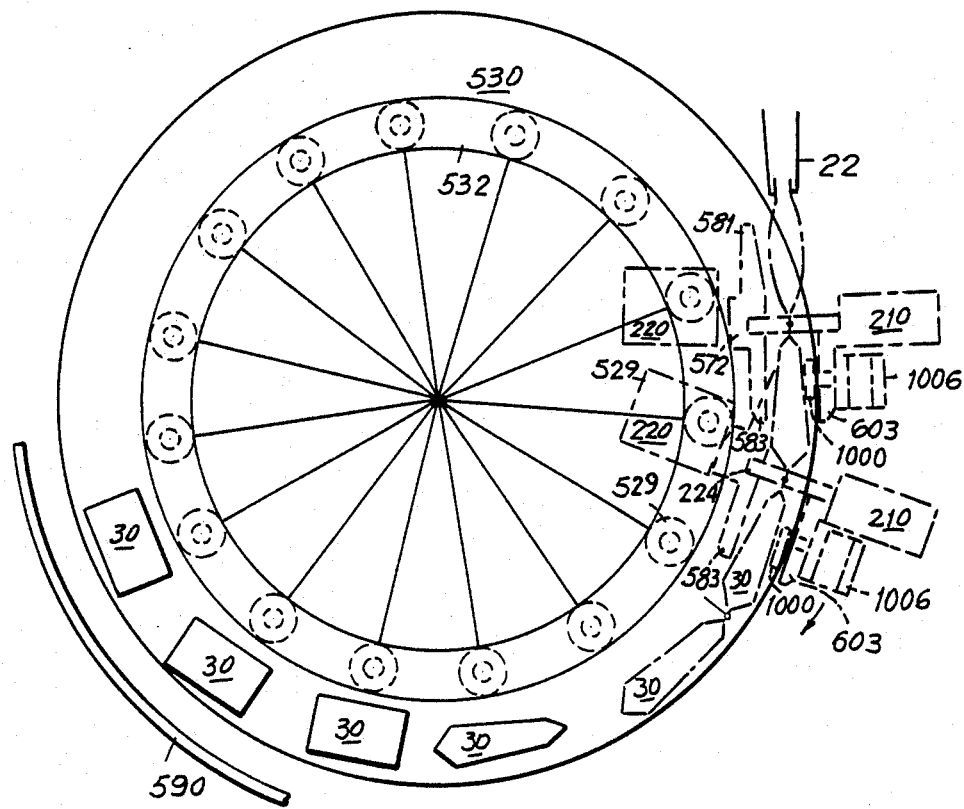
FIG. 35 is a side sectional view of FIG. 33 taken along line 35—35.

Referring to FIGS. 33–35, anvil jaw 210 comprises arm 230, boss 238, head 232, cutting means 234, and cutting drive means 236. Arm 230 is an elongated structural support member and may be made of any material capable of withstanding the force requirements of pressing and cutting, for example, reinforced phenolics, nylons, epoxy fiberglass composites, stainless steel, aluminum and the like. Boss 238 extends from the center of arm 230 and houses cutting means 234 and cutting drive means 236.

Extending along the front surface of arm 230 is head 232 which comprises parallel anvil surfaces 600 and 601, flange 603, and bolts (not shown) for securing head 232 to arm 230. Anvil surfaces 600 and 601 are spaced apart a distance sufficient to permit passage therebetween of cutting means 234. Preferably, cutting means 234 is a knife having a sharp cutting blade surface capable of severing flattened tube 22. Knife 234 may have a serrated edge or a straight edge. Anvil surfaces 600 and 601 may be coated with an abrasive resistant material to reduce wear, a release material that promotes separation of sealed packages 30 and the sealing mechanism as anvil jaw 210, or both.

Referring to FIGS. 28–34, sealing jaw 220 comprises support member 570, transverse coil 224, and mounting bracket 572 for connecting transverse coil 224 to member 570. Transverse coil 224 comprises two current carrying faces, circular receiver coil 225 and elongated transverse induction coil 226, electrically connected in series so that the current induced in receiver coil 225 also passes through elongated transverse induction coil 226.

Receiver coil 225 is preferably designed to maximize the current induced therein as the coil passes through an electromagnetic field radiated by intermediary induction coil 760 in coupling mechanism 654 (see FIG. 13). In the preferred embodiment, receiver coil 225 comprises a single turn substantially circular loop of high current carrying conductor, e.g., copper, mounted in a housing or support member for concentrating the electromagnetic energy.

One advantage of the configuration shown in the Figures is that no means for cooling the transverse coil is required. However, other configurations requiring cooling may be used, for example, using heat dissipating fins or a circulating cooling fluid.

Conductive loop 228a (FIG. 29) may be imbedded in dielectric or insulating material 575 within a channel in rigid support member 576 to prevent coil section 225 from short circuiting, arcing, or physically shifting under the electromagnetic forces it is subjected to. Rigid support member 576 may be ferrite or other magnetic material to concentrate the electromagnetic radiation to maximize the current induced in coil 225 and to electrically couple the field from primary coil 760 to conductive loop 228a of coil 225.

Elongated transverse induction coil 226 is designed with a thin and relatively broad current carrying face 227 to generate an electromagnetic field that will induce currents in the metallic foil layer of the polyfoil web tube 22 in the area immediately adjacent and opposing faces 227 of elongated coil 226. In the preferred embodiment, elongated coil 226 is a half turn loop of solid current carrying conductor 228b, e.g., copper, mounted on flanges 229, covering much of face 227 of elongated coil 226 and adapted with an interior gap to receive the cutting edge of cutting means 234 after it severs tube 22. Other current carrying conductors could be used, particularly those having greater wear or deformation resistance such as molybdenum and the like.

Because of the well known skin depth phenomenon at radio frequency currents, a relatively thin layer of current conductor 228b may be used. The thin conductor will distribute the current flowing in transverse coil 224 across the width and length of flattened tube 22 and form the desired seal area corresponding to face 227 as long as the conductor is thick enough to satisfactorily conduct the current density required to melt the polyfoil without the conductor itself melting. Conductor layers having a thickness of about 0.020 inches, laid on rigid support member 572, e.g., reinforced phenolics, graphite, epoxy fiberglass, ceramics, or similar substantially nonconducting compositions, may be used.

Abrasive resistant material 573 may cover conductor 228b in a relatively thin coating to prevent wear. Material 573 may also include release promoting materials to promote release of the exterior thermoplastic coating of tube 22 from face 227 after the seal has been made. Material 573 may also include a dielectric or insulating material to prevent transverse coil 224 or elongated transverse sealing coil 226 from shorting or arcing during use, thereby preventing spot burns on tube 22. Material 573 also may have a high thermal conductivity so as to conduct heat away from elongated coil 226 when not excited, thereby maintaining transverse coil 224 cool by conduction. Alternately, material 573 may have a low thermal conductivity to prevent the heat generated by current flowing in conductor 228b from conducting therethrough to soften the outer thermoplastic layer of tube 22, but sufficient to permit conductor 228b and coil 226 to cool before being energized during the next cycle.

In the preferred embodiment, receiver coil 225 is bolted at right angles to elongated coil 226 by bracket 577 and bolts 580. Conductive buss bar 578 connects one end of conductor 228a of coil 225 to one end of conductor 228b of coil 226, and conductive buss bar 579 connects the other ends of conductors 228a and 228b of coils 225 and 226 together, thus forming the single turn transverse coil of the preferred embodiment.

Conductor 228b extends around the back side of coil 226 and cooperating bolts and apertures 571 mount coil 224 to bracket 572 and electrically ground the center tap of coil 224 to machine frame 11. This achieves the same benefits discussed above in connection with the center tapped vertical seal coil 120. End 582 of elongated coil 226 is beveled away from face 227 in order to follow the contour of the opposing surface 602 (see FIG. 34) so that the tube will be completely sealed to the edge.

Referring to FIG. 34, bracket 572 is mounted on support 570 by a suspension means comprising guide shafts 592 and a resilient spring means which provides a high pressure deflection means for controlling pressure as anvil jaw 210 and sealing jaw 220 are closed to compress tube 22 flatly. Having more than one resilient means provides for a relatively even distribution and absorption of the forces resulting from closing anvil jaw 210 and sealing jaw 220. The resilient means work in cooperation with pivots 221 and 231 which allow both faces of anvil jaw 210 and sealing jaw 220 to remain parallel while the high pressure clamping forces are evenly distributed along the web.

Rigid support 570 is secured to cross seal wheel 200 at its respective ends, preferably in bearings 597 and 598 within in flanges 567 and 568 of cross seal wheel 200. Flanges 567 and 568 are similar to flange 216 (FIG. 33) in that they have a plurality of apertures spaced around cross seal wheel 200 adapted for receiving a plurality of sealing jaws 220 of construction identical to the jaw described above.

Referring to FIG. 13, the schematic induction sealing operation of the present invention is illustrated. R-f generator 650, e.g., a Radyne/AKO, No. EI-5 manufactured by Radyne/AKO, generates the preselected energy level, preferably in the range from about 3 to 5 kw at about 650 KHz. Generator 650 is electrically connected in series with coupling mechanisms 652 and 654 for alternately energizing vertical seal induction coil 120 and a transverse coil 224, respectively. Other r-f generators could be used as long as they are capable of producing the power and frequency required for the sealing operation as described below. In the preferred embodiment only one of the plurality of transverse coil 224 is engergized at a time.

Figure 24:
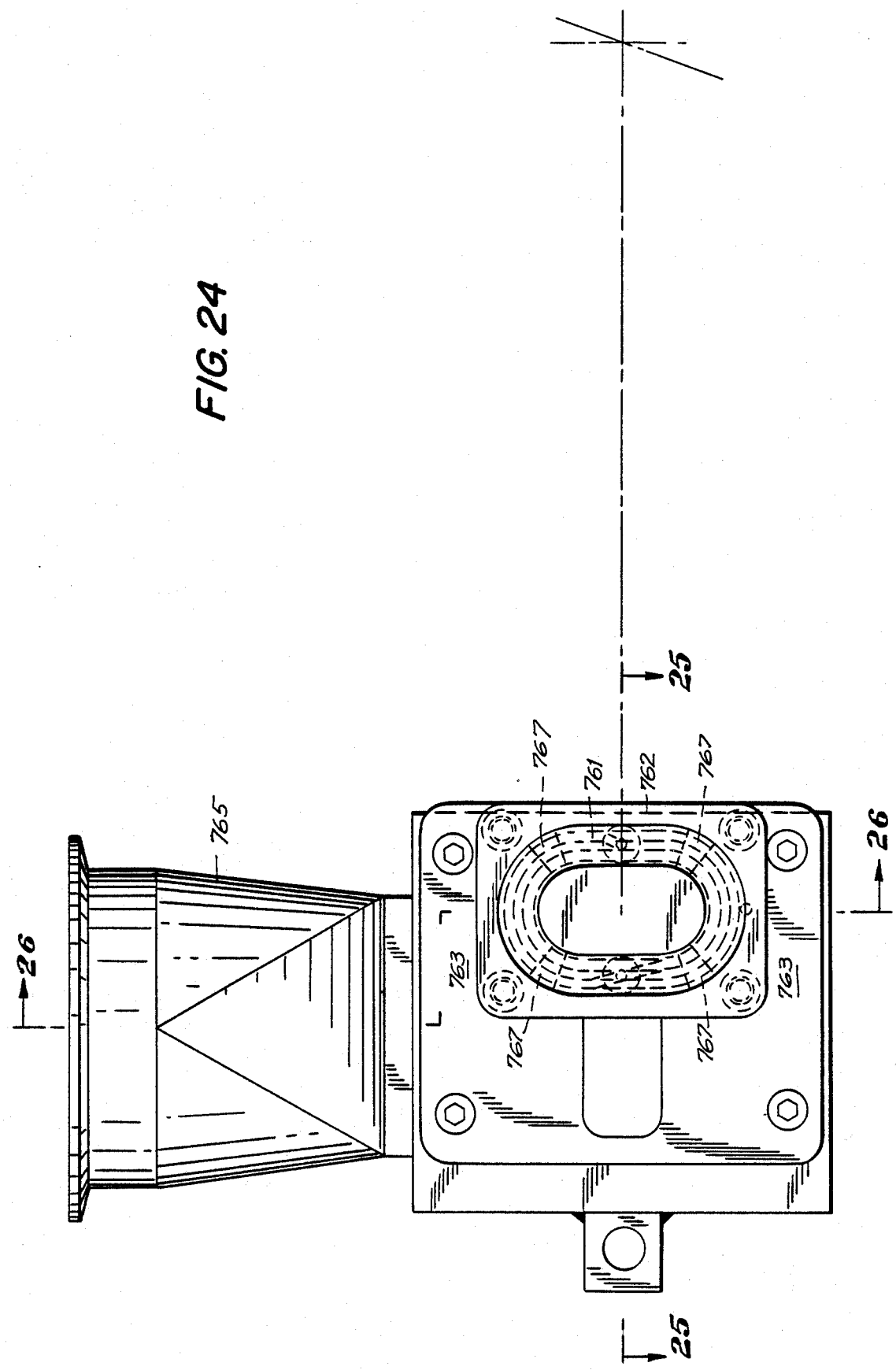
FIG. 24 is a face view of the primary induction coil assembly for the transverse seal in accordance with the present invention.
Figure 25:
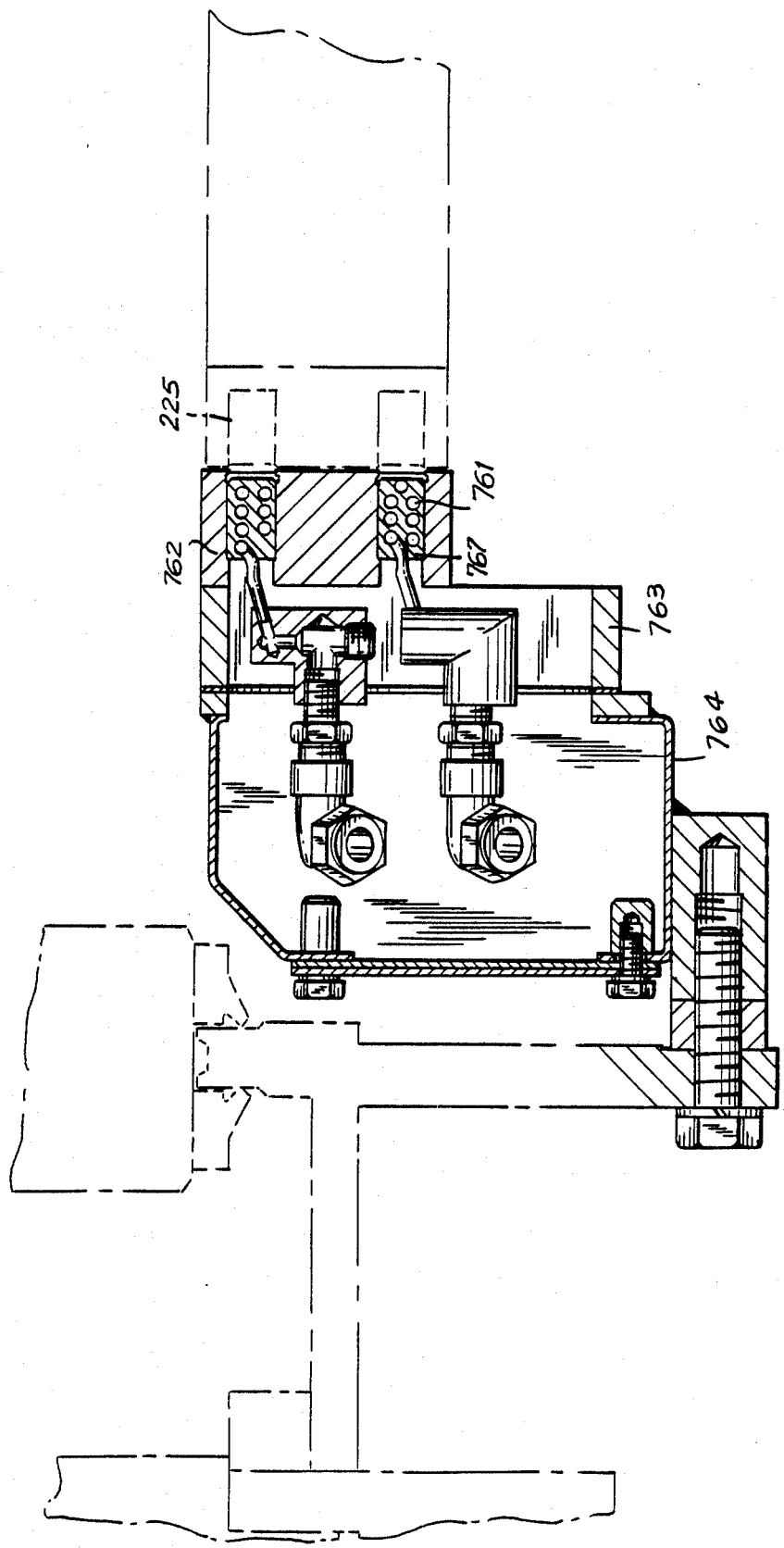
FIG. 25 is a top sectional view of FIG. 24 taken along line 25—25.
Figure 27:
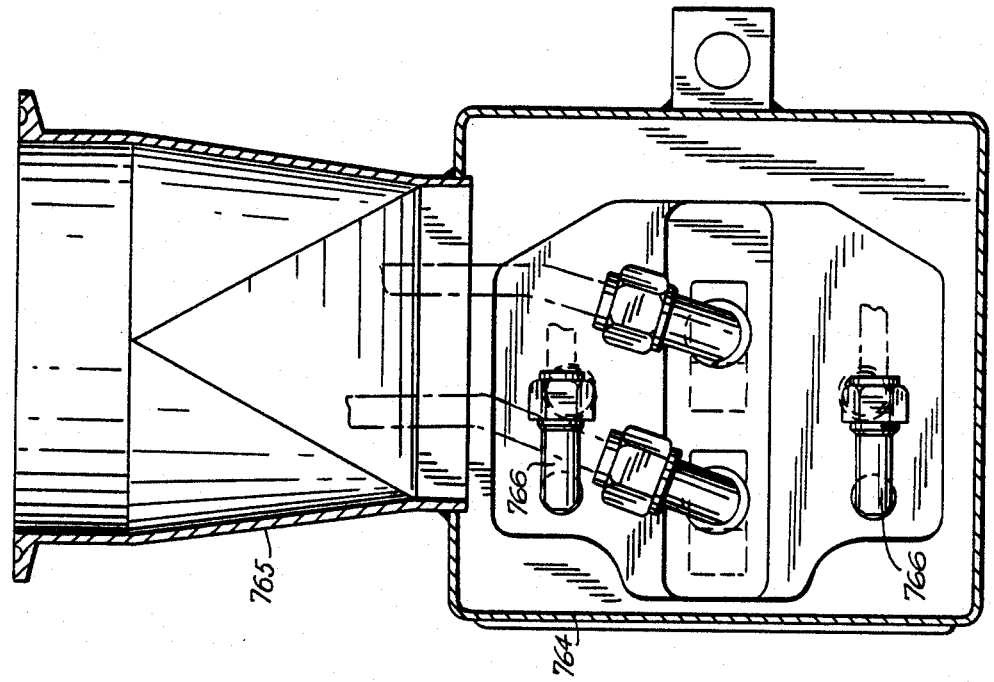
FIG. 27 is a rear sectional view of FIG. 26 taken along line 27—27.
Figure 26:
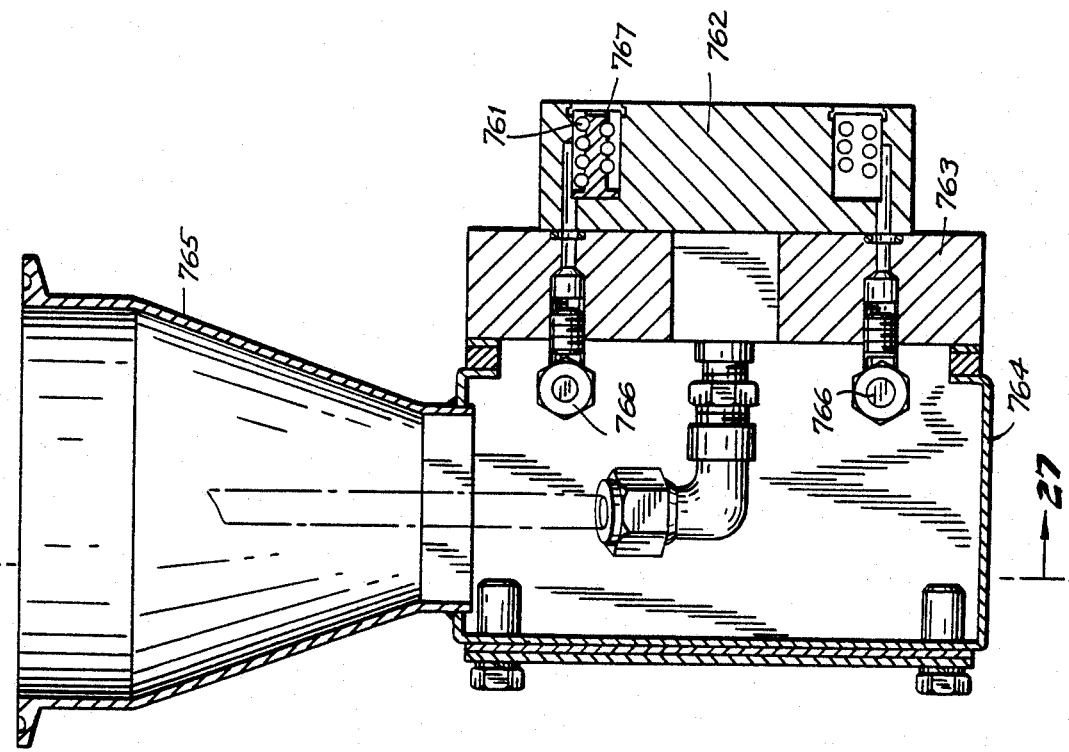
FIG. 26 is a side sectional view of FIG. 24 taken along line 26—26.

In the preferred embodiment, coupling mechanism 654 comprises multiple loop coil 760 designed in a oval cylindrical type coil (see FIGS. 24–26). Coil 760 has a length large enough to permit inducing a current in coil loop 225 of transverse coil 224 for a period of time adequate to cause heating of the metallic layer in web 20 during the time receiver coil 225 moves through the electromagnetic field generated by and near the face of coil 760.

Figure 17:
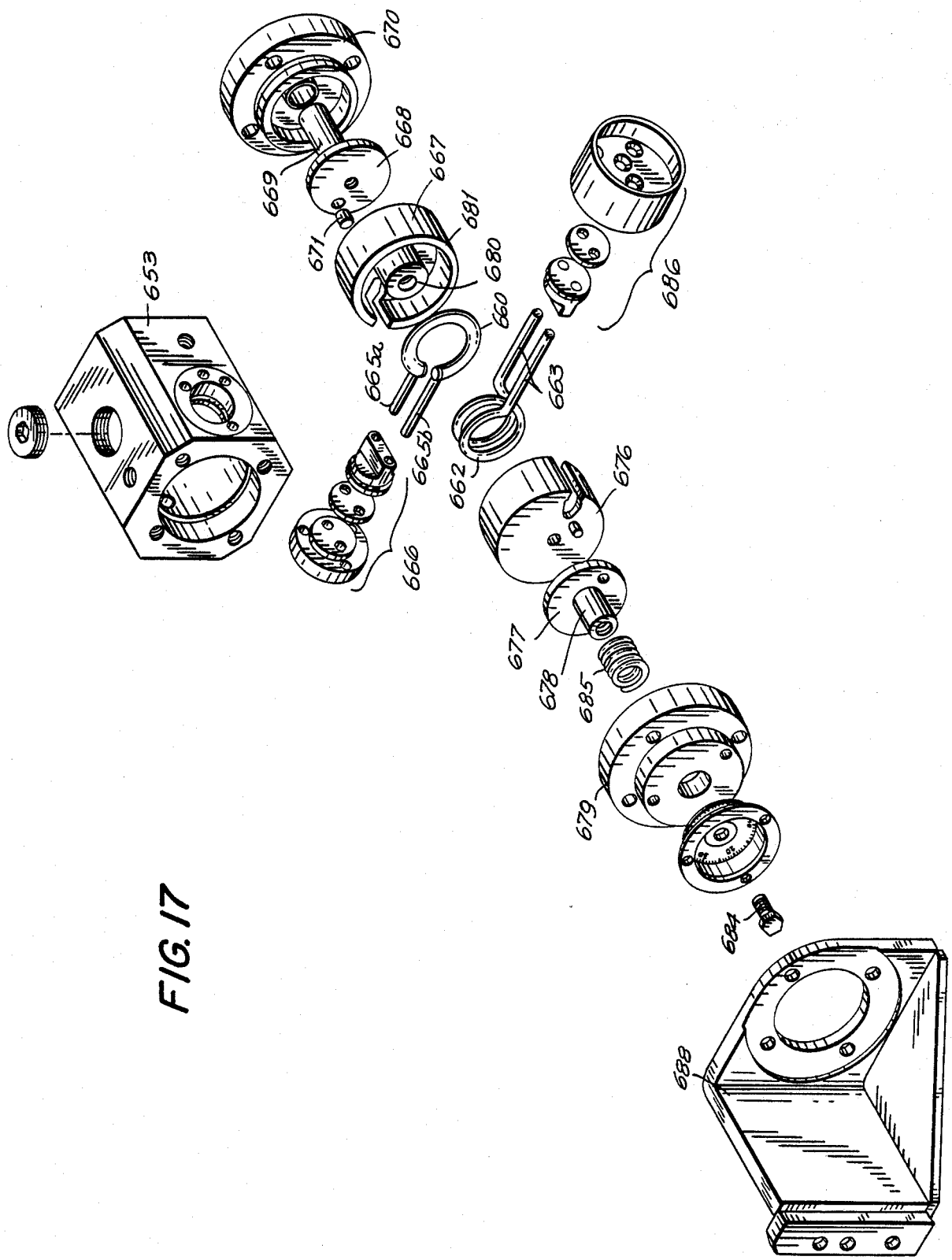
FIG. 17 is an exploded perspective view of the coupling transformer for the vertical seal coil of FIG. 13.
Figure 18:
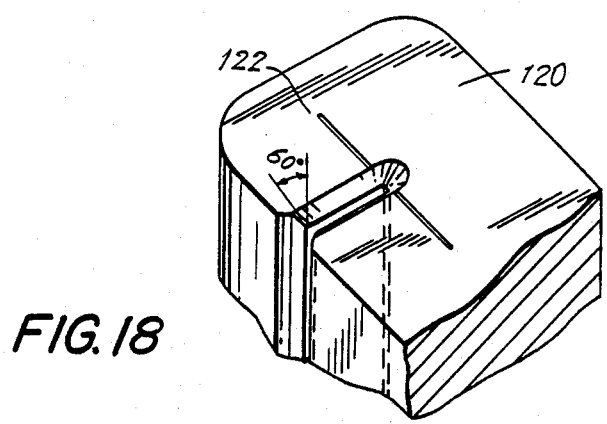
FIG. 18 is an elevated perspective sectional view of the top of the vertical seal induction coil of FIG. 15.
Figure 19:
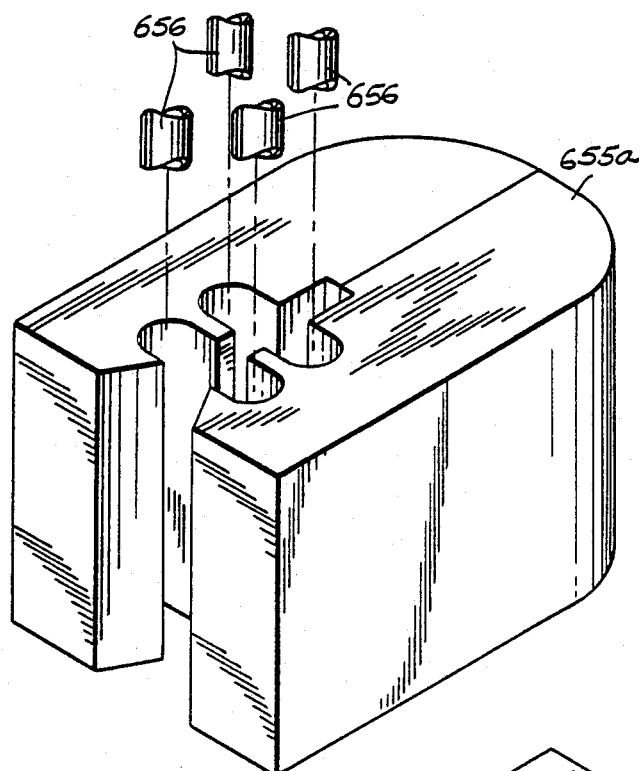
FIG. 19 is an elevated perspective view of the spacer member of FIG. 15 taken along line 19—19.
Figure 20:
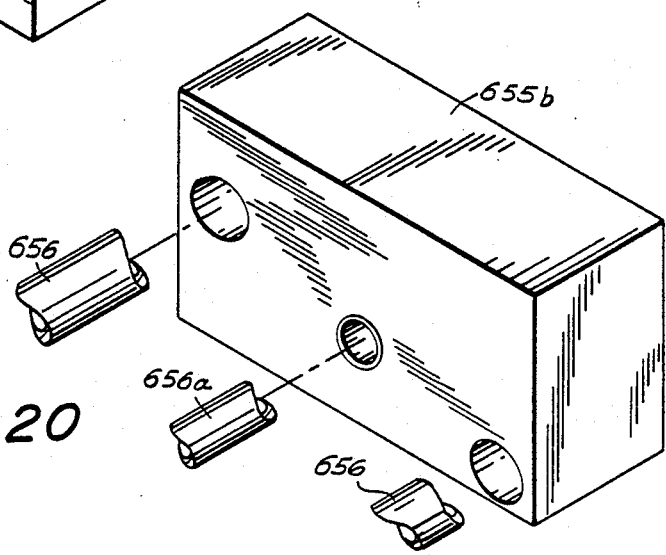
FIG. 20 is an elevated perspective view of the lead spacer taken along line 20—20 of FIG. 15.
Figure 21:
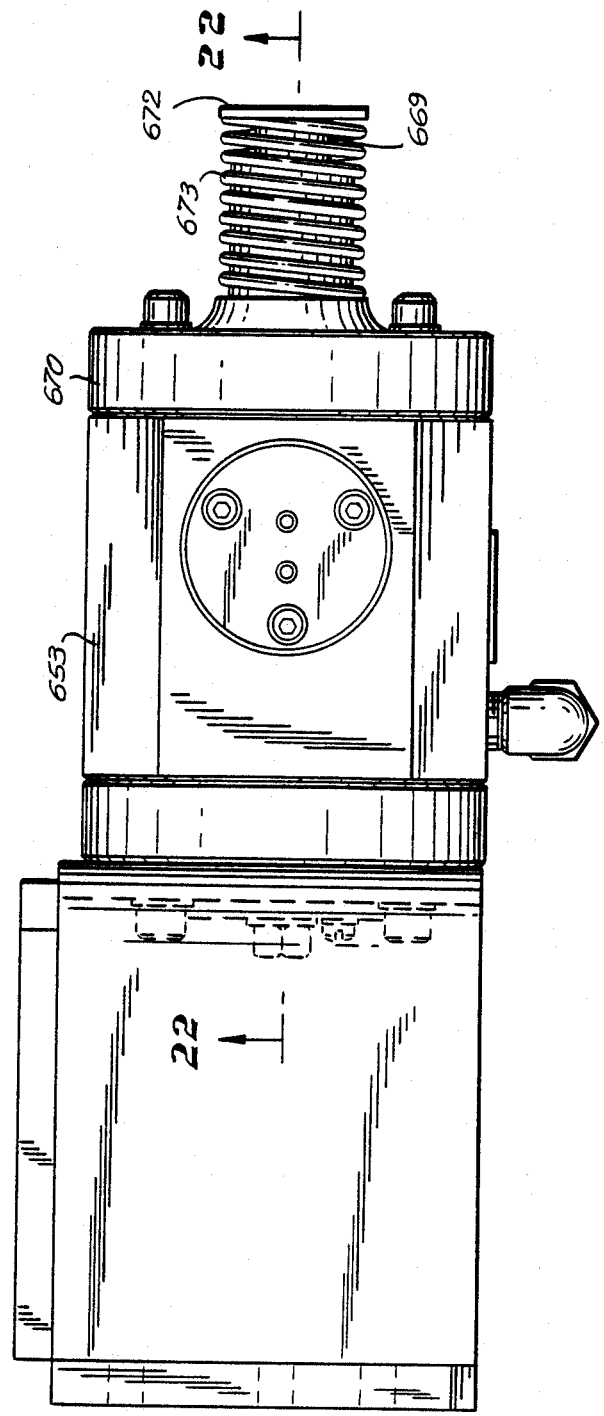
FIG. 21 is a side view of the coupling transformer mechanism of FIGS. 13 and 17.
Figure 22:
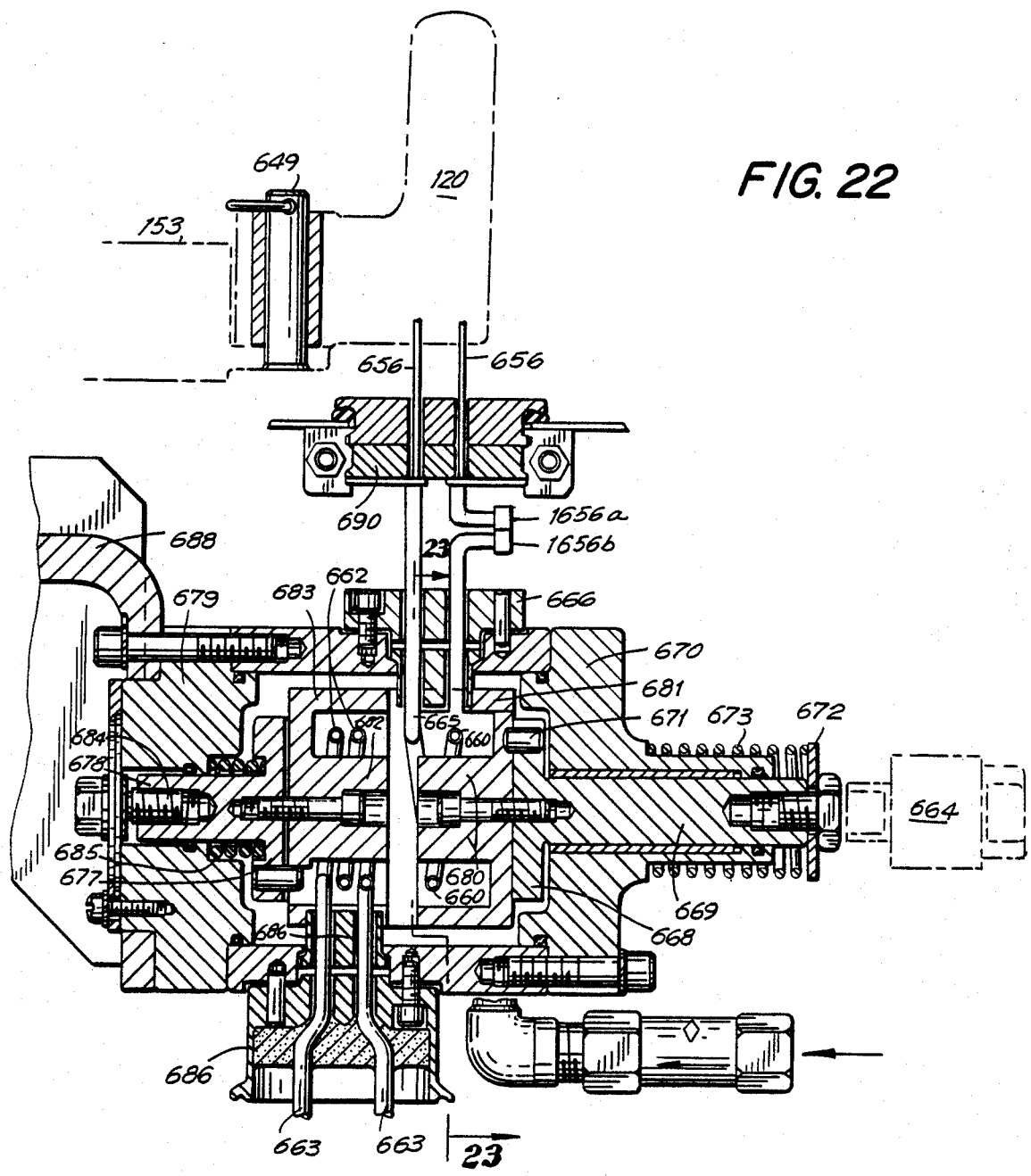
FIG. 22 is a top sectional view of FIG. 21 taken along line 22—22.
Figure 23:
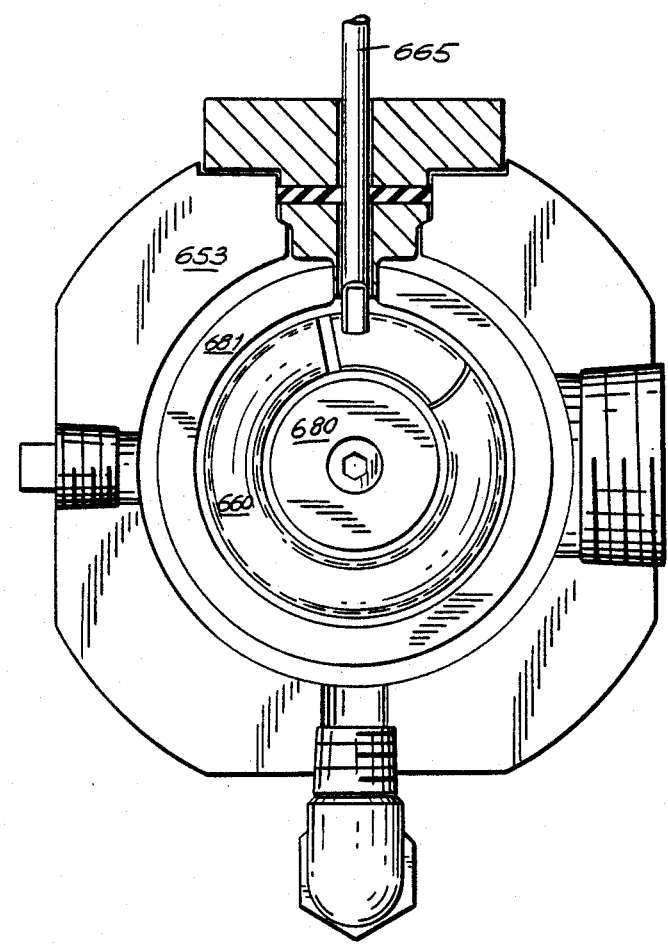
FIG. 23 is a front sectional view of FIG. 22 taken along line 23—23.

Coupling mechanism 652 contains multiple loop coil 662 in which the loops are arranged to form a cylinder (see FIGS. 17, 22). Coil 662 may also comprise a similar conductive tubing. Coil 662 may be a smaller coil than coil 760 because it is coupled to a single stationary coil that does not move across or along its face, but rather is coupled or decoupled thereto.

Both coil 760 of coupling mechanism 654 and and coil 662 of coupling mechanism 652 radiate electromagnetic fields when r-f generator 650 is outputing electromagnetic energy. Coupling mechanisms contain coils having multiple loops of conductive material, e.g., hollow copper tubing having a cooling medium such as water or oil flowing therethrough or copper wire immersed in a cooling bath, or both.

The plurality of transverse sealing mechanisms on cross seal wheel 200 are arranged so that, as cross seal wheel 200 advances, coil 225 of each transverse coil 224 is exposed to the electromagnetic field generated by induction coil 760 of coupling mechanism 654. While a given transverse coil 224 is exposed to that field and vertical seal coil 120 is decoupled as explained below, a current is induced in receiver coil 225 of transverse coil 224 which flows through elongated transverse induction coil loop 226 and in turn induces a current in the current carrying layer of flat pressed polyfoil tube 22. Transverse coil 224 thus acts as a secondary or parasitic load on r-f generator 650. Because coupling mechanism 652 is decoupled during transverse sealing, there is substantially no load on the steady state electromagnetic field generated by induction coil 662. Thus, the power distribution between inductive coupling mechanisms 652 and 654 favors the heavier load and delivers substantially all the power to coupling mechanism 654 and transverse coil 224. As receiver coil 225 passes through the radiated field, the power consumed by transverse coil 224 and thus used for transverse sealing first increases to a maximum when coil 225 enters and becomes centered in opposition and spaced from coupling mechanism 652 in parallel planes, and then decreases as coil 225 passes by and beyond the effective range of the electromagnetic field. Different designs for coil 760 could result in different radiated fields and energy consumption profiles.

When transverse coil 224 passes beyond the effective range, it no longer presents a significant load on r-f generator 650. Decoupling means 664 may then be activated to activate coupling transformer 652 as described below so that vertical seal coil 120 becomes coupled to coil 662 of coupling mechanism 652 through coil 660 and serves as the power receiving load on r-f generator 650. Thus, the power from r-f generator 650 is switched to vertical seal induction coil 120 in which a current is induced which in turn induces a current in opposing edges 24 and 26 of polyfoil web 20 in U-shaped section 122 of coil 120 for a predetermined period of time. That time period may depend in part upon the speed of polyfoil web 20/tube 22 passing through coil 120, the speed of rotation of cross seal wheel 200, the arc length between successive coils 225 of the transverse sealing mechanism, the time coupling mechanism 652 is activated the physical properties of web 20, and the various induction coil configurations. These factors determine the time period transverse coil 224 will be energized by coupling mechanism 654 and the time vertical coil 120 will be energized by coupling mechanism 652. One particular advantage of this invention is the use of only one r-f generator to accomplish both longitudinal and transverse seals in the same machine.

Referring to FIGS. 13, 17, 21, 22 and 23, coupling mechanism 652 connects vertical seal coil 120 to r-f generator 650. Coupling mechanism 652 comprises housing 653, an insulating material preferably made of plastic, containing single loop coil 660 electrically in series with conductor 656 to form a complete secondary circuit, multiple loop coil 66 electrically in series with r-f generator 650, and decoupling means 664 for allowing electromagnetic energy transfer from multiple loop coil 662 to single loop coil 660. Cooling fluid ports 1656a and 1656b are provided for circulating a cooling fluid through coils 660 and 120 in the conductive tubing. The conductive tubing is electrically connected at the ports to maintain a complete electrical circuit. Housing 653 contains a similar cooling fluid such as a circulating oil flow to keep ferrite housings 667 and 676 (described below) cool by removing the heat generated by hysteresis and eddy currents. The cooling fluid passes through oil ports (not shown) into and about the elements inside housing 653.

Decoupling means 664 is preferably a rotating cam designed to couple and decouple coils 662 and 660 cyclicly. Alternately, a linear acting solenoid, linear cam, air or hydraulic cylinder, or similar apparatus could be used.

Decoupling can occur in various ways. In one embodiment, single coil 660 and multiple coil 662 could be physically moved apart so that the current induced in single coil 660 by energized coil 662 is not substantial and does not cause a substantial or significant drain or load on generator 650. Moving single loop 660 away from multiple loop 662 could be accomplished by, for example, mounting loop 660 on a translatable carriage using a reciprocating device such as a rotating cam to move the carriage back and forth in proper coupling and uncoupling sequence. Flexible current conductors could be used to connect loop 660 to vertical seal coil 120. In an alternate embodiment, decoupling could occur by open circuiting the electrical circuit formed by coil 660, conductor 656 and coil 120, preferably using an arc-less switch to prevent or suppress the sparking that would otherwise occur.

In the preferred embodiment, coils 660 and 662 remain fixed relative to each other, and magnetic housings 667 and 676, respectively adapted to fit about coils 660 and 662, are moved in and out of proximity to each other about the coils. Housings 667 and 676 comprise a magnetic material, e.g., manganese zinc ferrite. Housing 667 has central boss 680, adapted for insertion into the middle of coil 660, and flange 681 adapted to fit about and spaced from the perimeter of coil 660. When placed in proximity to similarly configured housing 676, housing 667 effectively couples the radiated electromagnetic field from housing 676, having boss 682 and flange 683 fitting about coil 662 but not in touching contact therewith. Housing 676 has an induced magnetic field which is induced by multiple loop coil 662 which is intermittently activated by generator 650. When housings 667 and 676 are placed in close proximity, the magnetic flux flowing in housing 676 also flows in housing 667. Because of the transformer effect, the current in coil 662 will induce a current in coil 660 to energize vertical seal coil 120. Thus, by moving housing 667 in and out of close proximity with housing 676 and in and out of proximity with coil 660 vertical seal coil 12Q can be energized and deenergized for longitudinal sealing.

Single loop coil 660 comprises a conductive tube, preferably hollow copper tubing having means such as water for cooling the tubing flowing therethrough. The tubing is looped into the coil with parallel take-off leads 665a and 665b adapted to fit into and through insulator brackets 666. Brackets 666 minimize the likelihood that parallel take-off leads 665a and 665b will twist during energization and maintain the loop oriented with its face substantially vertical.

Housing 667 is mounted on flange 668 and has pin 671 so that housing 667 and flange 668 will not rotate. Flange 668 has central post 669, which is adapted to fit and slide within an aperture in closure 670. Post 669 extends through closure 670 and has secured to its end stop means 672. Mounted between stop means 672 and the rear of closure 670 is compression spring 673 which exerts a force on post 669 to urge housing 667, or in an alternate embodiment coil 660, towards closure 670 and away from multiple loop coil 662.

Housing 676 may be mounted on flange 677 which is mounted to post 678 which is secured to housing 679 about threaded adjusting mechanism 684, using compression spring 685 mounted around post 678 between flange 677 and housing 679 so tat spring 685 will exert pressure to housing 676 to preload gap-adjusting mechanism 684. Multiple turn coil 662 is mounted about boss 682 and within flange 683 of housing 676. Twin take-off leads 663 pass through insulating brackets 686 and are connected in series with r-f generator 650. Housing 679 is connected to bracket 688 which is secured to frame 11. Twin take-off leads 665, one of which includes cooling ports 1656a and 1656b, extend from coil 660, pass through housing 690 and are electrically connected to vertical induction coil 120.

In the preferred embodiment, decoupling means 664 may comprise cam 700 rotating on a shaft (not shown) which is synchronous with machine timing and in contact with, for example, stop means 672, having a cam surface for moving stop means 672 against spring 673 to couple loops 660 and 662.

Referring to FIGS. 13, and 24–27, primary work coil, coil 760, for use in transverse sealing consists of coil loops 761 mounted and secured in magnetic housing 762, mounting baseplate 763, wiring box 764 and wiring access tube 765 having a flanged configuration. Wiring box 764 typically contains connections for radio frequency power, cooling water and cooling oil. Coil 760 provides for the transfer of electromagnetic energy to one of the plurality of secondary coils 225 subjected to the radiated electromagnetic field. Using the magnetic housing, e.g., powdered iron or other ferritic substance, in the preferred configuration, provides a more compact assembly than for example, open air coils, and minimizes the potential of radiated electromagnetic interference because of the concentrating and directing aspect of magnetic housing 762. Housing 762 also provides physical support for the coil and is preferably cooled by oil or similar medium flowing through ports 766 to remove heat generated by hysteresis and eddy currents. The cooling medium also serves as an additional dielectric material for coil 760. Coils 660 and 662 also may be coated with a separate dielectric, e.g., teflon tubing, about the outer diameter of the coil tubing.

Coil loops 761 may be one or more turns of copper tubing, preferably multiple turns, coiled internally, and coated with a teflon or other dielectric material capable of withstanding the radio radiofrequency voltages present in the coil. Spacers 767 are provided to maintain the desired coil spacing and configurations inside the housing and to minimize the magnetic and other stresses on the turns of the loop. The looped configuration is preferably oval and cylindrical so that it provides a relatively uniform radiated electromagnetic field for work coil 225 to pass through, sufficient to induce the necessary current into coil 225 and ultimately into elongated coil 226 and polyfoil tube 22.

Magnetic housing 762 is preferably mounted on baseplate 763, comprised of a rigid material which is insulated from the wiring enclosure and separately grounded by a grounding conductor (not shown) to the ground of r-f generator 650 for safety reasons and to further minimize radiated electromagnetic interference. Other means for cooling the exterior of housing 762 may be provided, such as an external fluid flow, or heat conductors to baseplate 763. The conduits for water and electricity are conventional and known to those of skill in the art.

Referring to FIGS. 37, 39, 40a, and 40b, the circuits for use in controlling the radio frequency power sequence is shown. In general, the r-f control circuits may be independent of a microprocessor insofar as its operation is concerned, but in alternate embodiments, it may be incorporated into or controlled by the microprocessor. In the preferred embodiment, the output signals of the control circuits are input to the microprocessor for use in controlling all aspects of the operation of machine 10. The microprocessor enables and disables the r-f sealing operation depending upon whether the diagnostics of machine 10 indicate r-f seals can be made in accordance with predetermined conditions.

Figure 36:
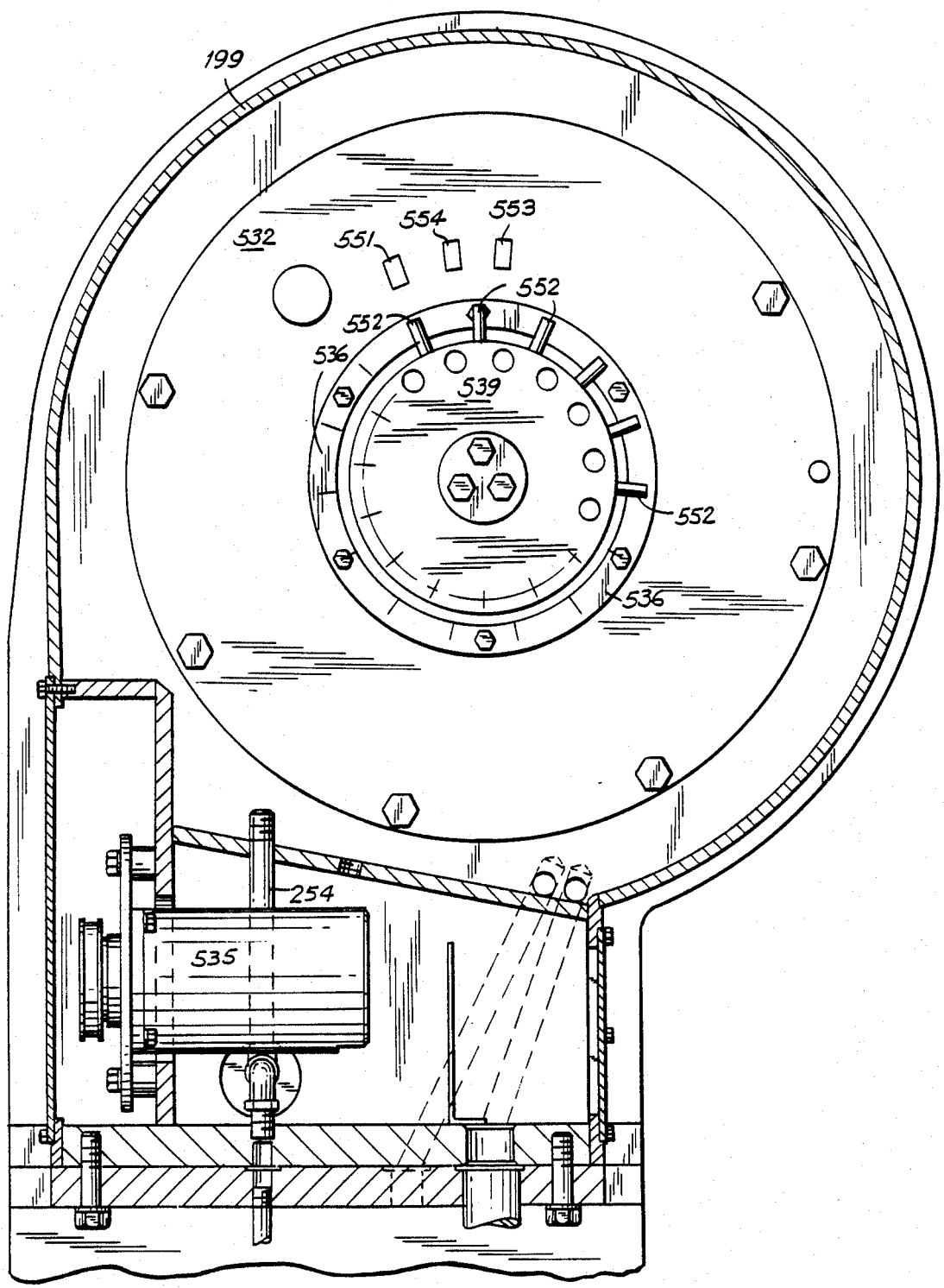
FIG. 36 is a side view of the seal signal trigger of the present invention.

Referring to FIG. 36, the r-f control circuit is adapted to receive signals detected by vertical trigger sensor 551, horizontal trigger sensor 553, and station one sensor 554. Vertical trigger sensor 551 and horizontal sensor 553, shown in block diagram form, detect the passage of one of a plurality of pins 552 mounted in a spaced apart relationship on flange 539, which is attached to the axis of cross seal wheel 200 and rotates with cross seal wheel 200. The plurality of pins correspond to the plurality of sealing mechanisms. Thus, as one of the pins 552 passes vertical trigger sensor 551, the sensor 551 detects the close proximity of the pin or its passage and generates a signal indicating that a vertical seal should be made. As that same pin 552 continues to rotate, it will pass horizontal trigger sensor 553 which will similarly detect the presence of that pin 552 and in turn generate a signal indicating that a horizontal seal should be made using the corresponding sealing mechanism. Thus, in the preferred embodiment, the physical spacing between the plurality of pins and the vertical and horizontal trigger sensors determines the sequence and timing of control signals for the r-f control circuit, subject to changing the speed of rotation of cross seal wheel 200. The spacing of the pins about flange 539 and the location of the trigger sensors is designed to prevent simultaneous generation of signals corresponding to vertical and horizontal seals. Detection of the pins can be by any conventional means, including, but not limited to, optical detectors, inductive proximity or limit switches, capacitive detection, radio frequency circuit detuning, and the like. Alternate methods of establishing the timing pattern could be used.

One of the plurality of pins may contain an offset pin (not shown) corresponding to a first station position of the sealing mechanisms. Station one trigger sensor 554 is positioned in alignment with only the offset pin so that station one trigger sensor 554 will detect only that pin as cross seal wheel 200 rotates and generate a signal corresponding to the first station, indicating a single cross seal wheel revolution has occurred. It may be used for printing on the package which sealing mechanism sealed the package.

The operation of the r-f control circuit is as follows. With detection of one of pins 552 by vertical trigger sensor 551, a control signal, e.g., a control voltage, is input to r-f generator 650 to provide the output power level sufficient for making the longitudinal seal. After the prescribed time period, the control signal and the r-f output power level may be reduced to a background or standby current or turned off entirely. The detection of pin 522 by horizontal trigger sensor 553 causes a second control voltage to be input to generator 650 to raise the power output to the level required to make transverse seals. After the second prescribed time period the second control voltage may be again turned off or reduced to turn off or reduce generator 650 to the standby current level. Thus, the timing of the vertical and horizontal seals is linked mechanically to the package forming apparatus. The energy levels for vertical and horizontal sealing are predetermined and independantly adjustable, as are the durations of the sealing cycles, by appropriate adjustments to r-f control circuit reference values as discussed below. The circuit can be varied to provide from short pulse to continuous operation at one or more power levels depending upon the nature of the seals and the speed of the machines. For example, at an appropriate power level, transverse and longitudinal sealing may simultaneously occur.

Figure 37:
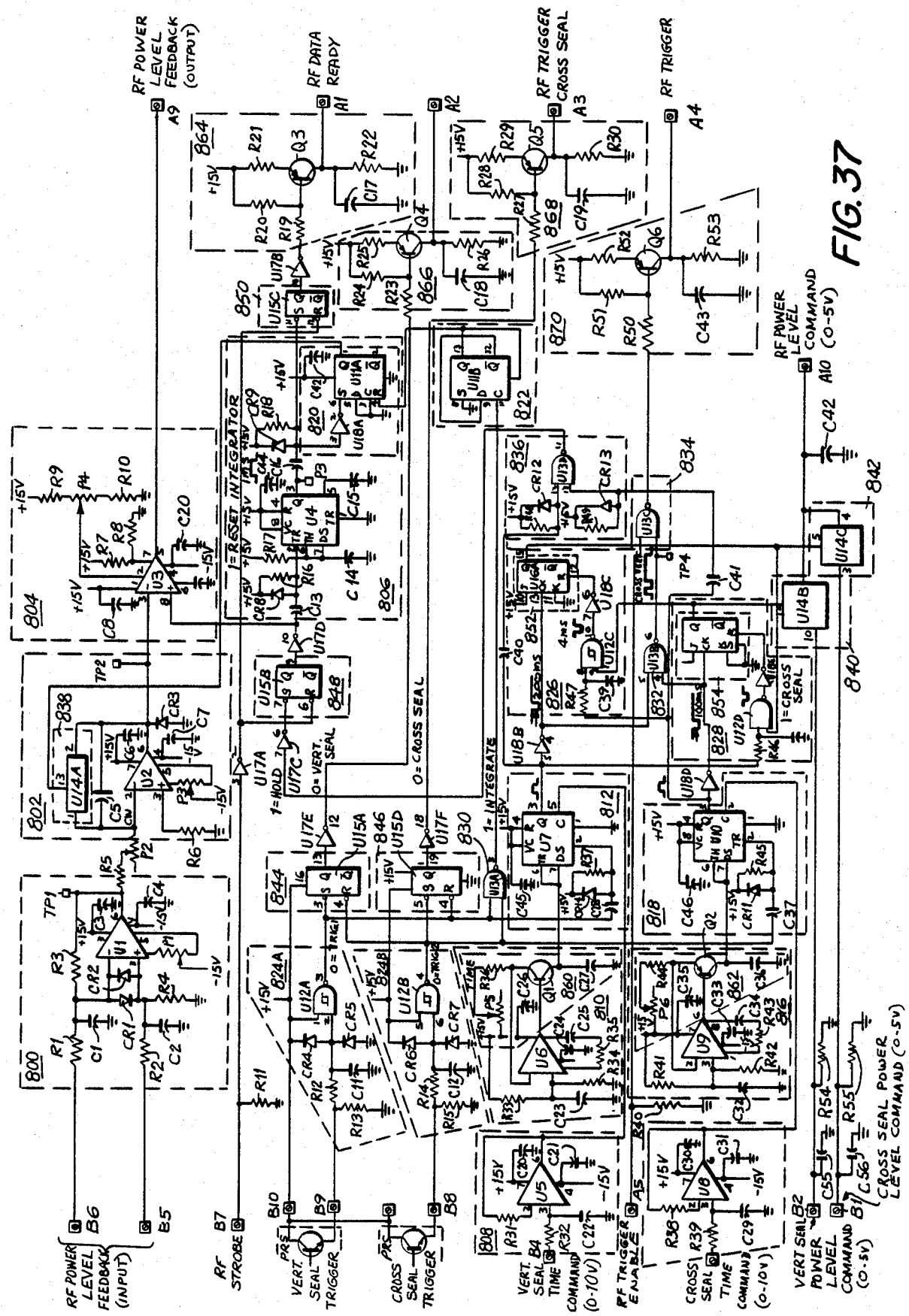
FIG. 37 is a schematic circuit diagram of the radio frequency generator control circuit of the present invention.

Referring to FIG. 37, the r-f control circuit is shown. The circuit is connected to the microprocessor as described herein and comprises differential amplifier circuit 800, integrating amplifier circuit 802, track and hold amplifier circuit 804, timer circuit 806 for resetting the integrator circuit, driver circuit 808 for controlling the vertical seal time on timer circuit 812, current regulator circuit 810, timer circuit 812 associated with forming the vertical seal, driver circuit 814 for controlling the time on timer circuit 818, current regulator circuit 816 associated with timer circuit 818, timer circuit 818 associated with forming the horizontal seal, also referred to herein as the cross seal, latch circuit 820 associated with timer circuit 806 for resetting integrator circuit 802, single shot circuit 822 for resetting latch circuit 820, signal debounce circuits 824a and 824b for smoothing and squaring the trigger signals input pulse from machine 10 to the r-f control circuit, switch circuits 826 and 828 for controlling the R-F Power Level Command signal fed to generator 650, logic gate 830 to enable integrator circuit 802 at the beginning of either a vertical or cross seal cycle, logic gate 832 to couple either the Vertical or Cross Seal Time Command signal to the R-F Trigger output, logic gate 834 to couple the trigger signal if enabled by R-F Trigger Enable signal from the microprocessor, single shot circuit 836 for placing track and hold circuit 804 in the hold mode at the end of either a vertical or cross seal cycle, switch 838 for resetting integrator circuit 802, switch 840 for connecting the Vertical Seal Power Level Command, as pre-determined by either the operator or the microprocessor, directly to the amplitude control circuitry of the r-f generator for affecting a vertical seal segment, switch 842 for connecting the Cross Seal Power Level Command signal, as predetermined, to r-f generator 650 to effect a transverse (or cross) seal, latch circuit 844 associated with vertical seal trigger debounce circuit 824a for informing the microprocessor when a vertical seal cycle is in progress, latch circuit 846 associated with horizontal trigger signal debounce circuit 824b, for informing the microprocessor when a horizontal seal cycle is in progress, flip flop circuit 848 for holding the R-F Power Level Feedback signal until the microprocessor has completed receiving the data presented by track and hold circuit 804 and generates the R-F Strobe signal which resets latch 850 and flip flop 848 which returns the track and hold amplifier of circuit 804 to the tracking mode, latch 850 for informing the microprocessor when valid r-f power level data is ready for processing, latch 852 associated with circuit 826 for setting the power level for the cross seal cycle at the end of a vertical seal cycle by enabling switch 842, latch 854 associated with circuit 828 for setting the power level for the vertical seal cycle at the end of a cross seal cycle by enabling switch 840, plurality of inverters 856(a-f) and 858(a-e) for controlling the level of the logic signal or pulse, current driver circuits 860 and 862 for charging their respective timing capacitors, and current limiting output driver circuits 864, 866, 868 and 870 associated with output signals R-F Data Ready, R-F Trigger Vertical Seal, R-F Trigger Cross Seal, and R-F Trigger.

Figure 40A:
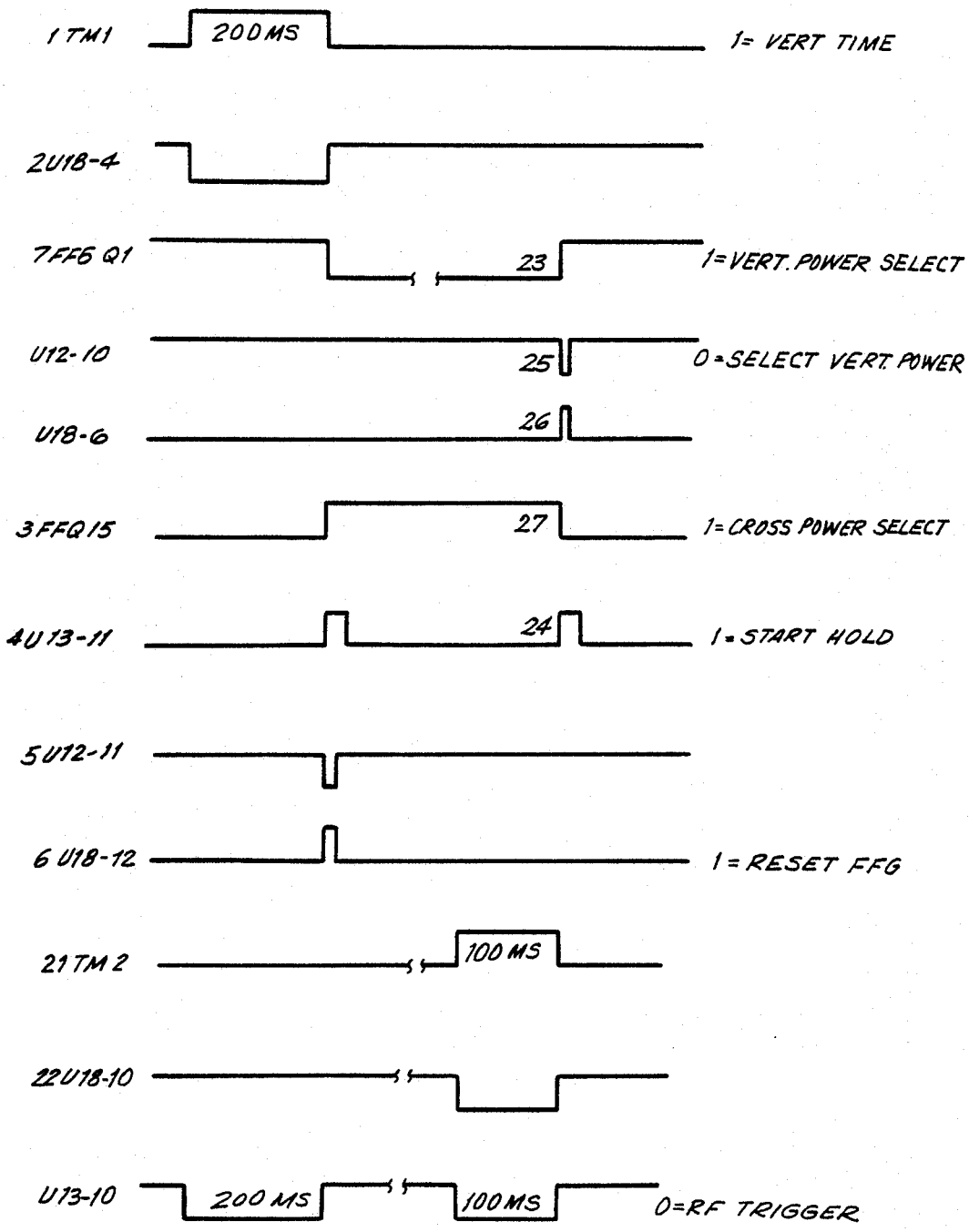
FIGS. 40A and 40B are timing diagrams of the logic circuitry for the radio frequency control circuit of FIG. 37.
Figure 40B:
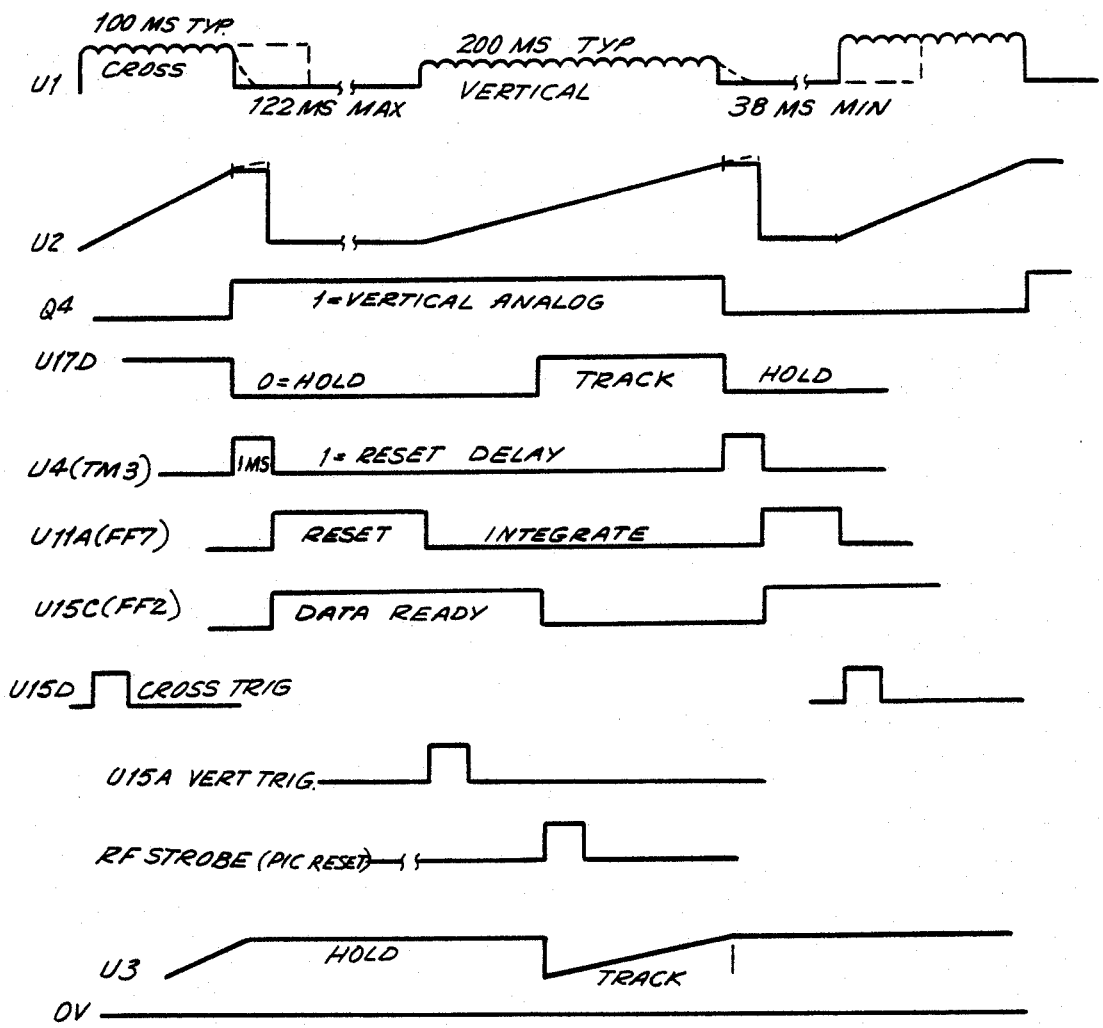

The corresponding timing diagrams for the various circuit elements are shown in FIGS. 40a and 40b. The labeling of the timing diagrams refers to pin numbers or nodes as identified in the following discussion.

As used herein, "C—" refers to capacitor C—, "R—" refers to resistor R—, "CR—" refers to diode CR—, "P—" refers to potentiometer P, "Q—" refers to transistor Q—, "U—" refers to integrated circuit U—. The term "U1—" means element U1 at pin—and refers specifically to connections to the identified pin of the integrated circuit in accordance with the circuit manufacturer's pin convention. The shorthand form of identifying the various circuits elements and pin connections will be used when appropriate.

In the preferred embodiment, the r-f control circuit elements comprise a diagnostic and monitoring section for the microprocessor to monitor the r-f sealing conditions and a logic control section for controlling the operation of r-f generator 650, and are constructed as follows, with reference to FIGS. 37-39. Differential amplifier circuit 800 comprises operational amplifier U1, typically a 741 type op amp having as its inputs the R-F Power Level Feedback signal which is generated across pins B6 and B5.

Figure 38:
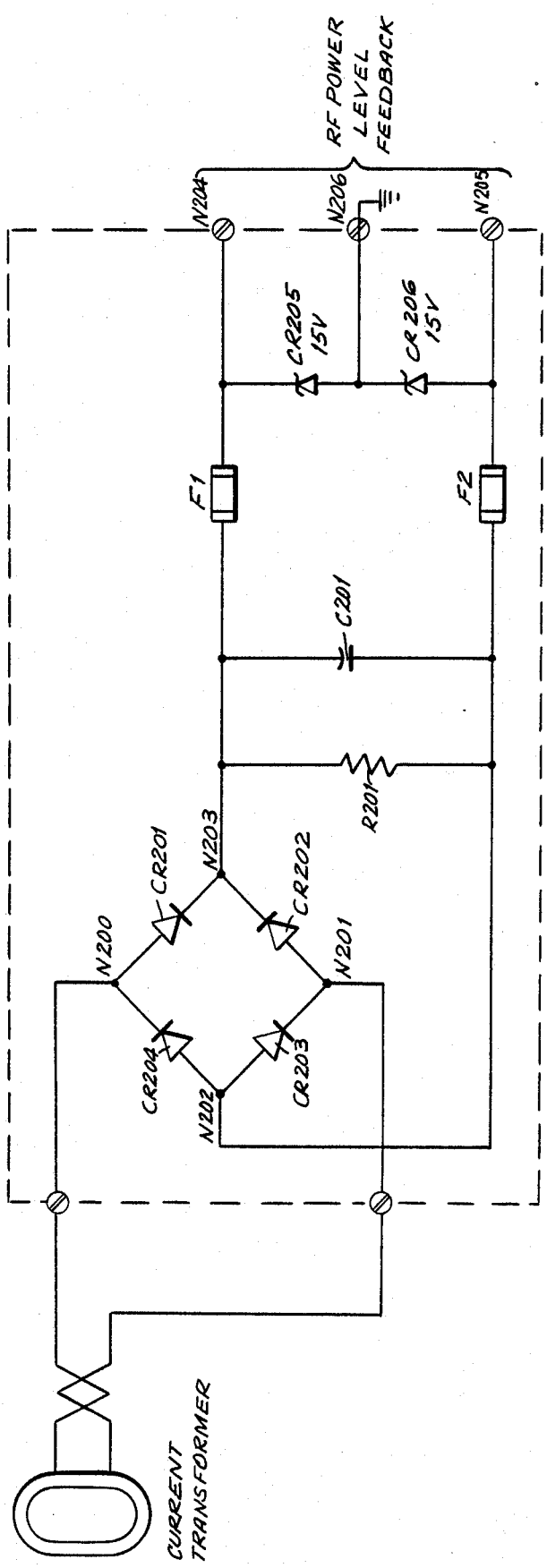
FIG. 38 is a schematic circuit diagram of the radio frequency rectifier board of the control circuit of the present invention.

The R-F Power Level Feedback signal is generated by the r-f power feedback board shown in FIG. 38. The current transformer shown in block diagram is adapted to fit around a single conductor of the output of r-f generator 650. When generator 650 is conducting, a current will be induced in the current transformer which is conducted to nodes N200 and N201 of the rectifier bridge comprising diodes CR201 and CR202 arranged in parallel with diodes CR203 and CR204, typically type IN4148 diodes. One set of paired diodes are connected anode to anode and the other set connected cathode to cathode. The signal is then taken from nodes N202 and N203 of the rectifier bridge, passed across a low pass filter consisting of resistor R201 and capacitor C201 and through respective isolation fuses F1 and F2. Isolation fuses F1 and F2 operate to prevent damaging the r-f control circuit in the event of current surges in generator 650, by open circuiting the connection. zener diodes CR205 and CR206, typically IN6275A type zener diodes, are arranged anode to cathode across the output terminals N204 and N205 and share a common local ground connected to terminal N206. Zener diodes N204 and N205 act to conduct the current to the local ground while limiting the output voltage to the rated breakdown voltage, e.g., 15 volts, when the circuit is overloaded.

The input to differential circuit 800 is thus the R-F Power Level Feedback signal generated across nodes N204 and N205 (FIG. 38), input to pins B6 and B5, and fed into parallel input circuits comprising resistor R1, capacitor C1 and resistor R3 to the inverting input, and R2, C2, and R4 to the non inverting input of amplifier U1. The inputs of U1 are connected by diodes CR1 and CR2 in parallel, connected anode to cathode, typically IN4148 type diodes. An adjustable offset voltage from a −15 volt source fed into potentiometer P1 is applied across U1-1 and U1-5. Throughout the circuit various potentiometers are used for adjusting the resistor values of the circuit or to establish proper reference voltages to account for manufacturer's tolerances, unless otherwise mentioned. Power supply voltages of ±15 volts across capacitors C3 and C4, respectively, are applied to pins U1-7 and U1-4, respectively.

The output of U1-6 circuit 800 is fed to integrator circuit 802 into load resistor R5 and potentiometer P2.

Integrator circuit 802 comprises amplifier U2, typically a bifet type 3140 operational amplifier manufactured by RCA, having a grounded high impedance resistor R6 input to the noninverting input, and the output of circuit 800 input to the inverting input. Power supply voltages of ±15 volts across grounded capacitors C6 and C7 are respectively input to pins U2-7 and U2-4, with an offset voltage from a −15 volt source fed across potentiometer P3 being applied across pins U2-1 and U2-5. Grounded capacitors are used in connection with power supply voltages to filter out line current (60 Hz) fluctuations and to decouple each amplifier from signals from adjacent amplifiers.

The integration of circuit 802 is controlled by circuit 806, turning on and off switch U14A, preferably a CMOS type 4066 solid state switch, connected in parallel with capacitor C5 in the feedback loop between pins U2-6 and U2-2 of amplifier U2. Switch U14A is in one of an open circuited or short circuited condition, whereby change from a short circuit to an open circuit permits commencement of integration as capacitor C5 begins to accumulate charge. Switch U14A is controlled by flip flop U11A-1 of timer circuit 806 which, when reset to give a logical 0 (or logical low signal, typically a 0 voltage signal) output at U11A-1 at the onset of a trigger signal (as discussed more fully below) will cause switch U14A to change to an open circuit and begin integrating the signal from differential amplifier circuit 800.

The output of integration circuit 802 is fed across grounded voltage-reversal clamping diode CR3 (a 1N4148 type diode) to prevent negative excursions of the amplifier from affecting the solid state switch, and is input to track and hold circuit 804.

Track and hold circuit 804 comprises sample and hold chip U3, typically a Signetics model 5537 chip, and related circuitry configuring the chip into a track and hold circuit. The input is fed to pin U3-3. Power supply voltages of ±15 volts are input across grounded capacitors C8 and C10 to pins U3-1 and U3-4, respectively. Pin U3-6 is grounded across capacitor C9. One reference voltage from a ±15 volt source is fed across resistor network R7 and R8 to pin U3-7, resistor R8 being grounded, and an offset voltage from a +15 volt source is fed across resistor network R9, R10, and potentiometer P4 to pin U3-2. The control signal to place circuit 804 into the hold mode is generated by a microsecond pulse, e.g., 4 μsec, generated by NAND gate U13D-11 which passes through inverter U17C and is input to flip flop U15B-7 to set U15B-9 which sends a logical 0 (or logical high signal, e.g., a +5 or 0.15 volt signal) output to inverter 17D-10 and causes track and hold circuit U3 to hold the value at the time of the microsecond pulse. Flip flop U15B is a logical low trigger type flip flop, so the presence of a logical high pulse out of NAND gate U13D-11 is inverted by inverter U17C to form the logic low trigger to set flip flop U15B-9 to a logical high which is inverted by inverter U17D to a logical low which is input to U3-8 to cause the hold condition. The value held is then output at U3-5 and maintained at node A9 where it can be sampled and recorded by the microprocessor for diagnostic and monitoring purposes. The output is typically maintained until amplifier U3 is returned to a tracking mode by a logical high input at U3-8.

The output value corresponds to the r-f power level actually generated by r-f generator 650 in response to the Power Level Command signal as determined by the current induced in the current transformer (FIG. 38) and the length of time the generator was on. The time period for integrating is controlled by beginning the integration with turning generator 650 on, and tracking and holding the value of integrator 804 at the time generator 650 is turned off (or placed on standby). Once the microprocessor has sampled the output node A9, it generates the R-F Strobe signal pulse input to pin B7 across grounded resistor R11. The signal passes through inverter U17A which provides a logic low pulse which resets flip flop U15B (at U15B-6) to logical low at the onset of the signal, thus inputting a logical high to pin U3-8 which places sample and hold chip U3 in its tracking mode for tracking the output of integrator U2-6 during the current seal cycle corresponding to a vertical or cross seal.

The R-F Strobe signal also resets latch 850 at U15C-12, providing a logical low output at U15C-10 which is inverted to a logical high output at U17B-4 which turns off transistor Q3 of circuit 864. Turning off Q3 removes the R-F Data Ready signal at pin A1, without which the microprocessor will not sample and process data. The R-F Data Ready signal is provided when transistor Q3 is turned on when flip flop U15C is set at the end of the pulse generated by timer circuit 806 which occurs about 1 msec after track and hold amplifier U3 was placed in the hold condition to allow it to stabilize before microprocessor 8 will sample the value.

The microprocessor also provides the R-F Trigger Enable signal, input at node A5, which is input across grounded resistor R40 to NAND gate 834 at input U13C-8 to control enablement of r-f generator 650. NAND gate 834 is typically a 4011 CMOS type NAND gate. When the microprocessor determines that all of the appropriate operating conditions for aseptic packaging are present such as web presence, information indicating safe operating conditions, the generator is ready, and the like an R-F Trigger Enable signal, a logical high signal, will be generated. When any of the operating conditions are inappropriate for package forming, the signal will be changed to a logical low. When the signal is a logical low, NAND gate 834 output U13C-10 will be high regardless of whether there is vertical or cross seal trigger signal. This will prevent energization of r-f generator 650. When the R-F Trigger Enable signal is a logical high, the presence of a Vertical or Cross Seal Trigger signal having a logical high input to U13C-9 will produce a logical low output at U13C-10, thus turning on transistor Q6 of circuit 870 and providing an R-F Trigger signal which permits r-f generator 650 to operate, as explained below in connection with FIG. 39, for the time period that both inputs U13C-8 and U13C-9 are logical highs.

The output of NAND gate 834 at U13C-10 is input to current limited output driver circuit 870 comprising transistor Q6, typically a 2N5366 type transistor, base resistor R50, a +15 volt source fed across resistors R51 and R52, R51 being connected to the base of transistor Q6, R52 being connected to the emitter of transistor Q6 and parallel RC network C43 and R53 connected between the collector output and ground. The output, taken across resistor R53 at pin A4, is the R-F Trigger signal.

The magnitude of r-f current generator 650 is predetermined by either the operator adjusting, for example, a potentiometer, or by a signal generated by the microprocessor. In the preferred embodiment, there are two input channels. The first channel is for the vertical seal and has as its input the Vertical Seal Power Level Command signal, preferably a voltage signal in a range from 0–5 volts. That Command signal is fed across parallel RC network C55 and R54, both tied to ground, and input to switch 840 at pin U14B-10. The second channel is for the horizontal or cross seal and has as its input the Cross Seal Power Level Command signal, preferably a voltage in a range of 0–5 volts fed across parallel RC network C56 and R55 tied to ground, and input to switch 842 at U14C-3. In the preferred embodiment, the command signals are predetermined by the microprocessor. Both switches 840 and 842 are typically 4066 CMOS type solid state switches capable of being turned on (short circuited) and off (open circuited).

The outputs of switches 840 and 842 at U14C-11 and U14C-4 are tied together, fed across grounded capacitor C42 and output to pin A10 as the R-F Power Level Command signal. The R-F Power Level Command signal will also have a voltage between 0 and 5 volts and will thus pass to r-f generator 650 the proper command signal from the microprocessor, a signal corresponding to either the Vertical or Cross Seal Command signal, as determined by the setting of switches 840 and 842. Therefore, when generator 650 is energized by R-F Trigger signal at pin A4, it will generate the power level corresponding to the desired R-F Power Command signal. The values of the vertical and cross seal power command signals may differ, with the cross seal value typically being greater in magnitude than the vertical seal value as shown in the timing diagram for output U1(FIG. 40B).

The control of switches 840 and 842 is by the parallel logic networks that control timing and duration of the vertical and cross seal cycles. One network is associated with vertical seal cycle and one network is associated with the cross seal cycle.

The vertical seal network and cross seal network work in substantially the same way, having similar circuitry, differing only in the magnitude and duration of the pulse control signals. For discussion purposes, only the vertical seal network will be discussed, except as necessary to explain the interdependancy of the two networks in accordance with the preferred embodiment.

Referring to the vertical seal network, a predetermined Vertical Seal Time Command signal is input at pin B4 to driver circuit 808 comprising amplifier U5, typically a 741 operational amplifier having power supply voltages ±15 volts across respective grounded capacitors C20 and C21 to inputs U5-7 and U5-4, and resistor R31 in the feedback loop between output U5-6 and inverting input U5-2. The Vertical Seal Time Command signal is typically a fixed value provided by the microprocessor having a voltage between 0 and 10 volts and is input to pin U5-3 across resistor R32 and grounded capacitor C22. The output at U5-6 is then fed to input U7-5 of timer circuit 812 and sets the control voltage of timer U7. Timer circuit 812 comprises timer U7, typically a conventional 555 type timer chip arranged so that pin U7-1 is grounded, a +15 volt source is fed across grounded capacitor C45 to pins U7-8 and U7-4 tied together. A trigger signal, as described more fully below, is input to pin U7-2.

Precision current regulator circuit 810 is configured to provide a linear ramp output signal to charge a timing capacitor linearly. Circuit 810 comprises amplifier U6, preferably a bifet 3140 operational amplifier having connections as follows, a +15 volt signal is input to non-inverting input U6-3, across series resistor R33 and parallel RC network C23 and R34, both connected to ground, pin U6-1 is tied to pin U6-8 through series RC network resistor R35 and capacitor C25, power supply voltages ±15 volts are input to pins U6-4 and U6-7 across grounded capacitor C24 and C26, respectively. The output at pin U6-6 is input to the base of transistor Q1 of current driver circuit 860, typically a 2N5366 type transistor. The emitter of Q1 is connected to pin U6-2. The +15 volt power supply input to U6-3 across R33 is also tied to U6-7 and connected to Q1 emitter across series potentiometer P5 and resistor R36. The collector of transistor Q1 feeds timing capacitor C27.

The signal across the timing capacitor is input to pin U7-7 of timer 812. In normal operation and in the absence of a Vertical Seal Trigger signal at U7-2, U7-7 will short capacitor C27 to ground, preventing capacitor C27 from charging. A charging circuit comprising a +15 volt supply feeding parallel diode CR10 and resistor R37 maintains a logical high voltage so that capacitor C27 is shorted at pin U7-7. At the onset of a trigger signal, the charging circuit will momentarily change to a logical low state, triggering U7 to begin the timing cycle which causes output U7-3 to change from a logical zero to a logical high, open circuits pin U7-7 which permits capacitor C27 to charge with a precision controlled linear ramp. Capacitor C27 voltage will continue to increase until its level input to U7-6 reaches the voltage level set by the threshold control voltage input at pin U7-5. At that time, output U7-3 changes from logical high to logical low, and capacitor C27 is again short circuited at pin U7-7. Thus, the capacitor C27 stops charging and is discharged by circuit 810. The pulse width of output U7-3 corresponds to the time required for the linearly ramped C27 voltage to rise to the threshold control voltage (predetermined by the microprocessor) and thereby establishes the length of time r-f generator 650 will be energized for forming the vertical seal. The power level for the vertical seal is set by the Vertical Seal Power Level Command signal, independent of the time, as described above.

The Vertical Seal Trigger signal, input across pins B9 and B10, is the signal generated by vertical signal sensor 551 as it detects one of pins 552 as cross seal wheel 200 rotates. The signal is fed across debounce circuit 824a which forms the waveform into a square wave or vertical trigger pulse. The signal at pin B9 is connected to input U12A-2 of square wave generator U12A, typically a CMOS 4093 type chip, manufactured by RCA. A +15 volt supply is input to U12A-2. The signal at pin B9 is fed across grounded resistor R13, series resistor R12, grounded capacitor C11, and into input U12A-2. Grounded diode CR5, typically a 1N4148 type diode, is connected to input U12A-2, and diode CR4, also typically a 1N4148 diode, is connected between inputs U12A-2 and U12A-1. The diodes and RC network act to filter the Vertical Seal Trigger signal to provide a logic high level input to U12A-2 to be compared with the +15 volt supply at input U12A-1.

The output of debounce circuit 824a at U12A-3 is normally high. When the Vertical Seal Trigger signal is input to the circuit, the output changes to a logical pulse. The logical pulse serves several functions. First, the vertical seal trigger pulse is input to latch circuit 844, at U15A-3, to set logic low trigger flip flop U15A to a logical high output at U15A-13. Flip flop U15A is typically a CMOS 4044B flip flop manufactured by RCA. That output is inverted by inverter U17E, a 4049 type inverter, to form a logical low signal that turns on transistor Q4, a 2N5366 transistor, of current driver circuit 866, which provides the R-F Trigger Vertical Seal signal to the microprocessor. Thus, the microprocessor is informed that the R-F Trigger signal is for a vertical seal.

Second, the Vertical Seal Trigger pulse is input to latch circuit 846 to reset logic low trigger flip flop U15D, also a 4044B type flip flop, at U15D-14 so that output U15D-1 is a logical low signal, inverted to a logical high signal by inverter U17F, a 4049 type inverter, which provides a logical high signal to turn off transistor Q5, a 2N5366 transistor, of current driver circuit 868. Turning off transistor Q5 prevents generating the R-F Trigger Cross Seal signal at node A3 so that when the microprocessor samples the outputs of the r-f control circuit, it sees only the R-F Trigger Vertical Seal signal, corresponding to the Vertical Seal Trigger input at pins B9 and B10, and determines the R-F Trigger to be for a vertical seal.

Third, the Vertical Seal Trigger pulse is input to logic gate 830, typically a CMOS 4011 NAND gate, at U13A-1 which produces a logical high output at U13A-3 because input U13A-2 is maintained at a logic low level by the logic low level output of debounce circuit 824b associated with the cross seal network. The high output at U13A-3 is input to single shot circuit 822 at U11B-11 to initiate a typically fifty nanosecond wide pulse to reset flip flop U11A which in turn enables integrator circuit 802 as described more fully below.

Fourth, the vertical seal trigger pulse is input to timer U7-2. The negative signal is coupled through capacitor C28 to the coupling circuit comprising a +15 volt source, diode CR10, and resistor R37 to cause a momentary drop in the normally +15 volt signal applied to U7-2, to bring the signal applied to U7-2 to zero (logical low). This triggers timer U7 to begin allowing capacitor C27 of precision current driver circuit 810 to begin charging until the threshold level is reached, at which time timer U7 turns off dropping the output to a logical low level, thereby defining the pulsewidth.

The cross seal network works in a similar fashion, operating to turn off the R-F Trigger Vertical Seal signal and turn on the R-F Trigger Cross Seal signal by appropriate setting and resetting of latch circuits 844 and 846, turning on timer circuit 818 with its associated precision current driver circuit 816 and Cross Seal Time Command signal, as the Cross Seal Trigger signal is detected across pins B8 and B10 and passed through debounce circuit 824b.

Returning to the operation of timer circuit 812 for the vertical seal network, the vertical seal pulse output from pin U7-3 is used for various housekeeping functions of the control circuit. The pulse is typically a 100 msec pulse having a logical high value. In comparison, the cross seal pulse from timer circuit 818 is typically 200 msec. The vertical seal pulse is input across resistor R46 to switch 828 at U12D-12. The vertical seal pulse is also input to single shot circuit 836 across coupling capacitor C40 and a charging circuit designed to keep the input to NAND gate U13D-12 at logical high. The charging circuit includes a +15 volt supply across diode CR12, typically a 1N4148 diode; and resistor R48 in parallel. NAND gate U13D is typically a CMOS 4011 type NAND gate. The other input at U13D-13 is also maintained biased at logical one by a similar charging circuit. The presence of the trailing or falling edge of the vertical seal pulse will momentarily present a logical zero input at U13D-12 which, because input U13D-13 is biased high, provides NAND gate U13D-11 with a logical high output. The charging circuit recovers immediately thereafter, returning output U13D-11 to logical low, and providing a narrow output pulse about four microseconds wide. Input U13D-13 is also connected to the output of timer U10 across coupling capacitor C41 and the charging circuit so that the occurrence of a cross seal pulse will produce a momentary logical low input at U13D-13 and also a four microsecond pulse at U13D-11.

The output of timer U7 is also inverted by inverter U18B, typically a CMOS 4049 inverter, and fed to input U13B-5 of logic gate 832, typically a 4011 NAND gate. Similarly, the output of timer U10 is inverted by inverter U18D and input to U13B-4. Thus, the appearance of either a cross or vertical seal pulse from either timer circuit will provide NAND gate U13B with a logical high output. The simultaneous occurrence of cross and vertical pulse signals will result in a logical low output. The output of NAND gate U13B is input to NAND gate U13C-9. The other input to U13C is the R-F Trigger Enable signal, a logical high signal. Thus, the occurrence of two logical high inputs causes output U13C-10 to go low, turning on transistor Q6, typically a 2N5366 type transistor, of current driver circuit 870 to produce the R-F Trigger signal at pin A4. The R-F Trigger signal will be on only as long as transistor Q6 is on, which, under normal acceptable operating circumstances, is as long as either the vertical or cross seal pulses are at logical high, i.e., the pulsewidth output of timers U7 and U10, respectively.

The outputs of timers U7-3 and U10-3 are also used to control switches 840 and 842 to present the desired Power Level Command signal to pin A10. In general terms, for a vertical seal pulse, switch 840 is enabled and switch 842 is disabled. At the end of the vertical seal pulse, switch 840 is disabled and switch 842 is enabled a period of time in advance of when the signal will actually be used so that the switching circuitry will stabilize before the selected signal is passed, thereby providing a stable signal.

At the conclusion of the vertical seal pulse, flip flop U16A is set. This provides a logical high signal to input U14C-5 of switch U14C, thereby selecting for the Cross Seal Power Level signal to be throughput to pin A10. Setting flip flop U16A also resets flip flop U16B, thereby turning off the Vertical Seal Power Level Command signal by disabling switch U14B. Similarly, at the conclusion of a cross seal pulse, flip flop U16B is set, enabling switch U14B to throughput the Vertical Seal Power Level Command signal, and resets flip flop U16A, thereby disabling switch U14C. Both U16A and U16A are typically CMOS 4027 type flip flops. Output U16A-15 is also input to the aforementioned square wave generator U12D-13 and output U12D-11 is inverted by inverter U18E into a logical pulse which, when high, resets flip flop U16B at U16B-4. Output U16B-1 provides a logical output which is also a logical input to square wave generator U12C-9 corresponding to the cross seal network, and a logical signal to switch U14B-12. The output of U12C-10 is inverted by inverter U18C and input to the reset of flip flop U16A at U16A-

12. Control of setting of the flip flops U16A and U16B is achieved by also inputting the inverted outputs of timers U7-3 and U10-3 (using inverters U18B and U18D, respectively) into positive edge triggered clock inputs U16A-13 and U16B-3 respectively, so that on the occurrence of the positive trigger, the flips flops will be set.

Referring to logic gate 830, when either a Vertical or Cross Seal Trigger signal is detected, output U13A-3 is a logical high and is input to clock input U11B-11 of one shot pulse generator 822. One shot U11 is typically a 4013 flip flop configured so the output U11B-13 is tied to reset U11B-10, inverted output U11B-12 is connected to pin U11B-9 and set input U11B-8 is connected to ground. The result is typically a fifty nanosecond wide pulse that is input to latch circuit 820 to reset flip flop U11A, typically a CMOS 4013 type flip flop, at U11A-4.

Resetting flip flop U11A provides a logical low output at U11A-1 which is input to switch U14A-13 in the feedback loop of integrator circuit 802. A logical low input open circuits switch U14A and allows capacitor C5 to begin integrating the R-F Power Level Feedback signal detected at pins B5 and B6 as differentially amplified by circuit 800.

At the end of the Vertical or Cross Seal Trigger pulse signal, single shot circuit 836 generates the hold signal as discussed below. The hold signal is also coupled through capacitor C13 to a charging circuit designed to maintain a logical high signal to the trigger input U4-2 of timer U4. The charging circuit comprises a +15 volt source across diode CR8 (type 1N4148) and resistor R16. Timer U4, typically a 555 timer, has the following further configuration. The threshold and discharge inputs U4-6 and U4-7 are tied together and connected to capacitor C14, which is grounded, and to +15 volt supply across resistor R17, forming an RC curve current driver. Pin U4-1 is connected to ground and pin U4-7 is internally connected to U4-1 by a transistor to discharge capacitor C14 when timer U4 has completed its timing cycle following the hold signal generated at the end of either a Vertical or Cross Seal Trigger pulse, and the internally set control voltage at pin U4-5 connected to grounded capacitor C15. A power supply voltage of +15 volts is input to pins U4-4 and U4-8 across grounded capacitor C44.

Timer U4 operates to provide a one millesecond delay from the onset of the hold signal to permit the track and hold circuit 804 to set the hold before the integrator is reset for taking another sample. The signal output from inverter U17D causes a momentary logical low input to U4-2 which triggers timer U4 to turn on, logic high at U4-3. This removes the short circuit across capacitor C14 which will then charge in accordance with the RC network C14 and R17 until the voltage level reaches the level of the control signal input at U4-5. Then, timer U4 turns off. When the output of timer U4-3 goes to logic low, it is coupled through capacitor C16 to set flip flop U15C, a negative edge triggered device, which turns on transistor Q3 to generate the R-F Data Ready signal to the microprocessor which may prompt the microprocessor to sample and record the outputs of the r-f control circuit and then generate the R-F Strobe signal. The pulse is also coupled to flip flop U11A through inverter U18A where it sets flip flop U11A which closes switch U14A to reset integrator circuit 802.

Figure 39:
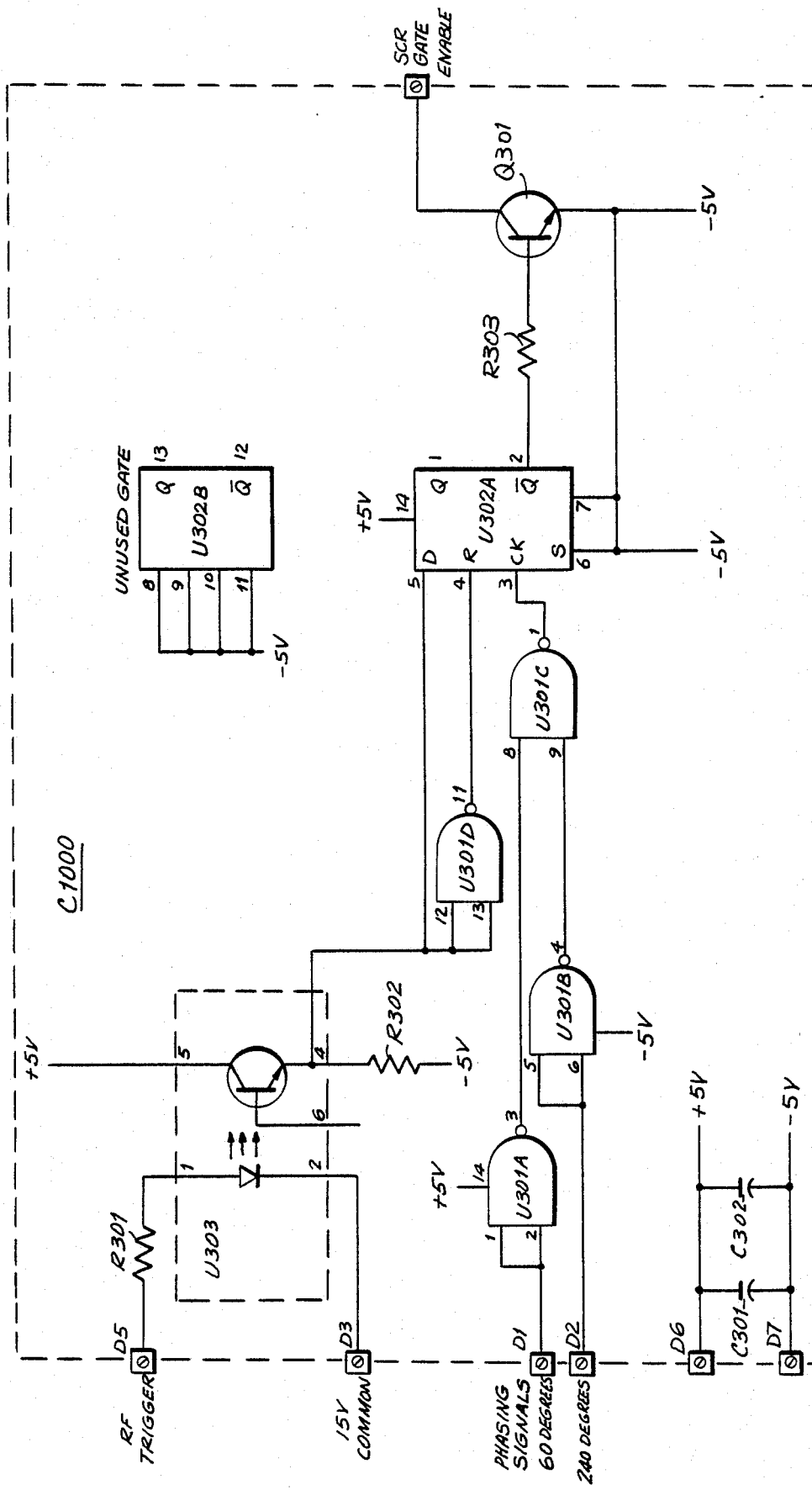
FIG. 39 is a schematic circuit diagram of the radio frequency trigger board of the control circuit of the present invention.

Referring to FIG. 39, the R-F Trigger signal from pin A4 of FIG. 37 is input to node D5 of r-f trigger circuit board C1000. The signal is fed through input resistor R301 into photocoupler U303, preferably an H11B2 optical coupler, to isolate board C1000 from the rest of the system electronics. A 15 volt common return is provided from coupler U303 to node D3. Coupler U303 is configured as follows, a +5 volt source is connected to the phototransistor collector at U303-5, a −5 volt source is coupled through load resistor R302 to the phototransistor emitter at U3034. The output of coupler emitter at U303-4 is input to the data input of U302A, typically a CMOS 4013 type flip flop, and input to NAND gate U301D whose inputs are shorted together to act as an inverter, the output of which is input to the reset input of U302A-4.

Also input to flip flop U302A are control inputs corresponding to the Phasing Signals generated by the manufacturer's control circuits for r-f generator 650. The phasing signals indicate the times when it would be advantageous to operate the generator by firing the silicon controlled rectifiers (SCR) in view of the phase of AC line current to substantially prevent saturation of the plate circuit transformer which would lead to an overcurrent condition. The phasing signals are typically set at 60 degrees and 240 degrees. The signals are respectively input from r-f generator 650 to nodes D1 and D2, inverted by NAND gates U301A and U301B configured as inverters with common inputs, and input to NAND gate inputs U301C-8 and U301C-9. The output of NAND gate U301C is input to the clock input of flip flop U302A at U302A-3. Logical "not" output U302A-2 is input to transistor Q301, typically a 2N3416 type transistor, through resistor R303. The collector of transistor Q301 is the SCR Gate Enable output signal, which allows the SCR gate driver circuit in r-f generator 650 to be enabled to allow power to be delivered to the r-f generator. Transistor Q301 emitter is connected to a −5 volt source along with flip flop inputs U302A-6 and U302A-7 shorted together. A +5 volt source is input to U302A-14.

The operation of control board C1000 is as follows. An R-F Trigger signal provides a logical high signal at U303-4, which sets the data input of flip flop U302A-5 and is inverted to provide a logical low input to the reset input U302A-4. On the occurrence of either phasing signal, the clock input is activated and flip flop U302A passes the data input U302A-5, a logical high signal to output U302A-1 and a logical low signal to "not" output U302A-2. This turns off Q301, thereby permitting the SCR gate to float. In other words, turning off Q301 opens the transistor collector output which enables the SCR gate driving current and causes r-f generator to have an output. At the end of the R-F Trigger pulse, flip flop U302A is reset, turning on Q301, and disabling SCR gate to prevent operation of the r-f generator.

Although the preferred embodiment refers to switching the power from a single induction generator to the vertical and plurality of transverse sealing coils, two induction generators, preferably r-f generators, may be used in place of one. In such an embodiment, the need for solid state switches U14B and U14C and related flip flops U16A and U16B can be eliminated. Each generator would thus have its own R-F strobe, Cross or Vertical Trigger pulse, Seal Time Command, Seal Power Level Command, R-F Enable signals, and the like. One generator may be dedicated to forming vertical seals and the other dedicated to forming transverse seals.

The vertical seal generator may operate intermittently in response to detecting one of pins 552, or it may operate continuously while web is advancing. For continuous operation, the longitudinal or vertical seal coil may be redesigned accordingly. The horizontal seal generator may operate in response to detection of a pin 552 as described above. However, with two generators, the limit on speed of cross seal wheel 200 is no longer dependent upon the switching times incumbent on mechanical detection of pins 552 and switching between vertical and horizontal seal cycles and logic networks, nor even upon the pulse width of the Cross Seal Time Command signal. In this embodiment, the simultaneous energization of adjacent sealing coils can be accommodated by, for example, providing the generator with a large enough work coil to accommodate loading by two or more transverse coils simultaneously, and appropriate Power Level Command signals for when the generator is loaded by one cross seal coil and by more than one coil. In such an embodiment, the horizontal generator also may run continuously or intermittently, depending upon the speed of cross seal wheel 200, and the power levels appropriate to form transverse seals.

In this alternate embodiment, timers U7 and U10 would be fed to their respective dedicated integrator reset circuits for their respective r-f feedback control signal detection and to their respective r-f vertical and cross triggers.

The aforementioned logic circuits could be modified to provide each generator with an appropriate R-F control circuit having the R-F Enable, R-F Strobe and one of a Vertical or Cross Seal Time Command, Power Level Command, Trigger, and Power Level Feedback. Similarly, each r-f control circuit would have a Data Ready, R-F Feedback Level, R-F Trigger, r-f Power Level, and one of an R-F Trigger Vertical or Cross Seal signals as outputs. This would provide the two r-f generators with independent control that is linked mechanically to or synchronized electrically with the detection of pins 552 of cross seal wheel 200.

One of the advantages of the present invention is that the power level of the source of electromagnetic energy can be monitored to provide an indicia of seal quality. For example, whether or not a proper seal is made can be determined as a function of whether enough current was induced in the polyfoil to heat it to the temperature necessary for fusion under the given operating and sealing conditions.

The power generated can be correlated to a calculated value determined by generating a reference signal proportional to the instantaneous current flow in the output circuit of the induction generator, detecting the presence of the output circuit current, and integrating the current over the length of the seal cycle corresponding to the time the instantaneous output current exists (or has a value above a predetermined threshhold value, where values below the threshhold value correspond to a non-sealing condition). The integrated result or calculated value can then be compared to predetermined reference values, a first value corresponding to the power needed to form a longitudinal seal segment, and a second value corresponding to the power needed to form a transverse seal. A margin of safety may be added to either the predetermined values or the comparison of the calculated value to one of the predetermined values to provide a confidence factor for producing adequate seals. Thus, where the calculated value is above the selected predetermined reference value, it is known, within the confidence factor, that adequate power to form a good seal was generated and passed to the inductive load and a good seal made.

Once the power level correlation is made, packages whose calculated correlated power levels are less than the selected predetermined value can be electronically marked for removal by package removing apparatus, e.g., an air blast or other device that knocks the package off or out of the package advancing means, downstream of the sealing section. Marking can be accomplished by identifying the package having a correlated power level below the predetermined value for a seal, determining how long it takes that package to travel along the machine from where the seal (longitudinal or transverse) was made to the package removing apparatus—given the known rate of advance of the package and the distance it must travel—and then actuating the package removing apparatus after the appropriate time to eject the marked package from the package forming machine as it passes by the package removing apparatus. The package then can be inspected for seal quality. A similar second predetermined threshold value could be provided corresponding to too much heat resulting in a poor quality seal to also mark such packages for removal. The predetermined values can be adjusted to correspond to the operating conditions so that only inadequately sealed packages are rejected. A microprocessor may be used to perform the signal comparison, determine the time delay, monitor the rate of advance of the packages, and actuate the package removing apparatus after the time delay to remove packages automatically.

I claim:

1. A method of forming aseptic packages from a supply of polyfoil web material in a form, fill, and seal machine including a device for scoring the web with score lines, a web sterilizing means, a sterile environment area, a tube forming section, a radio frequency power supply, a first induction coil coupled to the power supply, a supply of product, a plurality of sealing mechanisms mounted on a cylindrical structure in a spaced apart relationship, each sealing mechanism being adapted for clamping a product filled tube transversely and having a transverse induction coil and means for coupling the transverse induction coil to the power supply, the cylindrical structure being rotated to bring, in succession, one sealing mechanism after the other in contact with the filled tube at a predetermined location to be transversely clamped and sealed, the distance between adjacent clamped sealing mechanisms corresponding to the areas between adjacent packages and a severing means, the method comprising:

scoring the polyfoil web;
sterilizing the product contacting layer of the polyfoil web immediately before and while passing the web through the tube forming section and into the sterile environment so that its edges overlap in opposition;
longitudinally sealing the opposing web edges together to form a tube by energizing the first induction coil with the radio frequency power supply for a period of time sufficient to melt the opposing polyfoil layers so that they will fuse together and form a hermetic seal;
filling the tube with a product;

transversely clamping the filled tube with one of the plurality of sealing mechanisms;

sealing the clamped tube transversely by energizing the transverse induction coil in the clamped sealing mechanism with the radio frequency power supply for a period of time sufficient to melt the opposing polyfoil layers in the transversely clamped area to fuse the thermoplastic layers together;

maintaining the sealing mechanism clamped about the fused polyfoil while the transverse induction coil is not energized for a period of time to permit the polyfoil to cool and form a hermetic seal; and severing the tube in the seal area to sever a sealed package from the tube.

2. The method of claim 1 wherein manipulating the web further comprises folding the web into a substantially triangular column so that the edges to be longitudinally sealed together are aligned in opposition.

3. The method of claim 1 wherein longitudinally sealing the opposed web edges further comprises:

energizing the first induction coil for a period of time;

inducing a current in the conductive layer of the polyfoil of sufficient density to resistively generate heat and conductively heat, soften, and melt the opposing inner thermoplastic layers; and forcing the heated longitudinal edges of the web together to form a homogenous longitudinal seal, one segment at a time, so that adjacent segments overlap to form a continuous seal.

4. Apparatus for sealing a polyfoil web into sealed packages for use in a package form, fill, and seal machine having a plurality of spaced apart sealing mechanism for transversely clamping and sealing an advancing product filled tube into discrete packages, comprising:

a source of electromagnetic energy;

means for advancing and manipulating the polyfoil web so that the web edges are longitudinally aligned in a superimposed relationship;

a first induction coil, responsive to the source of eletromagnetic energy, having a characteristic first electromagnetic field;

a plurality of transverse induction coils, one transverse coil associated with each sealing mechanism, each coil being responsive to the source of electromagnetic field;

means for coupling and energizing the first induction coil so that when the first induction coil is coupled and energized it generates the first electromagnetic field having sufficient intensity to induce a current in the superimposed edges of polyfoil web in proximity to the coil and subjected to the first electromagnetic field to heat the polyfoil web for forming a polyfoil tube;

means for detecting the presence of a transverse coil as it traverse a predetermined position and generating a signal;

control circuit means for energizing the source of electromagnetic energy to a preselected magnitude in response to the signal; and coupling means for coupling the energized source of electromagnetic energy to the detected transverse coil so that the detected transverse induction coil is coupled and energized and generates the second electromagnetic field having sufficient intensity to induce a current in the clamped polyfoil tube in proximity to the coil and subjected to the second electromagnetic field to heat the transversely clamped polyfoil tube for forming packages.

5. Apparatus for sealing a polyfoil web into sealed packages for use in a package form, fill, and seal machine having a plurality of spaced apart sealing mechanisms for transversely clamping and sealing an advancing product filled tube into discrete packages, comprising:

a source of electromagnetic energy having a variable level of output power, the level being responsive to a control signal;

means for advancing and manipulating the polyfoil web so that the web edges are longitudinally aligned in a superimposed relationship;

a first induction coil, responsive to the source of electromagnetic energy, having a characteristic first electromagnetic field;

a plurality of transverse induction coils, one transverse coil associated with each sealing mechanism, each coil being responsive to the source of electromagnetic energy and having a characteristic second electromagnetic field;

a first work coil electrically connected to the source of electromagnetic energy;

a second work coil, electrically connected to the first induction coil and adapted t be coupled to the first work coil; and means for coupling and decoupling the first and second work coils so that when the first and second work coils are coupled and energized the first induction coil generates the first electromagnetic field having sufficient intensity to induce a current in the superimposed edges of polyfoil web in proximity to the coil and subjected to the first electromagnetic field to heat the polyfoil web for forming a polyfoil tube;

means for electrically coupling and energizing a transverse coil to the source of electromagnetic energy so that when a transverse induction coil is coupled and energized it generates the second electromagnetic field having sufficient intensity to induce a current in the clamped polyfoil tube in proximity to the coil and subjected to the second electromagnetic field to heat the transversely clamped polyfoil tube for forming packages; and circuit means for producing the control signal for controlling the output level of the electromagnetic energy source so that when the first induction coil is coupled to the energy source it will generate the first electromagnetic field and so that when a transverse coil is coupled to the energy source it will generate the second electromagnetic field.

6. The apparatus of claim 5, wherein the means for coupling and decoupling the first and second work coils further comprises an actuator means for physically moving the first and second work coils into and out of relative effective range so that when in relative effective range, the first induction coil can generate the first electromagnetic field, and when out of relative effective range the first induction coil substantially cannot generate the first electromagnetic field.

7. Apparatus for sealing a polyfoil web into sealed packages for use in a package form, fill, and seal machine having a plurality of spaced apart sealing mechanisms for transversely clamping and sealing an advancing product filled tube into discrete packages, comprising:

a source of electromagnetic energy having a variable level of output power, the level being responsive to a control signal;

means for advancing and manipulating the polyfoil web so that the web edges are longitudinally aligned in a superimposed relationship;

a first induction coil, responsive to the source of electromagnetic energy, having a characteristic first magnetic field;

a plurality of transverse induction coils, one transverse coil associated with each sealing mechanism, each coil being responsive to the source of electromagnetic energy and having a characteristic second electromagnetic field;

a first work coil electrically connected to the source of electromagnetic energy;

a second work coil electrically connected to the first induction coil and adapted to be coupled to the first work coil; and a first magnetic housing surrounding one of the first or second work coils;

a second magnetic housing surrounding the other of the first or second work coils; and an actuator means for moving the first and second housings into proximity to couple the electromagnetic field from the first work coil to the second work coil and out of proximity to decouple the first work coil and the second work coil so that when the first and second work oils are coupled and energized the first induction coil generates the first electromagnetic field having sufficient intensity to induce a current in the superimposed edges of the polyfoil web in proximity to the coil and subjected to the first electromagnetic field to heat the polyfoil web for forming a polyfoil tube;

means for electrically coupling and energizing a transverse coil to the source of electromagnetic energy so that when a transverse induction coil is coupled and energized it generates the second electromagnetic field having sufficient intensity to induce a current in the clamped polyfoil tube in proximity to the coil and subjected to the second electromagnetic field to heat the transversely clamped polyfoil tube for forming packages; and circuit means for producing the control signal for controlling the output level of the electromagnetic energy source so that when the first induction coil is coupled to the energy source it will generate the first electromagnetic field and so that when a transverse coil is coupled to the energy source it will generate the second electromagnetic field.

8. Apparatus for sealing a polyfoil web into sealed packages for use in a package from, fill, and seal machine having a plurality of spaced apart sealing mechanisms for transversely clamping and sealing an advancing product filled tube into discrete packages, comprising:

a source of electromagnetic energy having a variable level of output power, the level being responsive to a control signal;

means for advancing and manipulating the polyfoil we so that the web edges are longitudinally aligned in a superimposed relationship;

a first induction coil, responsive to the source of electromagnetic energy, having a characteristic first electromagnetic field;

a plurality of transverse induction coils, one transverse coil associated with each sealing mechanism, each coil being responsive to the source of electromagnetic energy and having a characteristic second electromagnetic field;

means for electrically coupling the first induction coil to the source of electromagnetic energy and energizing the first induction coil so that when the first induction coil is coupled and energized it generates the first electromagnetic field having sufficient intensity to induce a current in the superimposed edges of polyfoil web in proximity to the coil and subjected to the first electromagnetic field to heat the polyfoil web for forming a polyfoil tube;

a first work coil responsive to and electrically connected to the source of electromagnetic energy, having a characteristic third electromagnetic field;

a plurality of second work coils arranged so that one second work coil is associated with each sealing mechanism and is electrically connected to the transverse coil of that mechanism;

means for coupling and decoupling the first work coil and a second work coil so that when the first and a second work coils are coupled and energized the transverse induction coil generates the second electromagnetic field having sufficient intensity to induce a current in the clamped polyfoil tube in proximity to the coil and subjected to the second electromagnetic field to heat the transversely clamped polyfoil tube for forming packages; and circuit means for producing the control signal for controlling the output level of the electromagnetic energy source so that when the first induction coil is coupled to the energy source it will generate the first electromagnetic field and so that when a transverse coil is coupled to the energy source it will generate the second electromagnetic field.

9. The apparatus of claim 8 wherein the means for coupling and decoupling the first work coil and a second work coil further comprises:

a structure adapted for receiving the plurality of sealing mechanisms in a spaced apart relationship;

a housing for mounting the first work coil in proximity to the structure;

means for advancing the structure so that the second work coil of each sealing mechanism passes into and out of the effective range of the third electromagnetic field generated by the first work coil so that when in effective range a current may be induced in the transverse coil associated with that second work coil to generate the second magnetic field, and when out of range the third electromagnetic field does not induce a substantial current in the second work coil so that the transverse coil substantially cannot generate the second electromagnet field.

10. The apparatus of claim 9 wherein the structure further comprises a cylindrical wheel adapted for rotating about it axis having flanges adapted for receiving the plurality of sealing jaws so that the plurality of second work coils are arranged in the same plane.

11. Apparatus for sealing a polyfoil web into sealed packages for use in a package form, fill, and seal machine having a plurality of spaced apart sealing mechanisms for transversely clamping and sealing an advancing product filled tube into discrete packages, comprising:

a source of electromagnetic energy having a variable level of output power, the level being responsive to a control signal;

means for advancing and manipulating the polyfoil web so that the web edges are longitudinally aligned in a superimposed relationship;

a first induction coil, responsive to the source of electromagnetic energy, having a characteristic first electromagnetic field;

a plurality of transverse induction coils, one transverse coil associated with each sealing mechanism, each coil being responsive to the source of electromagnetic energy and having a characteristic second electromagnetic field;

means for electrically coupling the first induction coil to the source of electromagnetic energy and energizing the first induction coil so that when the first induction coil is coupled and energized it generates the first electromagnetic field having sufficient intensity to induce a current in the superimposed edges of polyfoil web in proximity to the coil and subjected to the first electromagnetic field to heat the polyfoil web for forming a polyfoil tube;

means for electrically coupling a transverse coil to the source of electromagnetic energy and energizing a transverse coil so that when a transverse induction coil is coupled and energized it generates the second electromagnetic field having sufficient intensity to induce a current in the clamped polyfoil tube in proximity to the coil and subjected to the second electromagnetic field to heat the transversely clamped polyfoil tube for forming packages;

circuit means for producing the control signal for controlling the output level of the electromagnetic energy source including a first control signal having a first preselected magnitude corresponding to the energy level required to energize the first induction coil to heat the polyfoil web for sealing into a polyfoil tube and a second control signal having a second preselected magnitude corresponding to the energy level required to energize a transverse coil to heat the polyfoil tube transverse for sealing into a package; and selector means for determining the magnitude of the control signal and the duration of the selected control signal for controlling the output level of the source of electromagnetic energy so that when the first induction coil is coupled to the energy source it will generate the first electromagnetic field and so that when a transverse coil is coupled to the energy source it will generate the second electromagnetic field.

12. The apparatus of claim 11 further comprising a third control signal having a third preselected magnitude corresponding to an energy level not capable of energizing any coil to heat the polyfoil.

13. Apparatus for sealing a polyfoil web into sealed packages for use in a package form, fill, and seal machine having a plurality of spaced apart sealing mechanisms for transversely clamping and sealing an advancing product filled tube into discrete packages, comprising:

a source of electromagnetic energy;

means for advancing and manipulating the polyfoil web so that the web edges are longitudinally aligned in a superimposed relationship;

a first induction coil, responsive to the source of electromagnetic energy, having a characteristic first electromagnetic field, and having one half of its turns located on opposing sides of the advancing web, the turns being connected in series and adapted for creating substantial forces of magnetic attraction to be developed between opposing metallic foil layers in the seal areas which urge the opposing heated polyfoil layers together when energized by the first electromagnetic field;

a plurality of transverse induction coils, one transverse coil associated with each sealing mechanism, each coil being responsive to the source of electromagnetic energy and having a characteristic second electromagnetic field;

means for coupling and energizing the first induction coil so that when the first induction coil is coupled and energized it generates the first electromagnetic field having sufficient intensity to induce a current in the superimposed edges of polyfoil web in proximity to the coil and subjected to the first electromagnetic field to heat the polyfoil web for forming a polyfoil tube; and means for coupling and energizing a transverse coil so that when a transverse induction coil is coupled and energized it generates the second electromagnetic field having sufficient intensity to induce a current in the clamped polyfoil tube in proximity to the coil and subjected to the second electromagnetic field to heat the transversely clamped polyfoil tube for forming packages.

14. Apparatus for sealing a polyfoil web into sealed packages for use in a package form, fill, and seal machine having a plurality of spaced apart sealing mechanism for transversely clamping and sealing an advancing product filled tube into discrete packages, comprising:

a source of electromagnetic energy;

means for advancing and manipulating the polyfoil web so that the web edges are longitudinally aligned in a superimposed relationship;

a first induction coil, responsive to the source of electromagnetic energy, having a characteristic first electromagnetic field, said coil being a center tapped electrically grounded coil;

a plurality of transversely induction coils, one transverse coil associated with each sealing mechanism, each coil being responsive to the source of electromagnetic energy and having a characteristic second electromagnetic field;

means for coupling and energizing the first induction coil so that when the first induction coil is coupled and energized it generates the first electromagnetic field having sufficient intensity to induce a current in the superimposed edges of polyfoil web in proximity to the coil and subjected to the first electromagnetic field to heat the polyfoil web for forming a polyfoil tube; and means for coupling and energizing a transverse coil so that when a transverse induction coil is coupled and energized it generates the second electromagnetic field having sufficient intensity to induce a current in the clamped polyfoil tube in proximity to the coil and subjected to the second electromagnetic field to heat the transversely clamped polyfoil tube for forming packages.

15. A method of detecting the power level generated by an induction generator during a seal cycle corresponding to forming a seal by induction heating of a polyfoil web material, comprising:

detecting a current in an output circuit of the induction generator;

providing a reference signal proportional to the instantaneous current flow in the output circuit,
integrating the reference signal during the seal cycle;
storing the integrated reference signal at the end of the cycle in a track and hold circuit device; and
determining the power level generated by comparing the stored signal to predetermined values.

16. A method of identifying and marking packages not subjected to an adequate electromagnetic field including the method of claim 15 and further comprising:
comparing the stored signal to a predetermined value representative of adequate electromagnetic energy for producing sufficient seals;
marking packages electronically for removal from the machine by recording the time until the package reaches a means for removing packages spaced a known distance downstream and the rate of speed at which the package advances; and
ejecting marked packages at the means for removing when the stored signal is less than the predetermined value.

17. Apparatus for use in a machine for forming, filling and sealing a polyfoil web into sealed packages comprising:
a source of electromagnetic energy;
means for advancing and manipulating the polyfoil web so that the edges of the web are disposed in a superimposed relationship;
a first induction coil having one half of its turns located on opposing sides of the advancing web, said coil turns being connected in series and having a characteristic first electromagnetic field; and
means for energizing the first induction coil so that the first electromagnetic field will have an intensity sufficient to induce a current in the superimposed edges of polyfoil web in proximity to the coil to heat the polyfoil and create substantial forces of magnetic attraction between opposing current carrying layers of the polyfoil in the seal area to urge the opposing heated polyfoil layers together.

18. The apparatus of claim 17 wherein the first induction coil is a center tapped coil electrically grounded.

19. A method of energizing an induction generator having a controllable output current level from AC power delivered through an iron core transformer during a seal cycle corresponding to forming a seal by induction in a polyfoil web material, comprising:
providing a first control signal to the induction generator for establishing a generator current output level;
triggering the induction generator to cause the generator to produce an output current at the output level corresponding to the first control signal; and
synchronizing the triggering of the induction generator with the AC power waveform for controlling the timing of the energization of the induction generator and thereby preventing saturation of the iron core transformer.

20. The method of claim 19 wherein the synchronization occurs at a positive phase angle selected from in the range between 60 degrees and 120 degrees phase angle for energizing the induction generator during the positive half cycle of the AC power, and a negative phase angle selected from in the range between 240 degrees and 300 degrees phase angle for the negative half cycle of the AC power.

21. The method of claim 19 wherein synchronizing the induction generator further comprises triggering the induction generator with a circuit means which synchronizes the seal cycle to the machine timing trigger to within four milliseconds of the actual trigger signal.

22. A method for sealing a polyfoil web of material into sealed packages containing a product for use with a package forming machine having a source of electromagnetic energy, a first induction coil, and a plurality of spaced apart sealing mechanisms, each sealing mechanism including a sealing jaw and an anvil jaw for transversely clamping and sealing a polyfoil tube and forming packages between adjacent sealing mechanisms, each sealing jaw having a transverse induction coil mounted so as to be proximate to the clamped polyfoil tube when the corresponding sealing jaw is in sealing position, the method comprising:
manipulating and advancing the web so that the longitudinal edges of the web are arranged in a superimposed relationship and pass by in close proximity to the first induction coil;
coupling the first induction coil to the source of electromagnetic energy thereby to energize the first induction coil with electromagnetic energy so that it generates a first electromagnetic field of sufficient intensity and duration to heat the polyfoil web edges subjected to the first electromagnetic field for sealing a length of the edges together to form a polyfoil tube;
filling the tube with product;
transversely clamping the tube with a sealing mechanism;
coupling the transverse induction coil of the clamped sealing mechanism to the source of electromagnetic energy thereby to energize the coupled transverse induction coil with electromagnetic energy so that it generates a second electromagnetic field of sufficient intensity and duration to heat the transversely clamped polyfoil web subjected to the second electromagnetic field for transversely sealing an area of the tube; and
coupling and energizing alternately one of the first induction coil and a transverse induction coil of a transversely clamped sealing mechanism, and advancing the web during said alternate coupling and energizing, thereby to seal the polyfoil web longitudinally into a tube and the product filled tube transversely into sealed packages.

23. The method of claim 22 comprising the additional steps of:
decoupling the first induction coil and decoupling the other transverse induction coils to avoid generation of the first electromagnetic field by the first induction coil and to avoid generation of the second electromagnetic field by the other transverse induction coils when one of the transverse induction coils is energized.

24. The method of claim 22 further comprising advancing the web continuously.

25. The method of claim 22 wherein a first work coil is directly connected in series with the source of electromagnetic energy and a second work coil is directly connected in series with the first induction coil and the step of coupling the first induction coil further comprises inductively coupling the first work coil to the second work coil so that a current passing through the first work coil will induce a current in second work coil and the first induction coil to thereby generate the first electromagnetic field.

26. The method of claim 25 further comprising the additional step of decoupling the first and second work coils to avoid generation of the first electromagnetic field when one of the transverse induction coils is energized.

27. The method of claim 22 wherein a first work coil is directly connected in series with the source of electromagnetic energy, the first work coil having a first housing of magnetic material moveable about the first work coil, and a second work coil is directly connected in series with the first induction coil, the second work coil having a second housing of magnetic material moveable about the second work coil, and the step of coupling the first induction coil further comprises moving the first magnetic material housing about the first work coil and the second magnetic material housing about the second work coil so that the first and second housings are in proximity to thereby electromagnetically couple the first and second housings so that a current passing through the first work coil is coupled to the second work coil by the transformer effect between the first and second housings.

28. The method of claim 27 comprising the additional step of moving the first and second magnetic housings out of electromagnetic coupling to thereby minimize the transformer effect to avoid generation of the first electromagnetic field when one of the transverse induction coils is energized.

29. The method of claim 22 wherein a first work coil is directly connected in series with the source of electromagnetic energy, the first work coil having a first housing of magnetic material about the first work coil, and a second work coil is directly connected in series with the first induction coil, the second work coil having a second housing of magnetic material movable about the second work coil, and the step of coupling the first induction coil further comprises moving the second magnetic material housing about the second work coil so that the first and second housings are in proximity to thereby electromagnetically couple the first and second housings so that a current passing through the first work coil is coupled to the second work coil by the transformer effect between the first and second housings.

30. The method of claim 29 comprising the additional step of moving the first and second magnetic housings out of electromagnetic coupling to thereby minimize the transformer effect to avoid generation of the first electromagnetic field when one of the transverse induction coils is energized.

31. The method of claim 22 wherein each transverse induction coil is electrically connected to a receiver induction coil and transversely clamping the polyfoil tube further comprises:
mounting the plurality of sealing mechanisms in a spaced apart relationship on a structure;
advancing the structure as the tube advances; and
closing each set of anvil and sealing jaws about the tube at a predetermined location so that the tube is sequentially securely clamped by the plurality of sealing mechanisms.

32. The method of claim 31 wherein a third work coil is electrically connected in series with the source of electromagnetic energy and coupling the transverse induction coil further comprises advancing the structure so that the receiver induction coil connected to the transverse induction coil to be energized is brought into close proximity to and inductively coupled to the third work coil so that a current passing through the third work coil will induce a current in the coupled receiver induction coil and transverse induction coil to thereby generate the second electromagnetic field.

33. The method of claim 32 comprising the additional step of advancing the structure so that the receiver induction coil is moved out of inductive coupling with the third work coil to avoid generation of the second electromagnetic field when the first induction coil is energized.

34. The method of claim 22 further comprising controlling the power output level of the source of electromagnetic energy so that a first current magnitude is applied to the first induction coil for a first time duration to generate the first electromagnetic field and a second current magnitude is applied to a transverse induction coil for a second time duration to generate the second electromagnetic field.

35. The method of claim 34 wherein the source of electromagnetic energy has a controllable output power level responsive to the magnitude of a control signal and comprising the additional steps of:
providing a control signal to the source of electromagnetic energy to thereby control the output power level of the source;
determining when a length of polyfoil edges is to be sealed into a tube and when the tube is to be transversely sealed; and
selecting the magnitude of the control signal from among a first magnitude corresponding to an output power level appropriate for generating the first electromagnetic field and a second magnitude corresponding to an output power level appropriate for generating the second electromagnetic field, to thereby generate first electromagnetic field when the first induction coil is coupled to the source of electromagnetic energy and a length of polyfoil edges is to be sealed and the second electromagnetic field when a transverse induction coil is coupled to the source of electromagnetic energy and the tube is to be transversely sealed.

36. The method of claim 35 wherein selecting the magnitude of the control signal further comprises selecting from among a third magnitude corresponding to a output power level not appropriate for generating either the first or second electromagnetic fields when no seal is to be made.

37. The method of claim 35 wherein selecting the magnitude of the control signal further comprises selecting from among a fourth magnitude corresponding to an output power level appropriate for generating the first electromagnetic field and the second electromagnetic field simultaneously when the first induction coil and a transverse induction coil are coupled to the source of electromagnetic energy and when both a length of polyfoil edges is to be sealed and the tube is to be transversely sealed.

38. The method of claim 22 comprising the additional step of decoupling all of the transverse induction coils to avoid generation of the second electromagnetic field by any of the transverse induction coils when the first induction coil is energized.

39. Apparatus for sealing a polyfoil web into sealed packages for use in a package form, fill, and seal machine having a plurality of spaced apart sealing mechanisms for transversely clamping and sealing an advancing product filled tube into discrete packages, comprising:

a source of electromagnetic energy;

means for advancing and manipulating the polyfoil web so that the web edges are longitudinally aligned in a superimposed relationship;

a first induction coil, responsive to the source of electromagnetic energy, having a characteristic first electromagnetic field;

a plurality of transverse induction coils, one transverse coil associated with each sealing mechanism, each coil being responsive to the source of electromagnetic energy and having a characteristic second electromagnetic field;

means for coupling one of the first induction coil or one of the plurality of transverse coils;

means for coupling and energizing the first induction coil so that it generates the first electromagnetic field having sufficient intensity to induce a current in the superimposed edges of polyfoil web in proximity to the coil and subjected to the first electromagnetic field to heat the polyfoil web for forming a polyfoil tube only when all of the plurality of transverse coils are not coupled and not energized; and means for coupling and energizing only one of the plurality of transverse coils so that it generates the second electromagnetic field having sufficient intensity to induce a current in the clamped polyfoil tube in proximity to the coil and subjected to the second electromagnetic field to heat the transversely clamped polyfoil tube for forming packages only when all of the other transverse coils and the first induction coils are not coupled and not energized, the apparatus thereby alternately forming a longitudinal seal segment and a transverse seal, the longitudinal segments overlapping to form a longitudinal seal.

* * * * *

UNITED STATES PATENT AND TRADEMARK OFFICE
CERTIFICATE OF CORRECTION

PATENT NO. : 4,825,625
DATED : May 2, 1989
INVENTOR(S) : Marvin Hufford

It is certified that error appears in the above-identified patent and that said Letters Patent is hereby corrected as shown below:

Column 3, line 13, after "continuous" (first occurrence)

insert --advance--

Column 6, line 26, "tee" should be --the--

Column 18, line 54, delete "and" (second occurrence)

Column 19, line 55, "66" should be --662--

Column 20, line 45, "12Q" should be --120--

Column 21, line 2, "tat" should be --that--

Column 21, line 45, delete "radio"

Column 25, line 47, "$\pm 15$" should be --+15--

Column 30, line 59, "U16A" should be --U16B--

Column 32, line 3, ""C100O" should be --C1000--

Column 32, line 11, "U3034" should be --U303-4--

Column 32, line 43, "C100O" should be --C1000--

UNITED STATES PATENT AND TRADEMARK OFFICE
CERTIFICATE OF CORRECTION

PATENT NO. : 4,825,625

DATED : May 2, 1989

INVENTOR(S) : Marvin Hufford

It is certified that error appears in the above-identified patent and that said Letters Patent is hereby corrected as shown below:

Column 36, line 27, "t" should be --to--

Column 37, line 29, "oils" should be --coils--

Column 39, line 40, "transverse" should be --transversely--

Signed and Sealed this

Tenth Day of March, 1992

Attest:

HARRY F. MANBECK, JR.

Attesting Officer      Commissioner of Patents and Trademarks